(12) United States Patent
Finkman

(10) Patent No.: US 10,302,882 B2
(45) Date of Patent: May 28, 2019

(54) ELECTRO-OPTICALLY BASED NETWORK INFRASTRUCTURES FOR TELECOMMUNICATION SYSTEMS

(71) Applicant: FASTLIGHT TECHONOLOGIES LTD., Givat Ela (IL)

(72) Inventor: Shai Finkman, Haifa (IL)

(73) Assignee: FASTLIGHT TECHNOLOGIES LTD., Givat Ela (IL)

( * ) Notice: Subject to any disclaimer, the term of this patent is extended or adjusted under 35 U.S.C. 154(b) by 0 days.

(21) Appl. No.: 15/523,945

(22) PCT Filed: Nov. 5, 2015

(86) PCT No.: PCT/IL2015/051071
§ 371 (c)(1),
(2) Date: May 3, 2017

(87) PCT Pub. No.: WO2016/071910
PCT Pub. Date: May 12, 2016

(65) Prior Publication Data
US 2017/0357068 A1   Dec. 14, 2017

Related U.S. Application Data

(60) Provisional application No. 62/075,275, filed on Nov. 5, 2014.

(51) Int. Cl.
*G02B 6/28* (2006.01)
*G02B 6/26* (2006.01)
(Continued)

(52) U.S. Cl.
CPC ............... *G02B 6/43* (2013.01); *G02B 6/428* (2013.01); *G02B 6/4214* (2013.01); *H04B 10/2504* (2013.01)

(58) Field of Classification Search
CPC .......... G02B 6/32; G02B 6/4214; G02B 6/34; G02B 6/136; G02B 6/3861; G02B 6/428;
(Continued)

(56) References Cited

U.S. PATENT DOCUMENTS

2003/0228084 A1   12/2003   Kanda et al.
2004/0021214 A1   2/2004   Badehi et al.
(Continued)

FOREIGN PATENT DOCUMENTS

CN          101344624        1/2009
WO      WO2009131426 A2    10/2009

*Primary Examiner* — Kaveh C Kianni
*Assistant Examiner* — Hung Q Lam
(74) *Attorney, Agent, or Firm* — Soroker Agmon Nordman

(57) ABSTRACT

A backplane for a communication system having a back-side and an opposite front-side both having traces capable of conducting electrical and/or optical signals that comprises a plurality of layers with traces capable of conducting electrical signals and vias for passing optical signals between said back-side and said opposite front-side. The back side is further provided with optical fibers capable of transporting the optical signals and optical elements affixed on an exit of one via of the plurality of vias in the back-side, wherein each optical element is capable of focusing optical signals coming through the via collimating optical signals from an optical fiber into and through the via to the front side. Systems based on the backplane are provided.

24 Claims, 44 Drawing Sheets

(51) Int. Cl.
  *G02B 6/34* (2006.01)
  *G02B 6/30* (2006.01)
  *G02B 6/38* (2006.01)
  *G02B 6/36* (2006.01)
  *G02B 6/43* (2006.01)
  *G02B 6/42* (2006.01)
  *H04B 10/25* (2013.01)

(58) Field of Classification Search
  CPC .............. G02B 6/43; G02B 6/352; G02B 2006/12097; G02B 2006/12104; G02B 2006/12114
  USPC ......... 385/18, 24, 28, 33, 36, 47, 49, 65, 83
  See application file for complete search history.

(56) References Cited

U.S. PATENT DOCUMENTS

| | | |
|---|---|---|
| 2004/0109628 A1 | 6/2004 | Kim et al. |
| 2004/0151419 A1 | 8/2004 | Parker |
| 2005/0220413 A1 | 10/2005 | Stevens et al. |
| 2006/0045417 A1 | 3/2006 | Morita |
| 2007/0013017 A1 | 1/2007 | Badehi et al. |
| 2013/0037209 A1* | 2/2013 | Ohhashi ............... G02B 6/4239 156/275.7 |
| 2013/0330035 A1 | 12/2013 | Shin et al. |
| 2014/0029894 A1* | 1/2014 | Bowen ................... G02B 6/30 385/37 |

\* cited by examiner

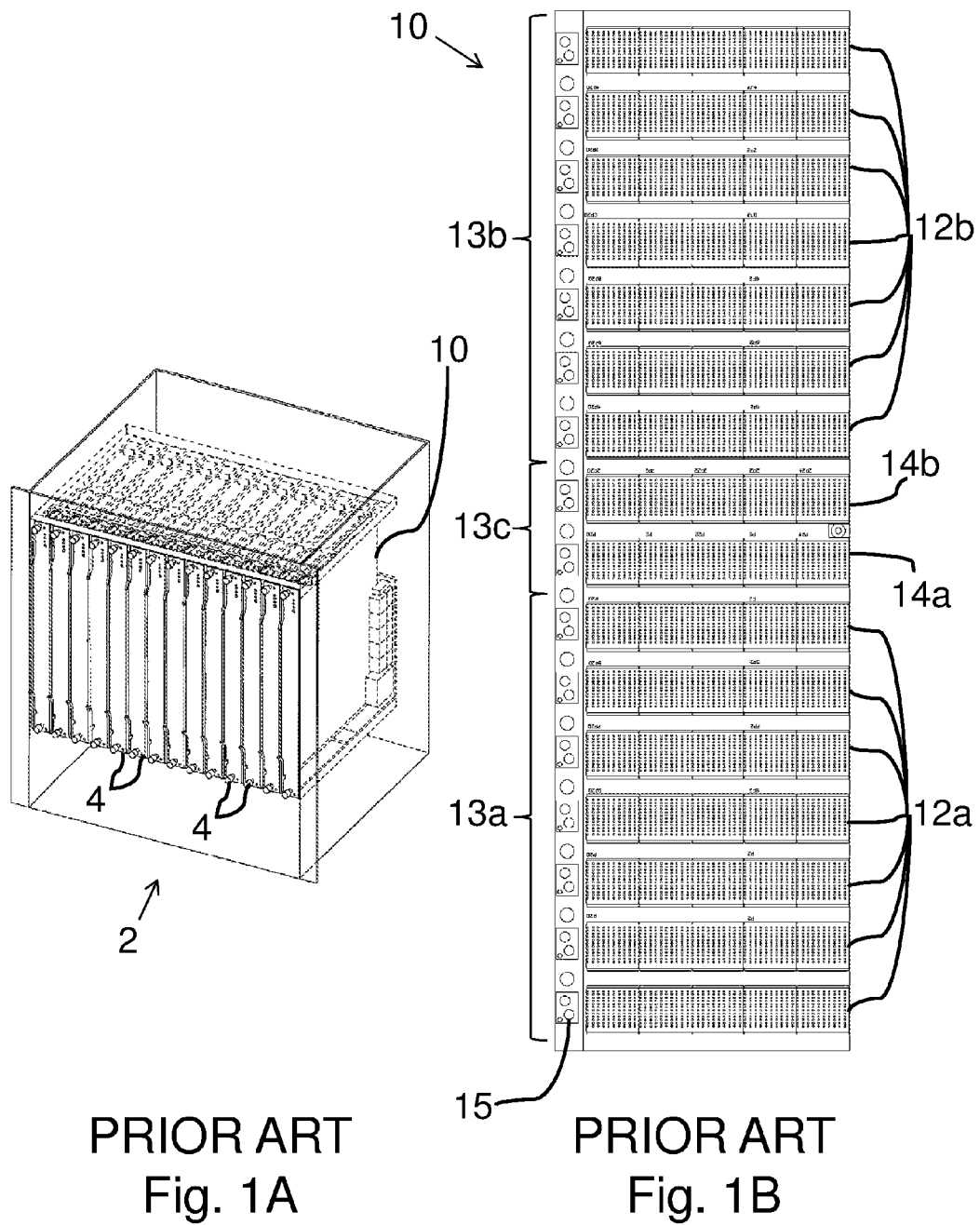
PRIOR ART
Fig. 1A
PRIOR ART
Fig. 1B

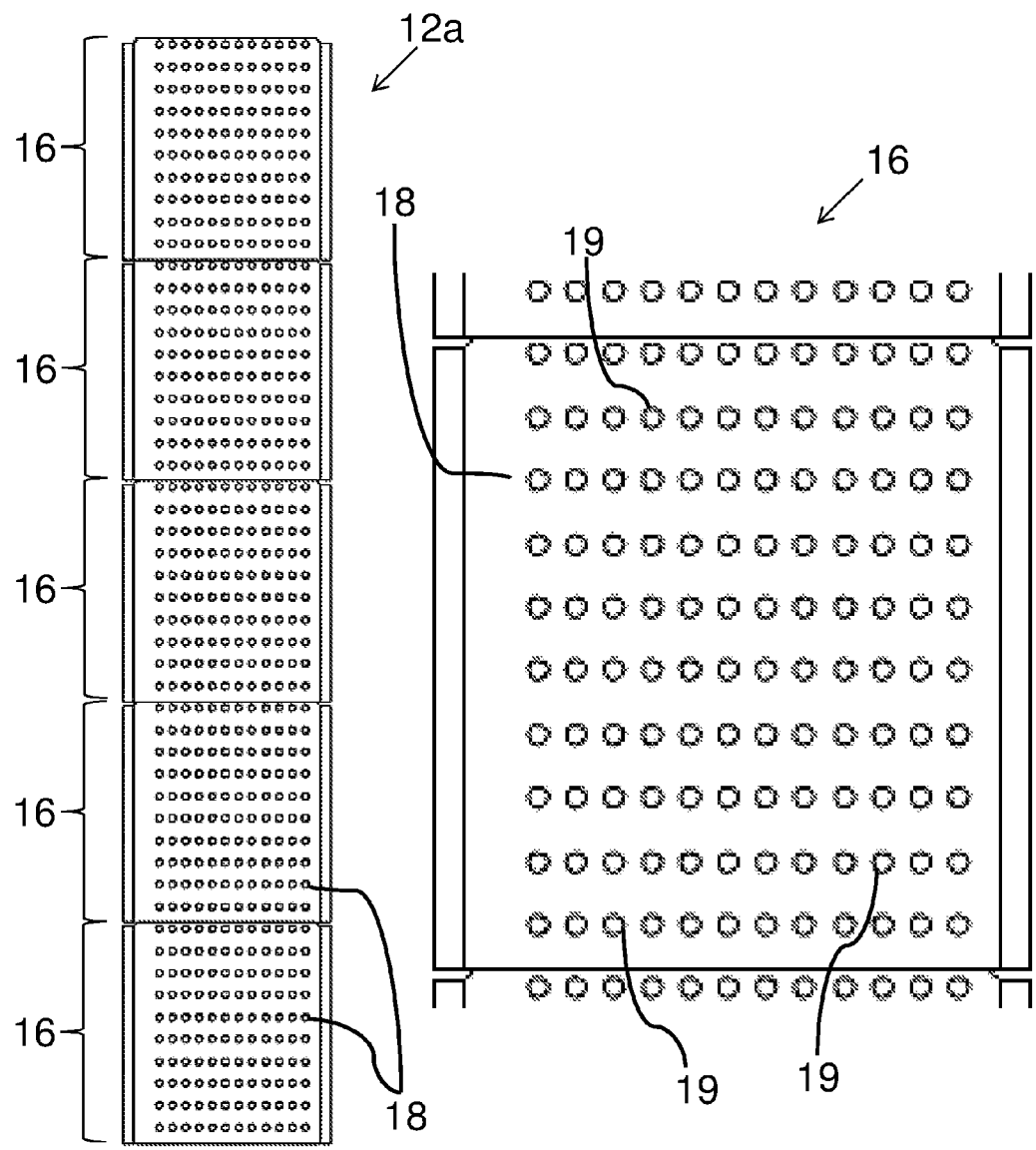
PRIOR ART
Fig. 1C
PRIOR ART
Fig. 1D

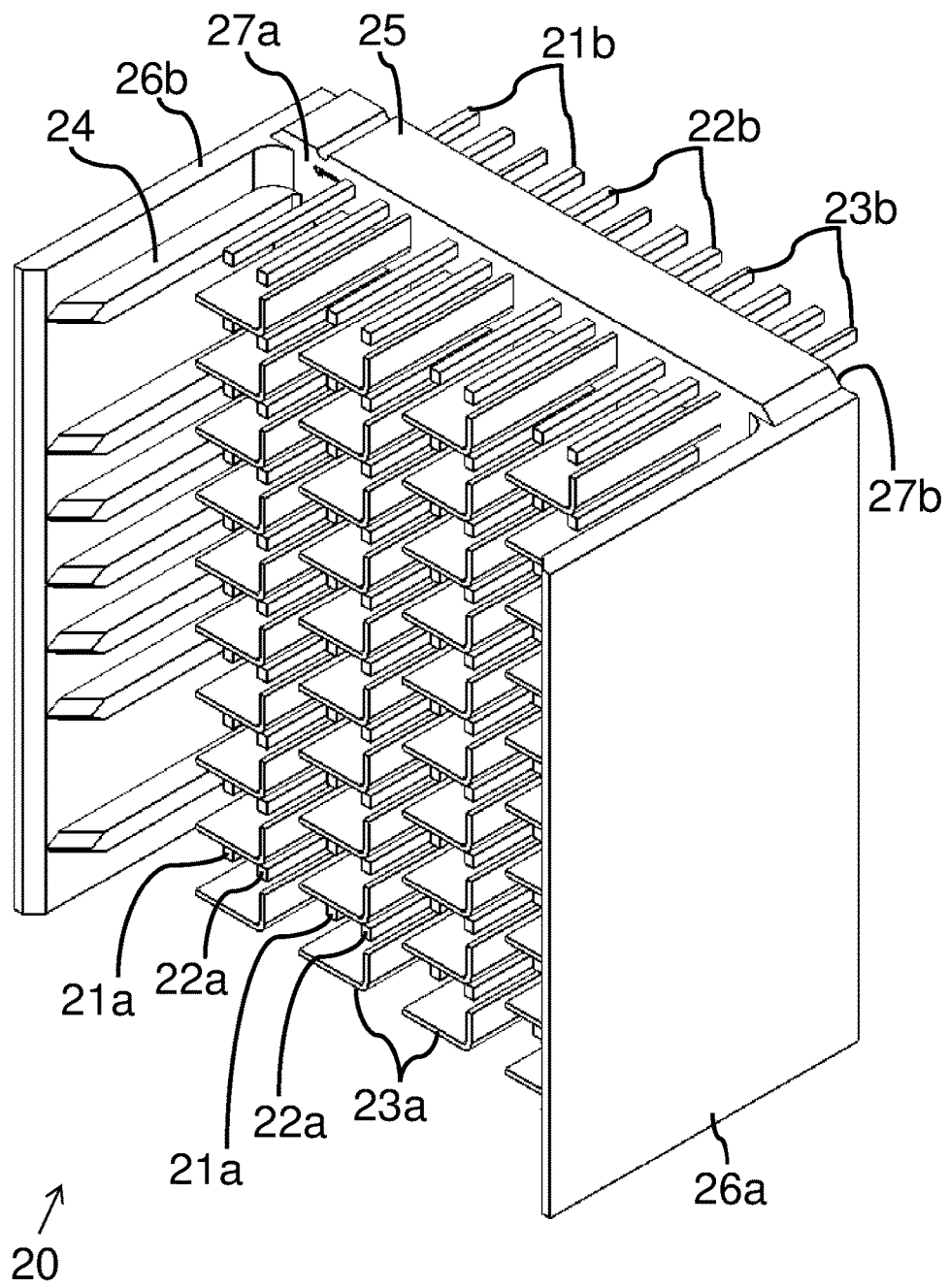
PRIOR ART
Fig. 2A

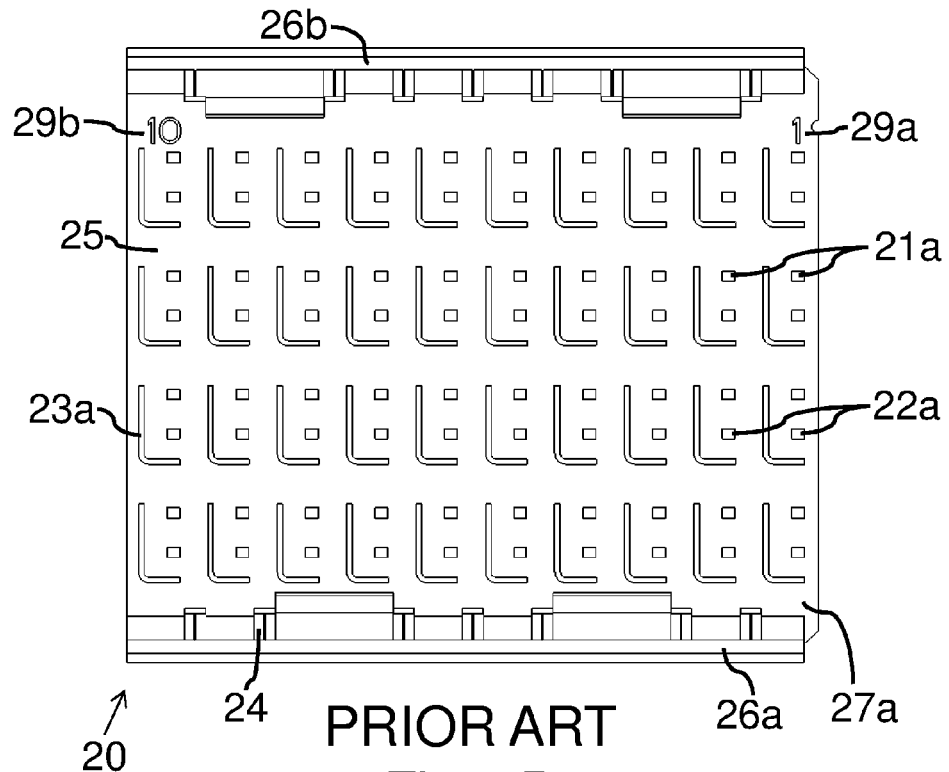
PRIOR ART
Fig. 2B
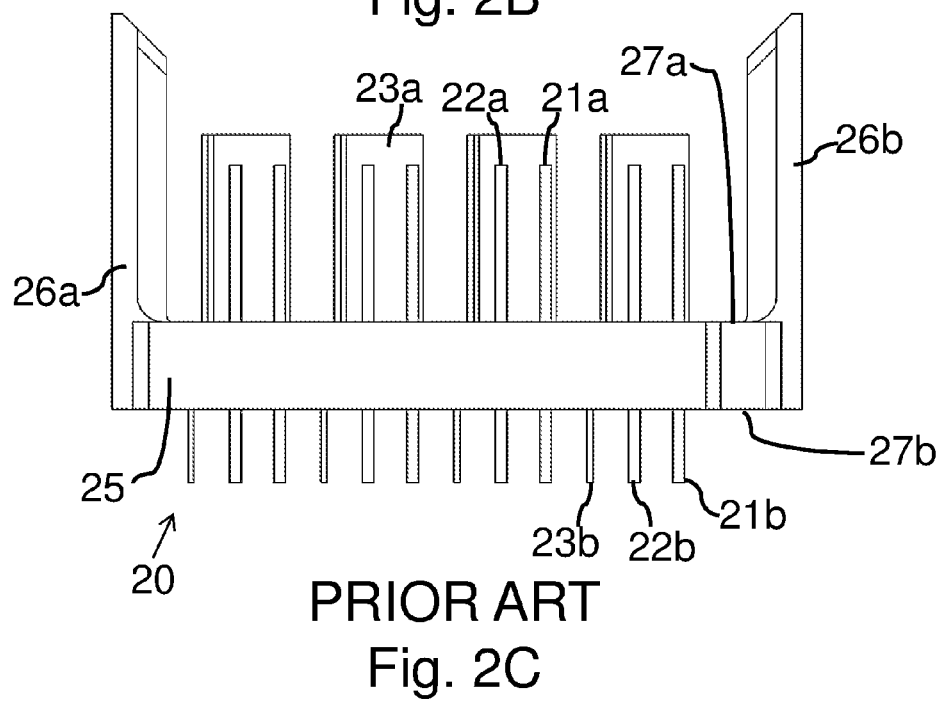
PRIOR ART
Fig. 2C

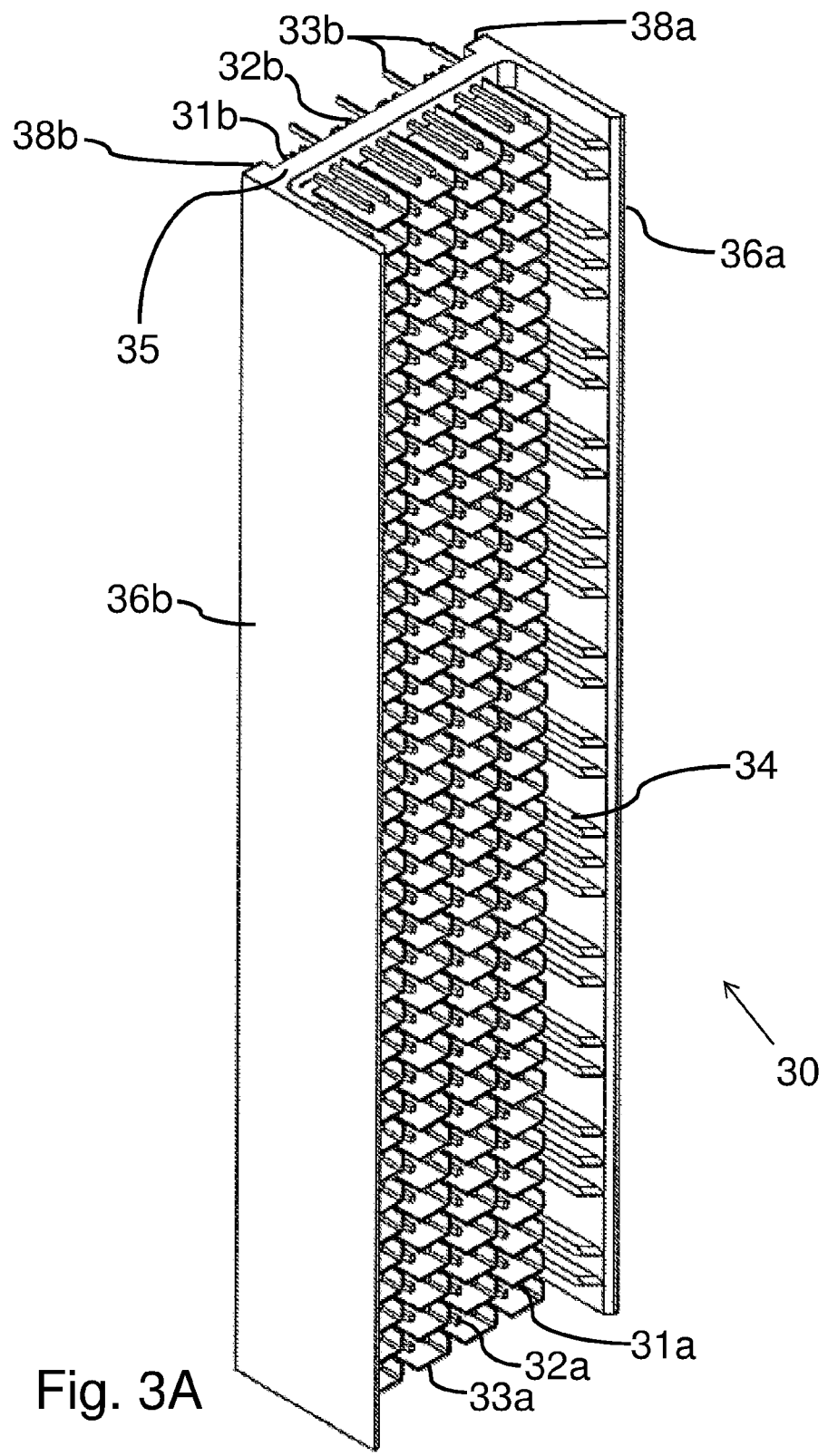
Fig. 3A

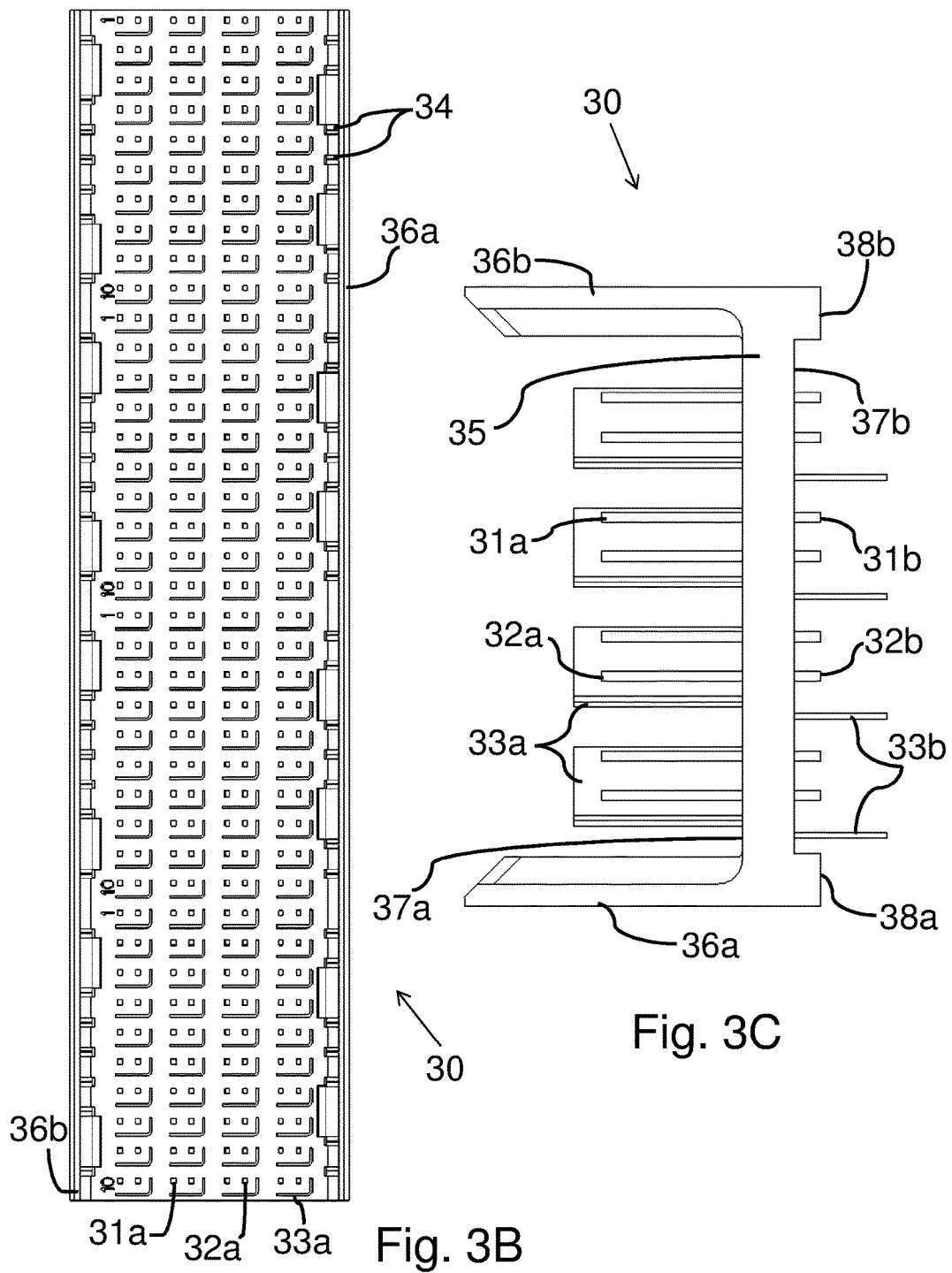

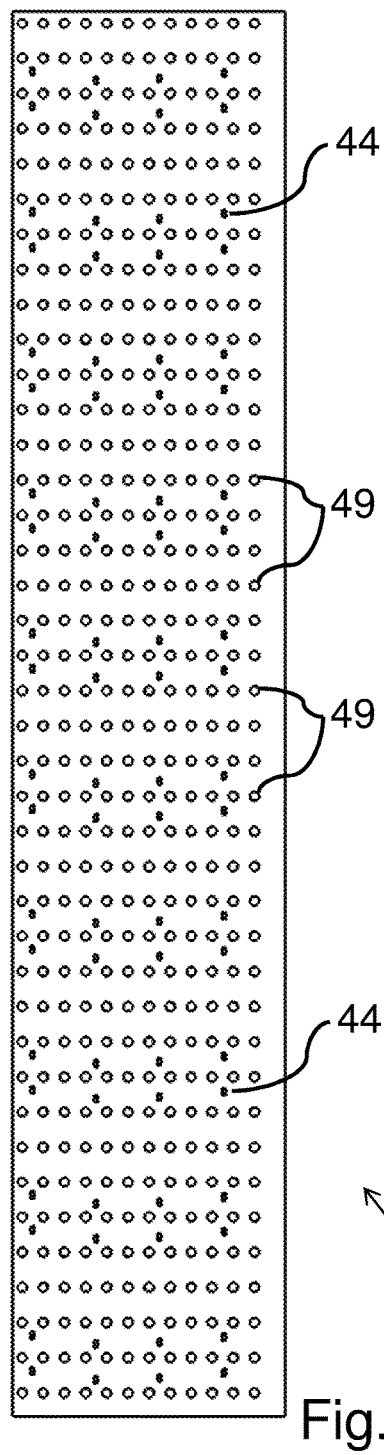
Fig. 4A
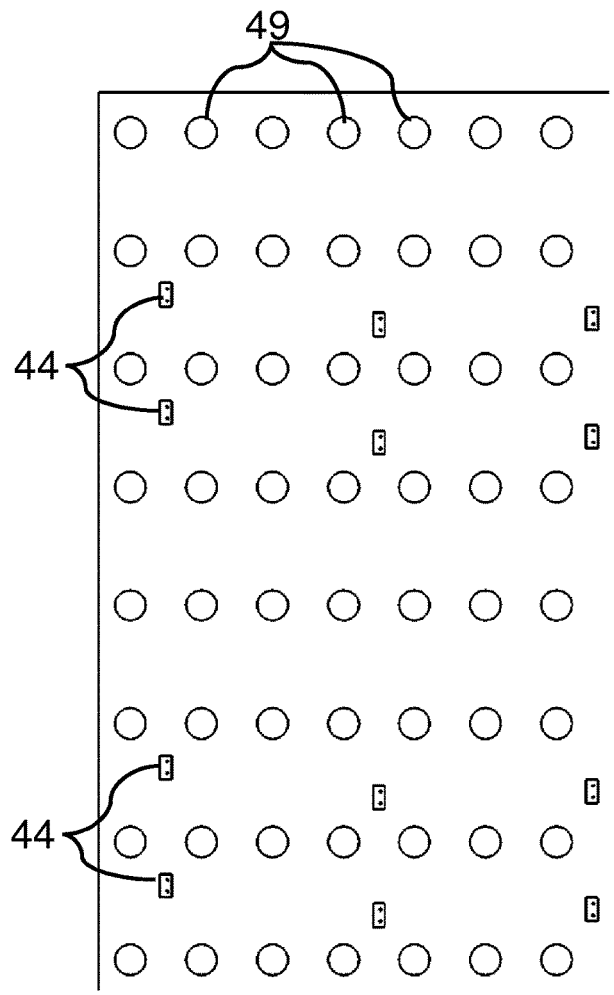
Fig. 4B
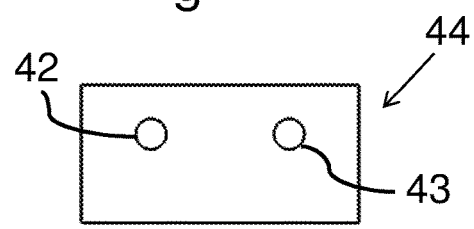
Fig. 4C

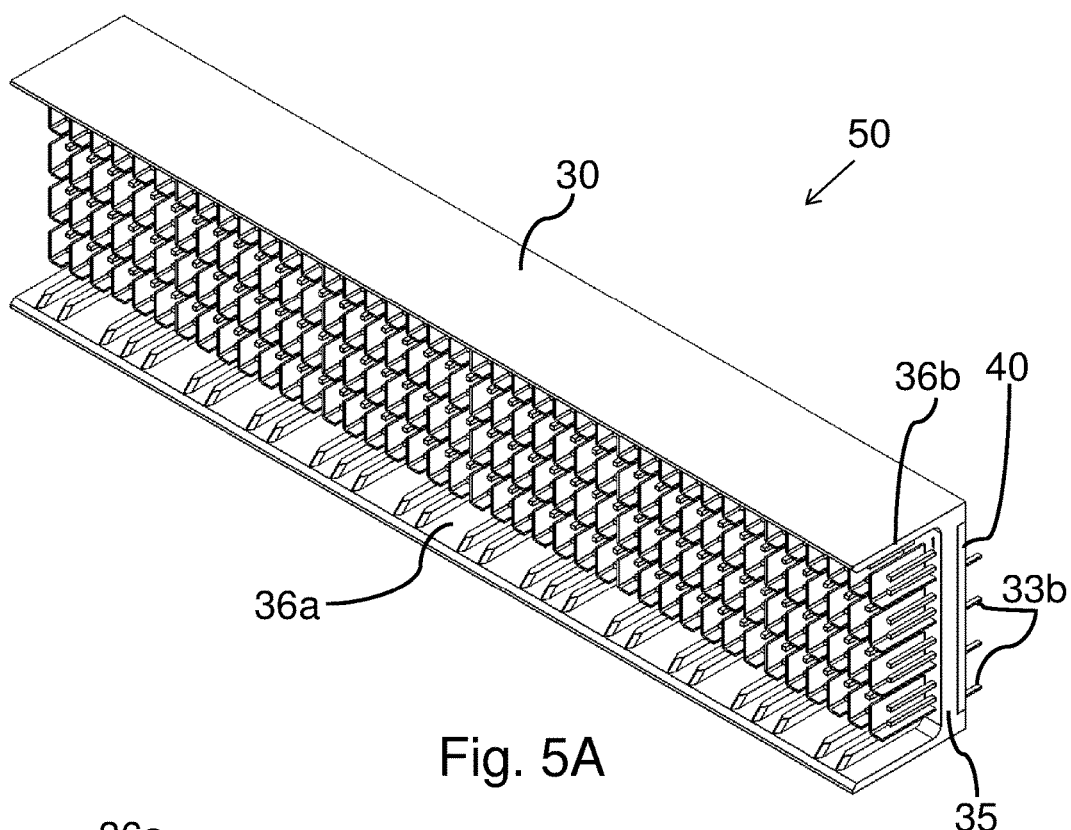
Fig. 5A
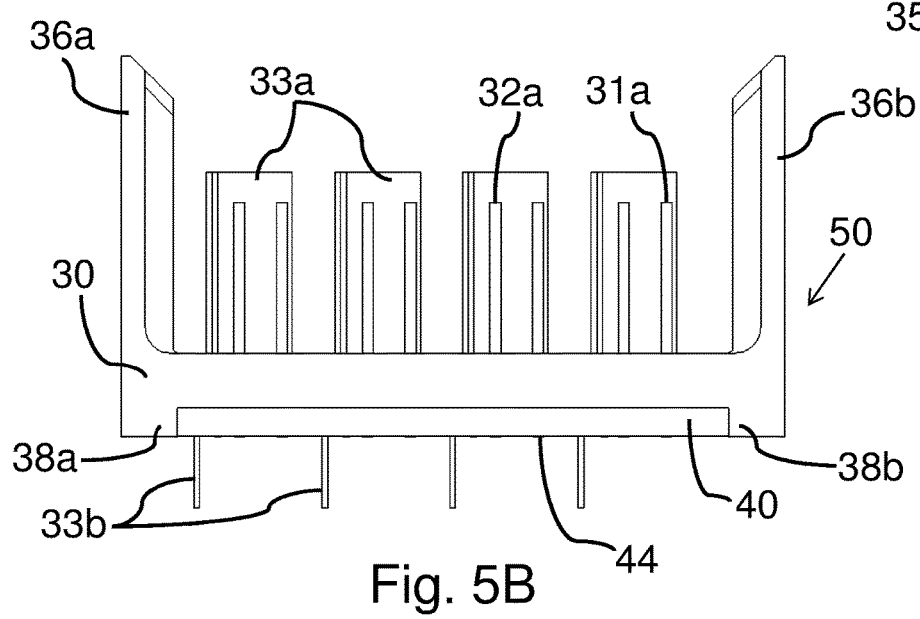
Fig. 5B

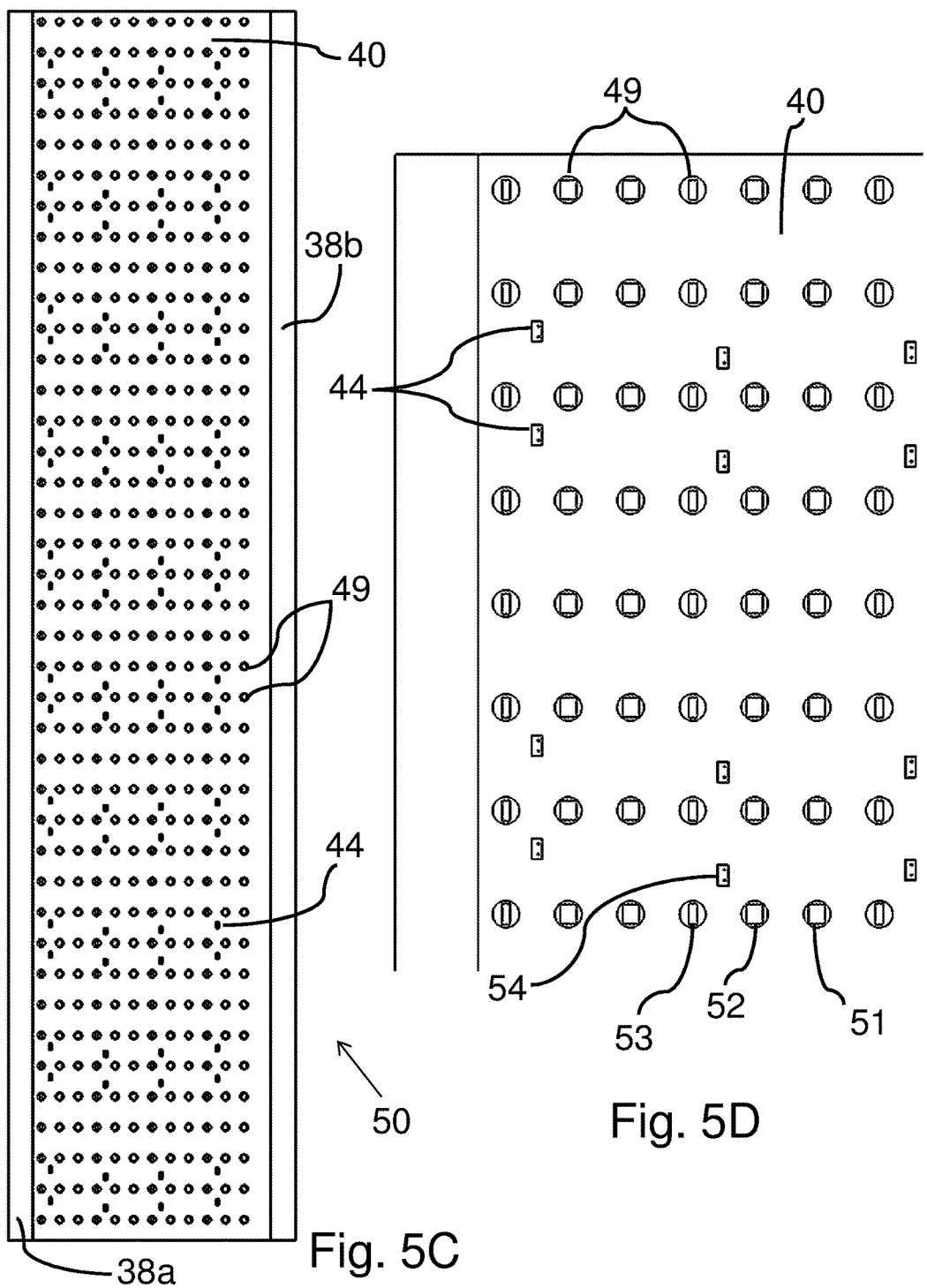
Fig. 5C
Fig. 5D

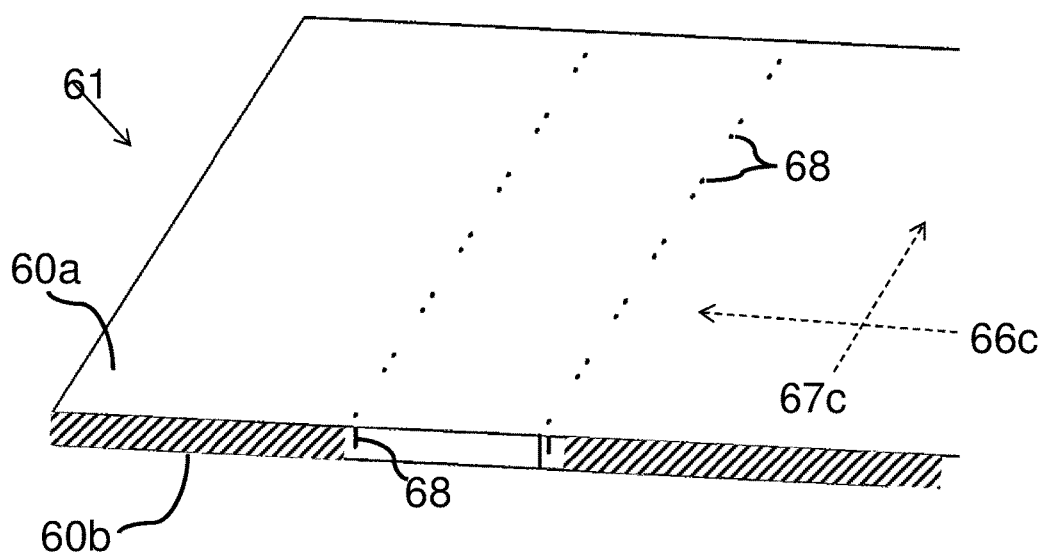
Fig. 6A
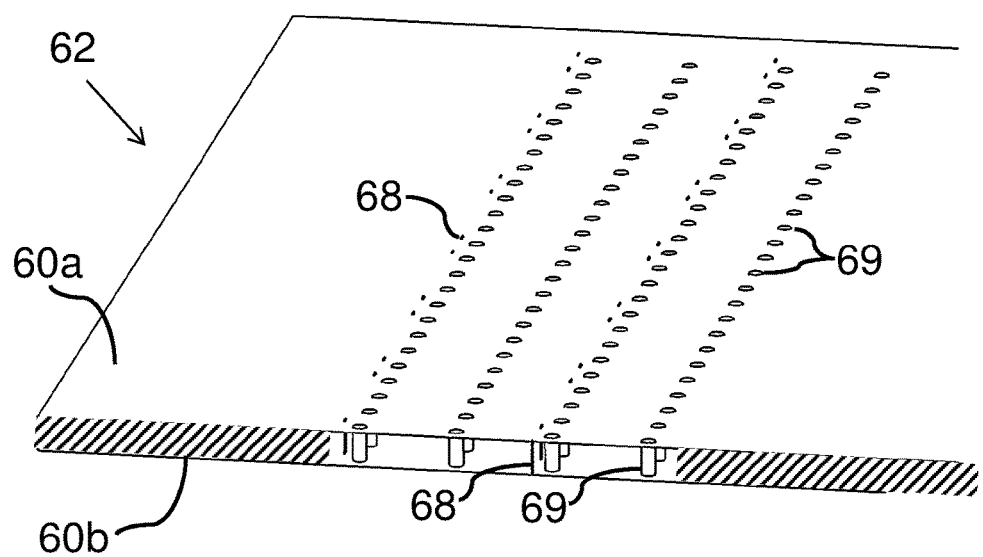
Fig. 6B

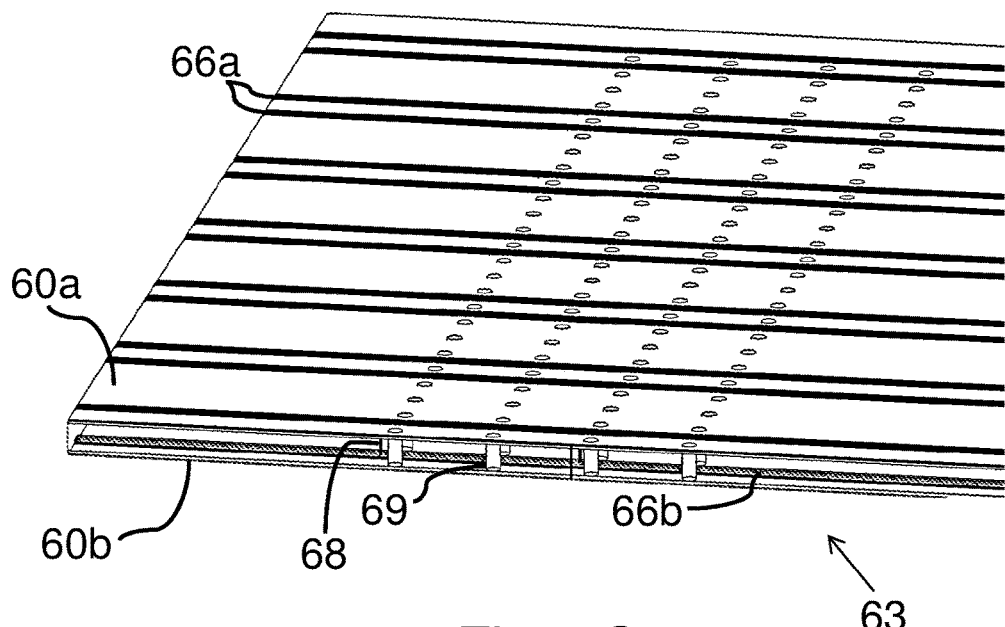
Fig. 6C
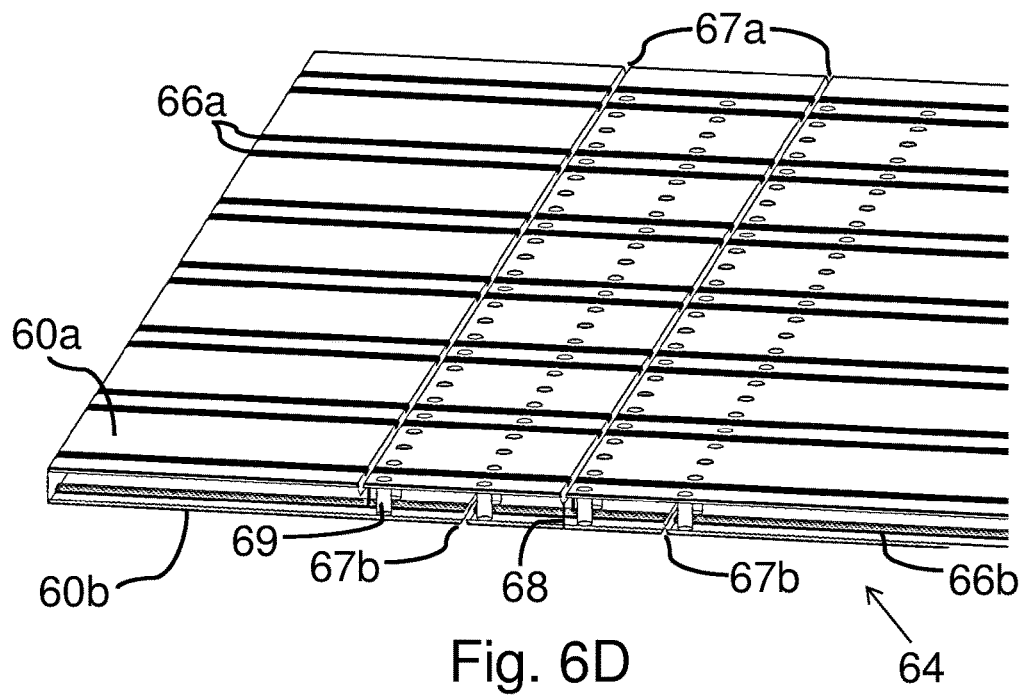
Fig. 6D

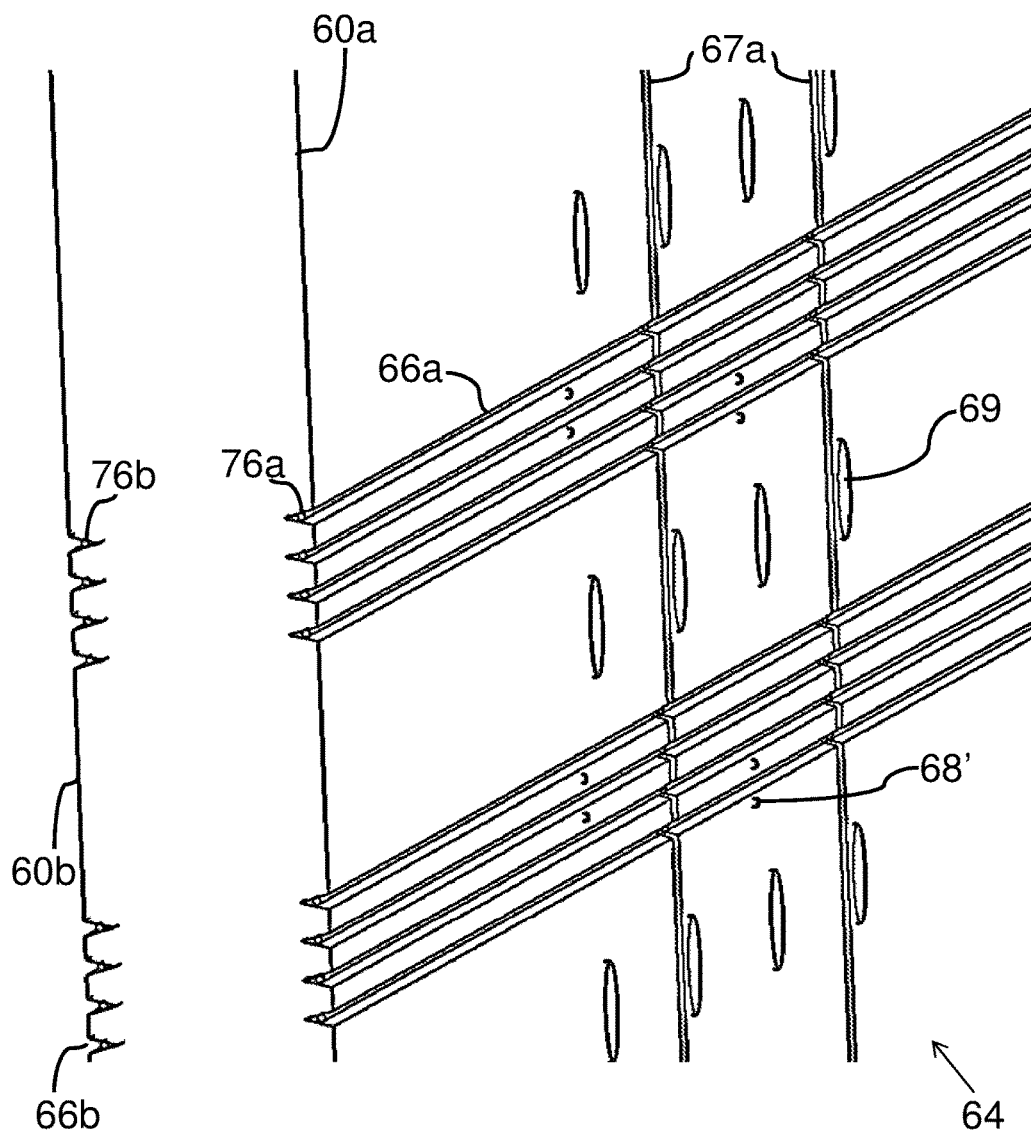
Fig. 7A

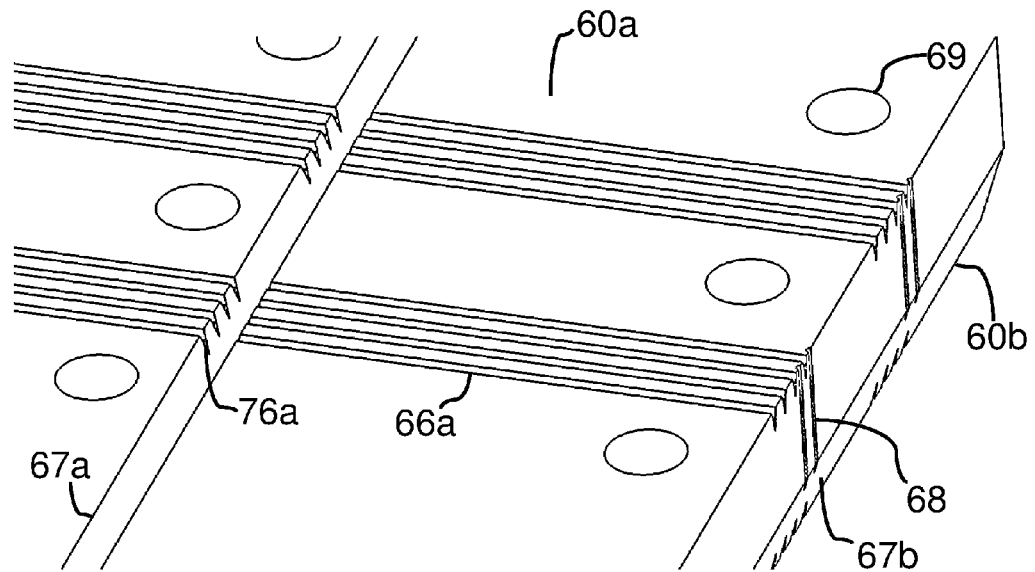
Fig. 7B
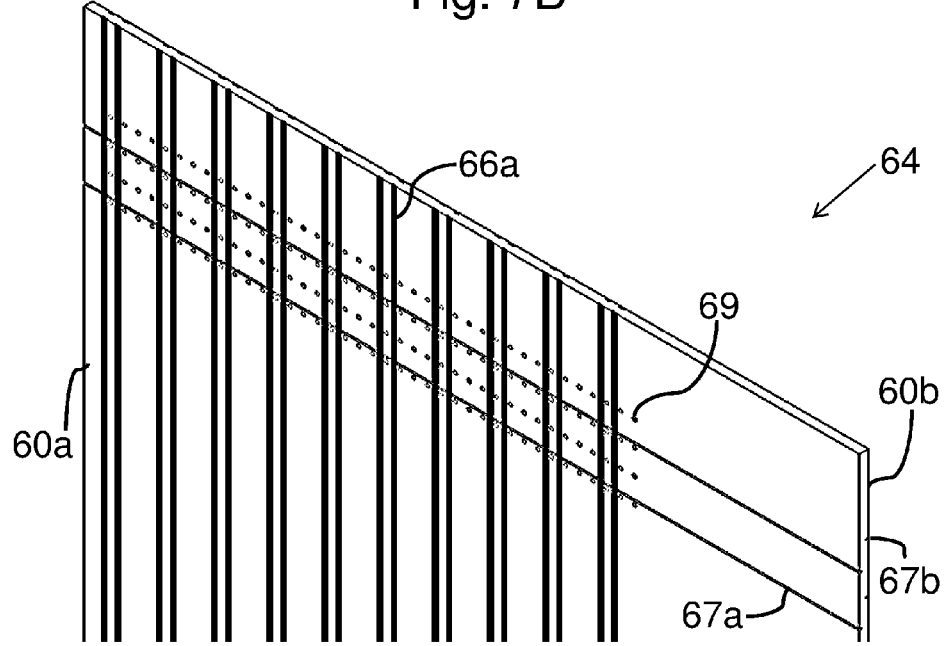
Fig. 7C

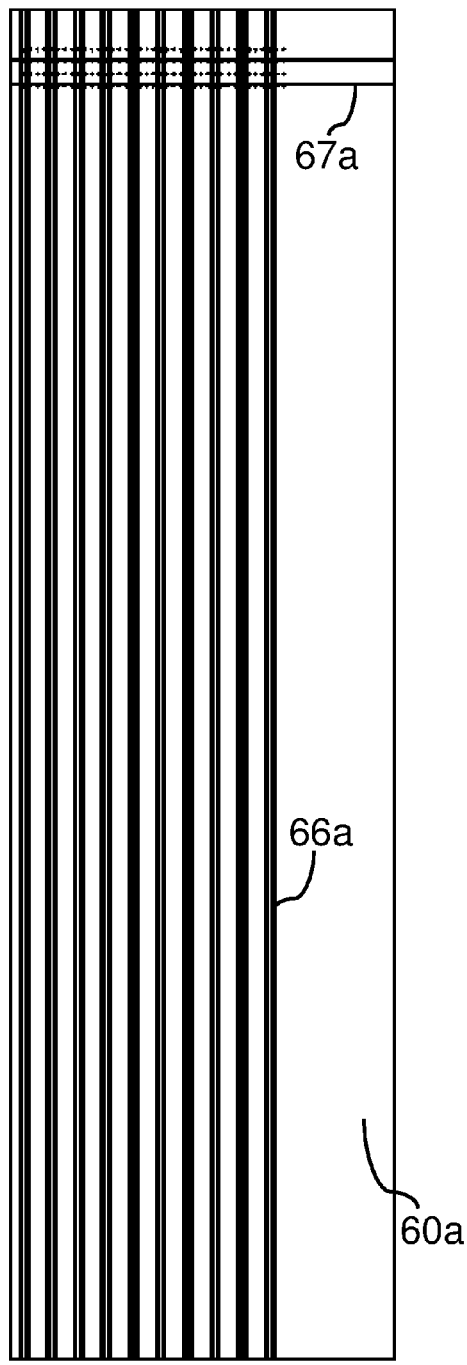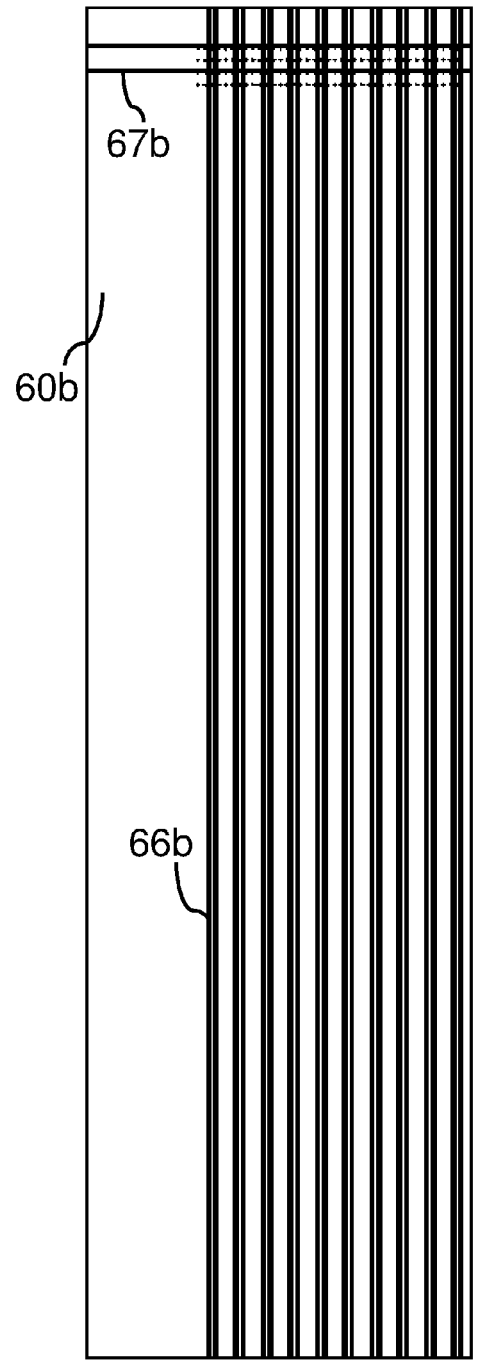
Fig. 7D    Fig. 7E

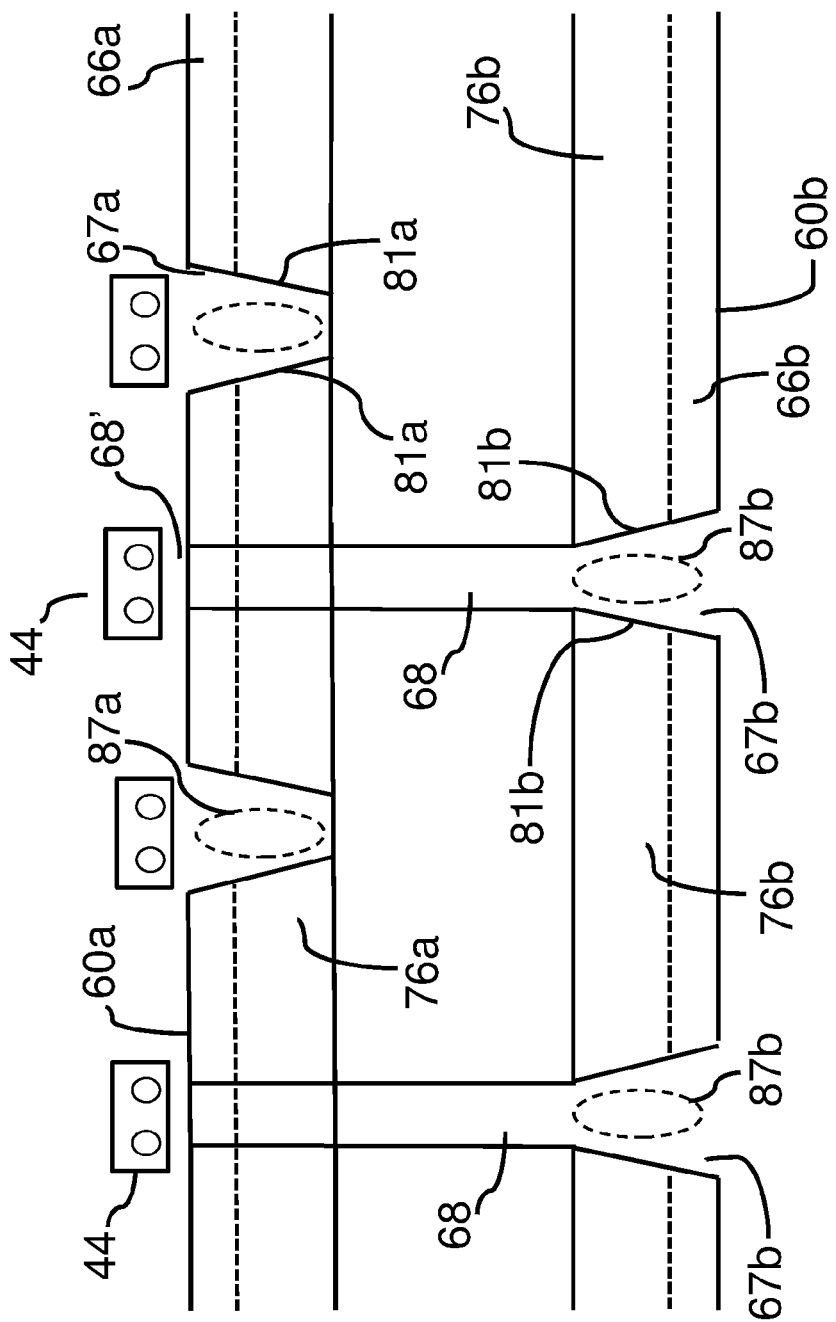
Fig. 8A

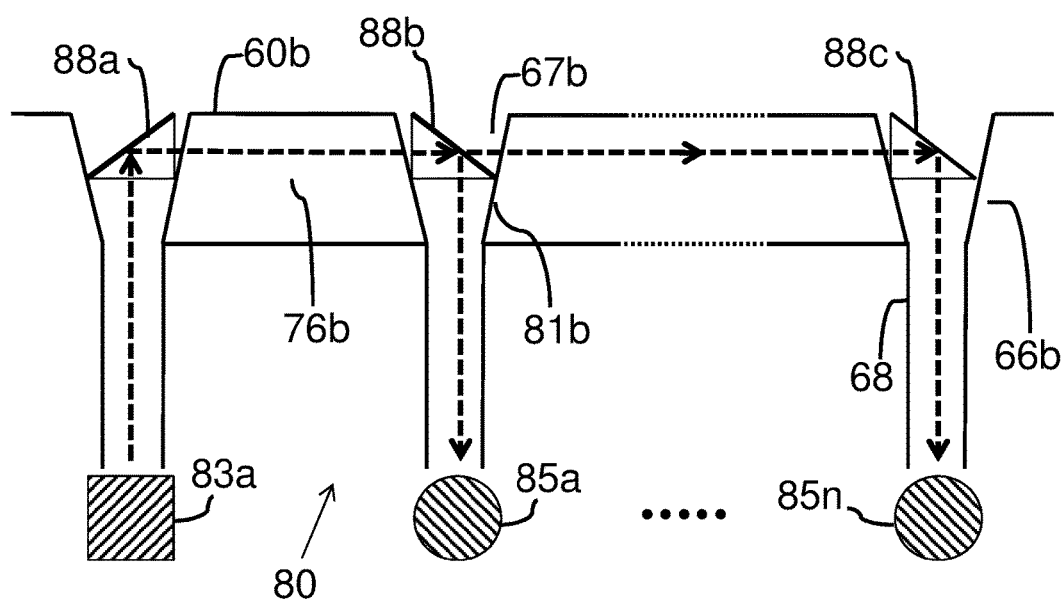
Fig. 8B
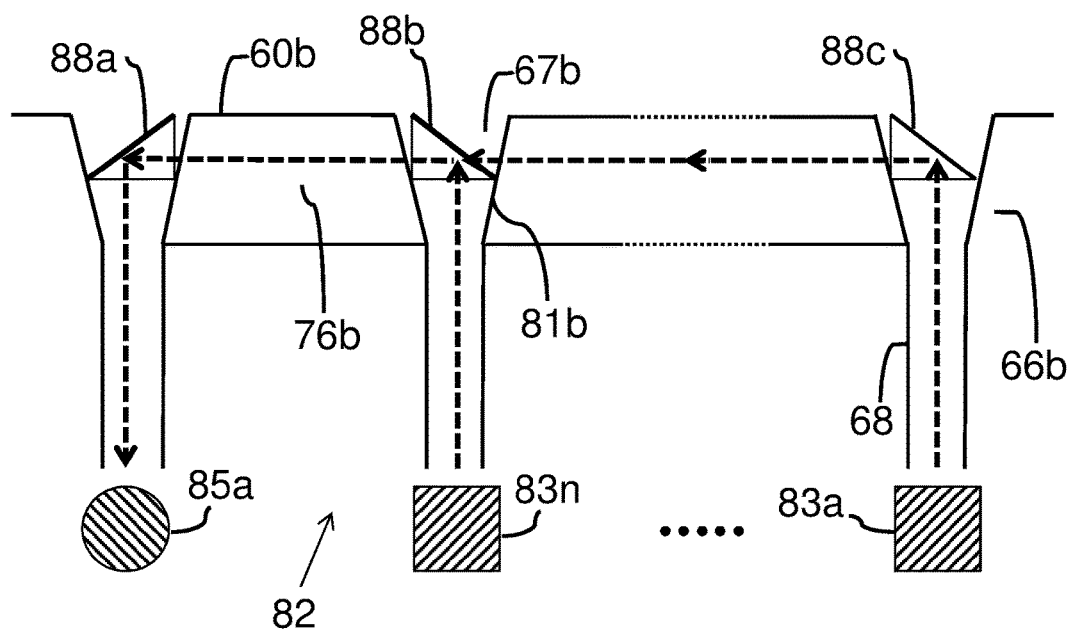
Fig. 8C

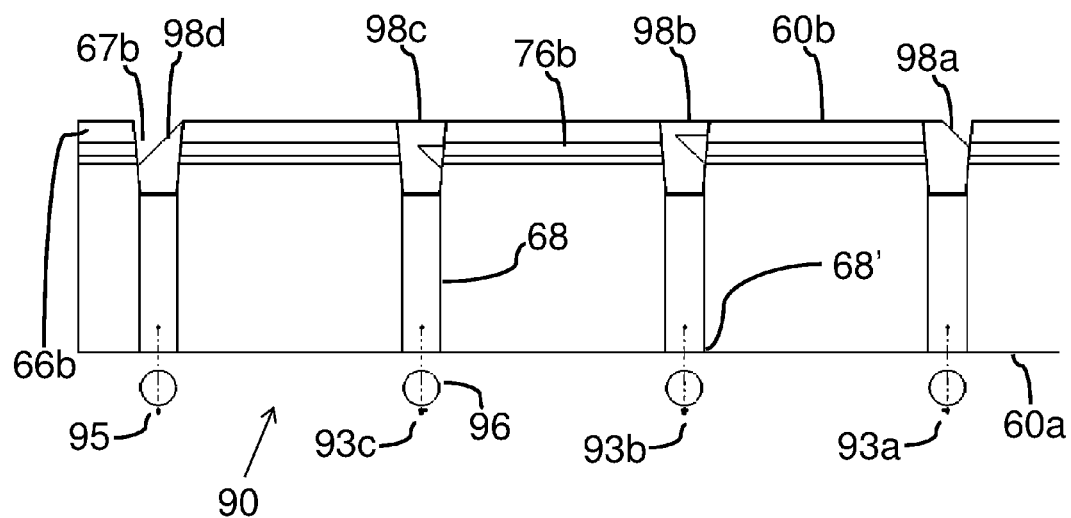
Fig. 9A
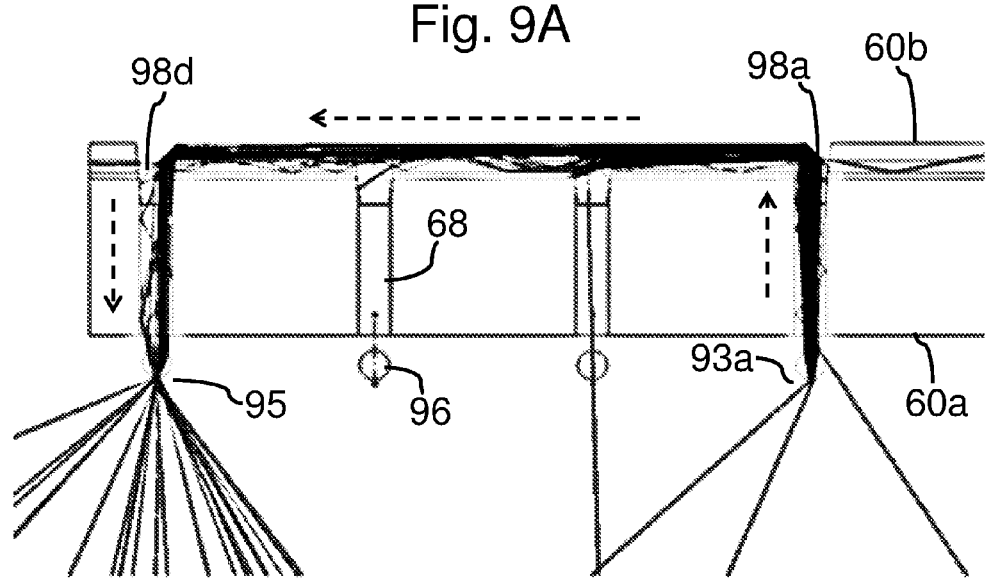
Fig. 9B

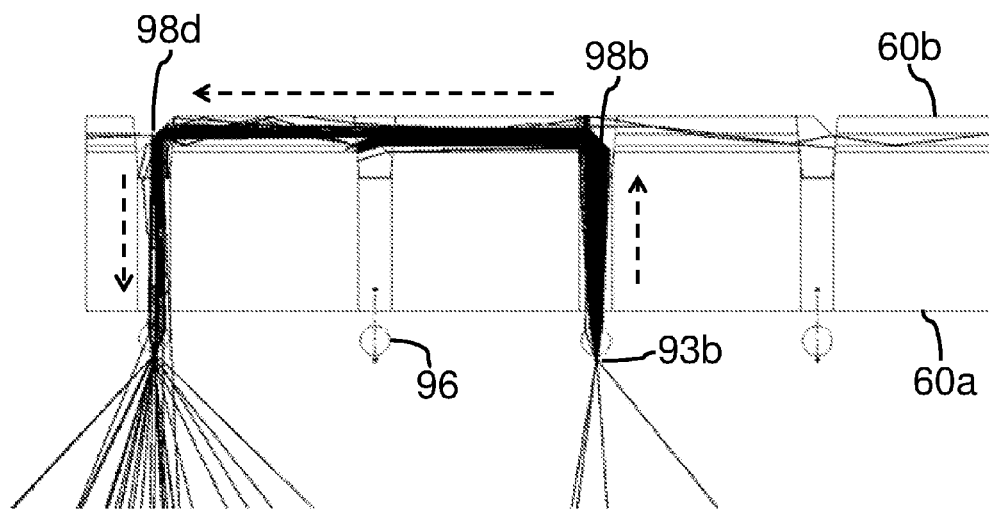
Fig. 9C
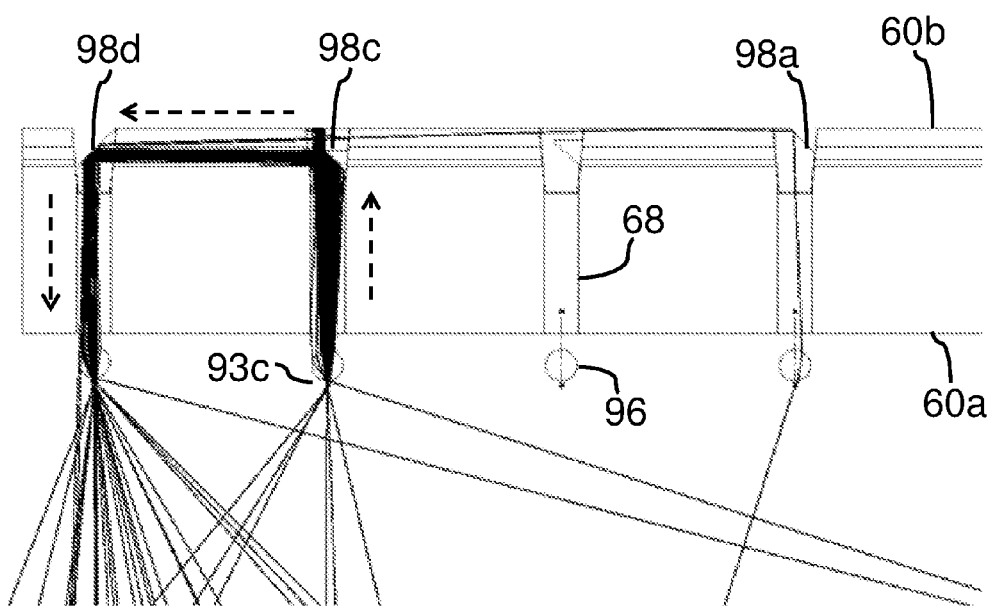
Fig. 9D

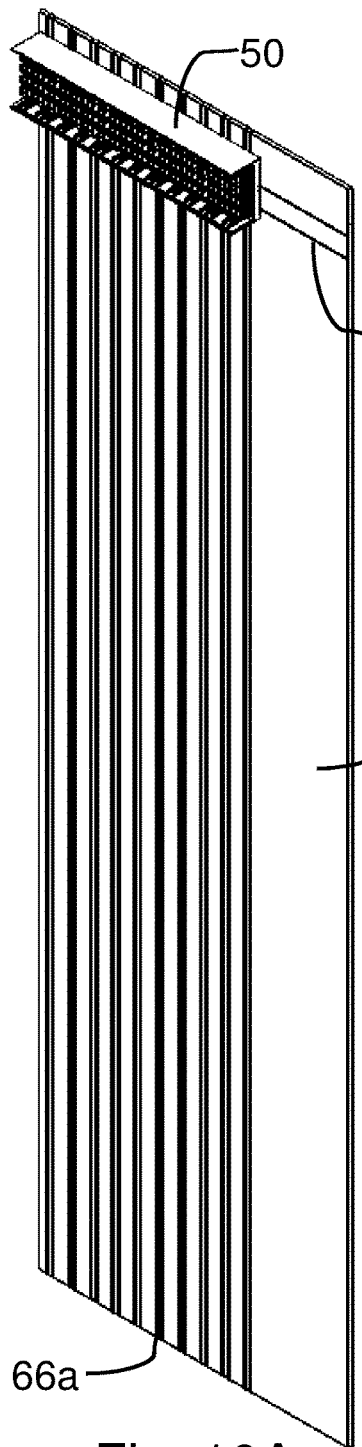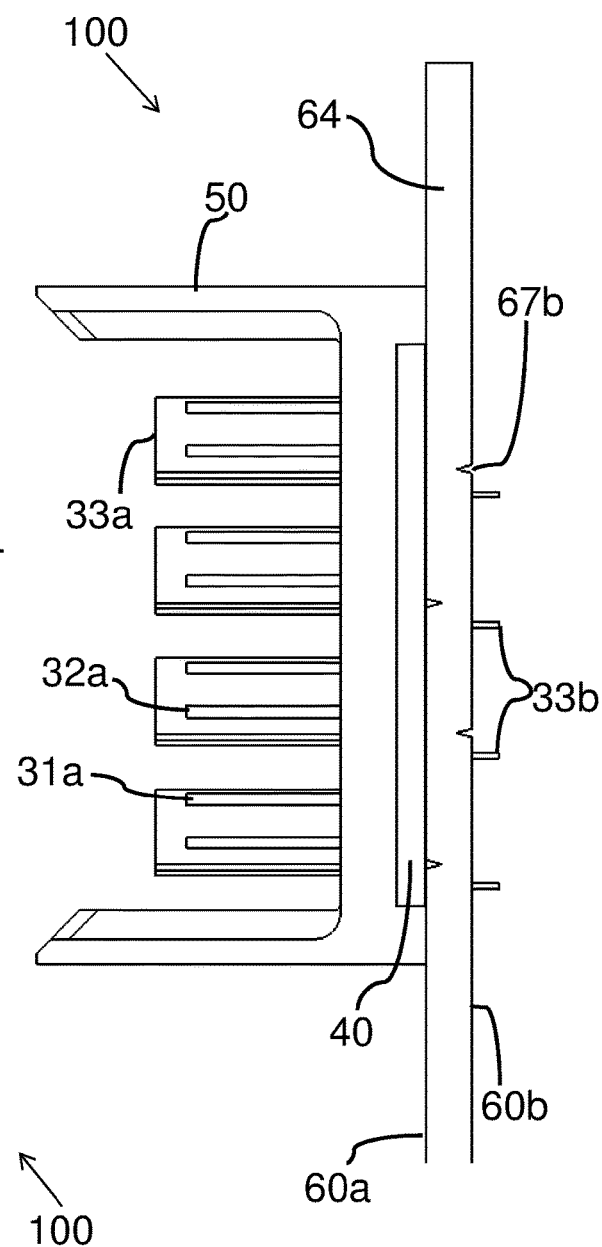
Fig. 10A  Fig. 10B

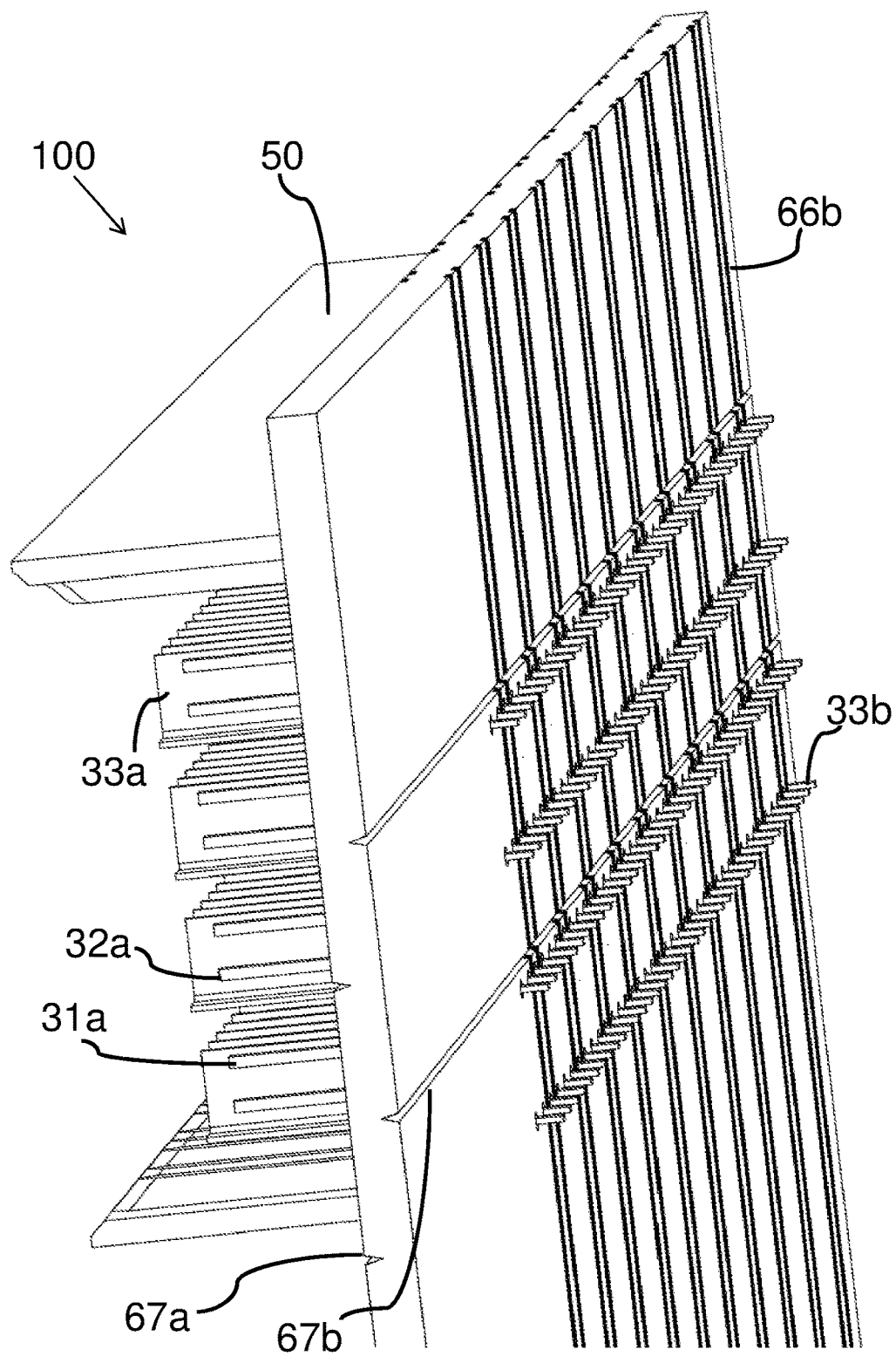
Fig. 10C

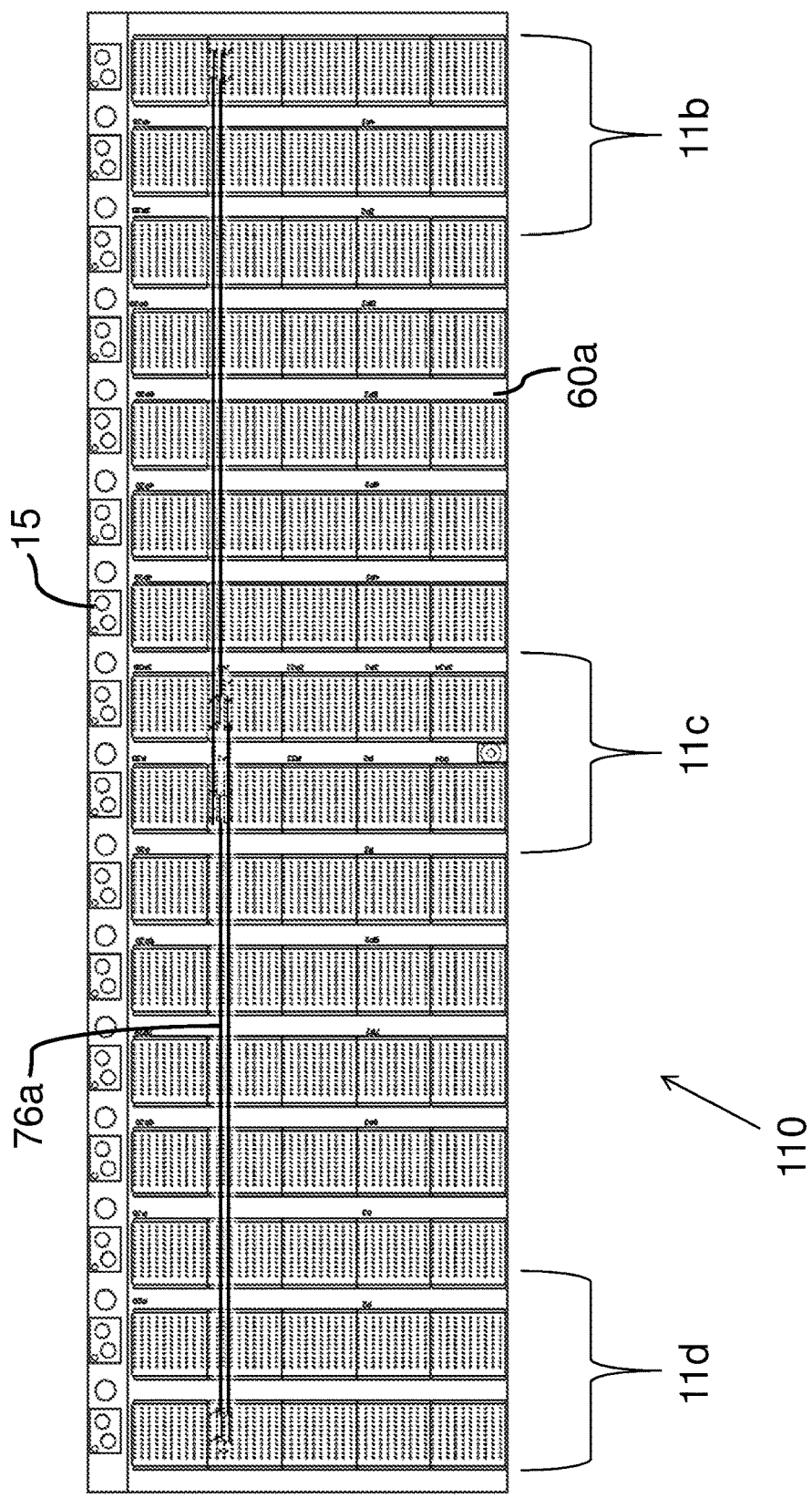
Fig. 11A

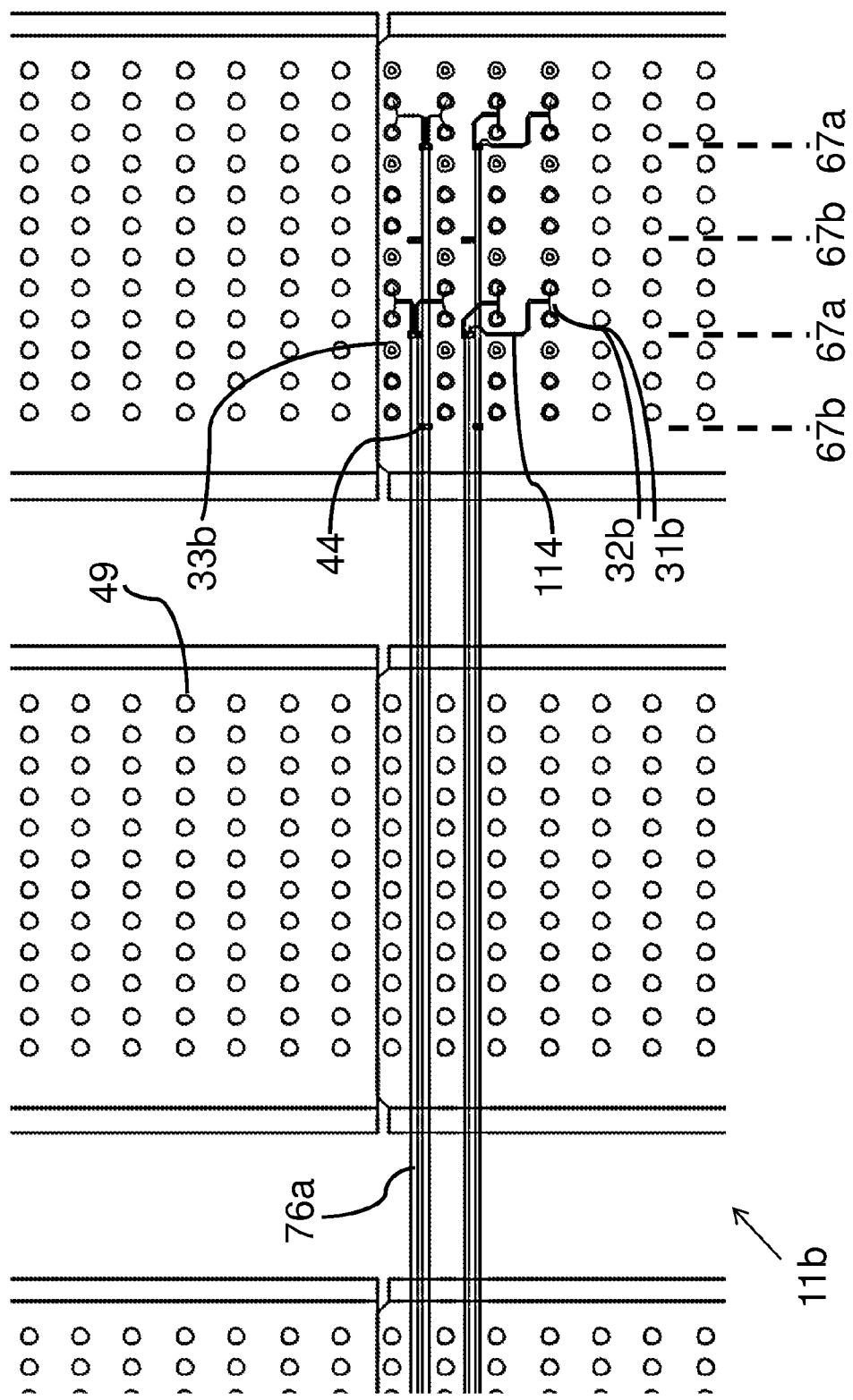
Fig. 11B

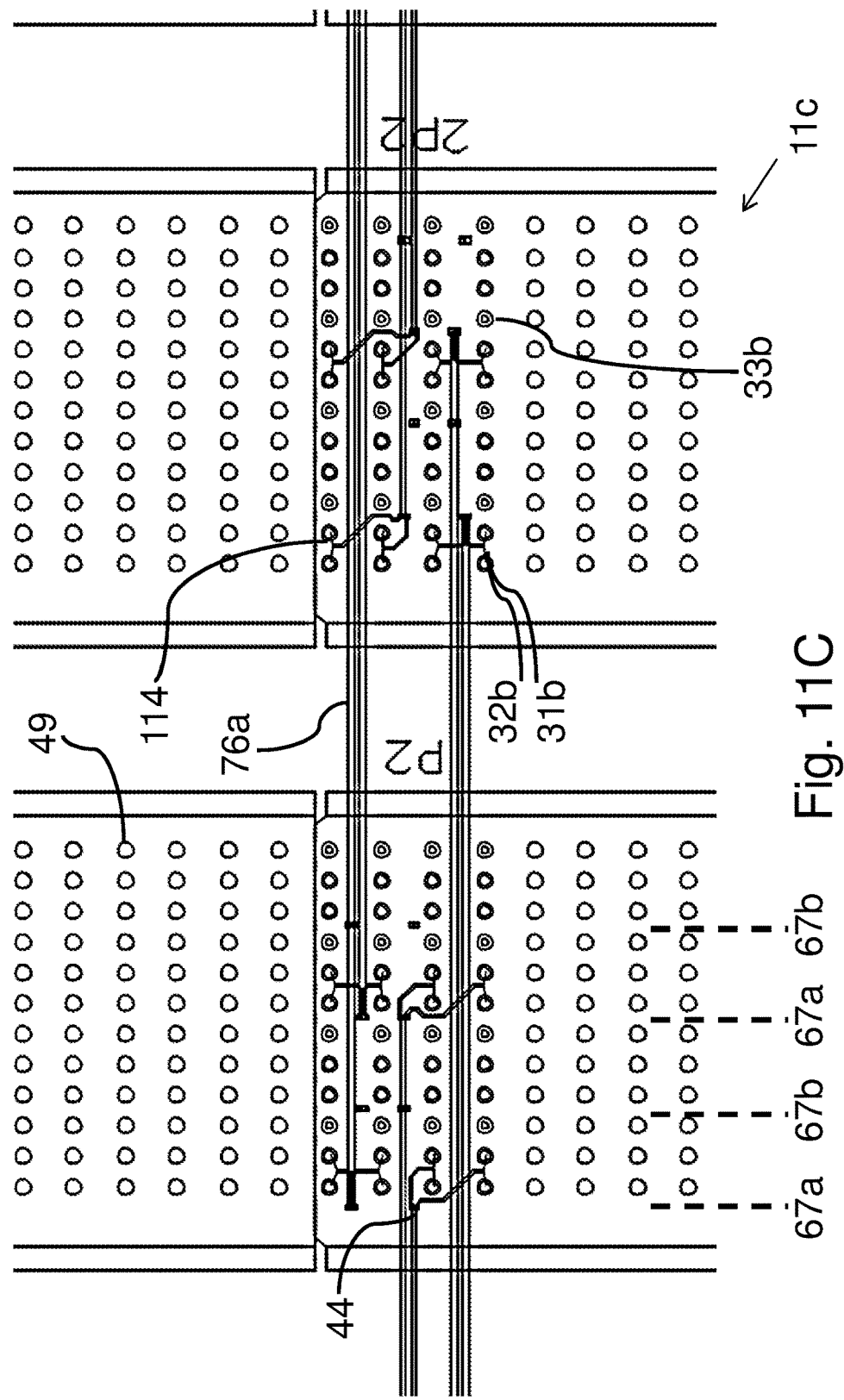
Fig. 11C

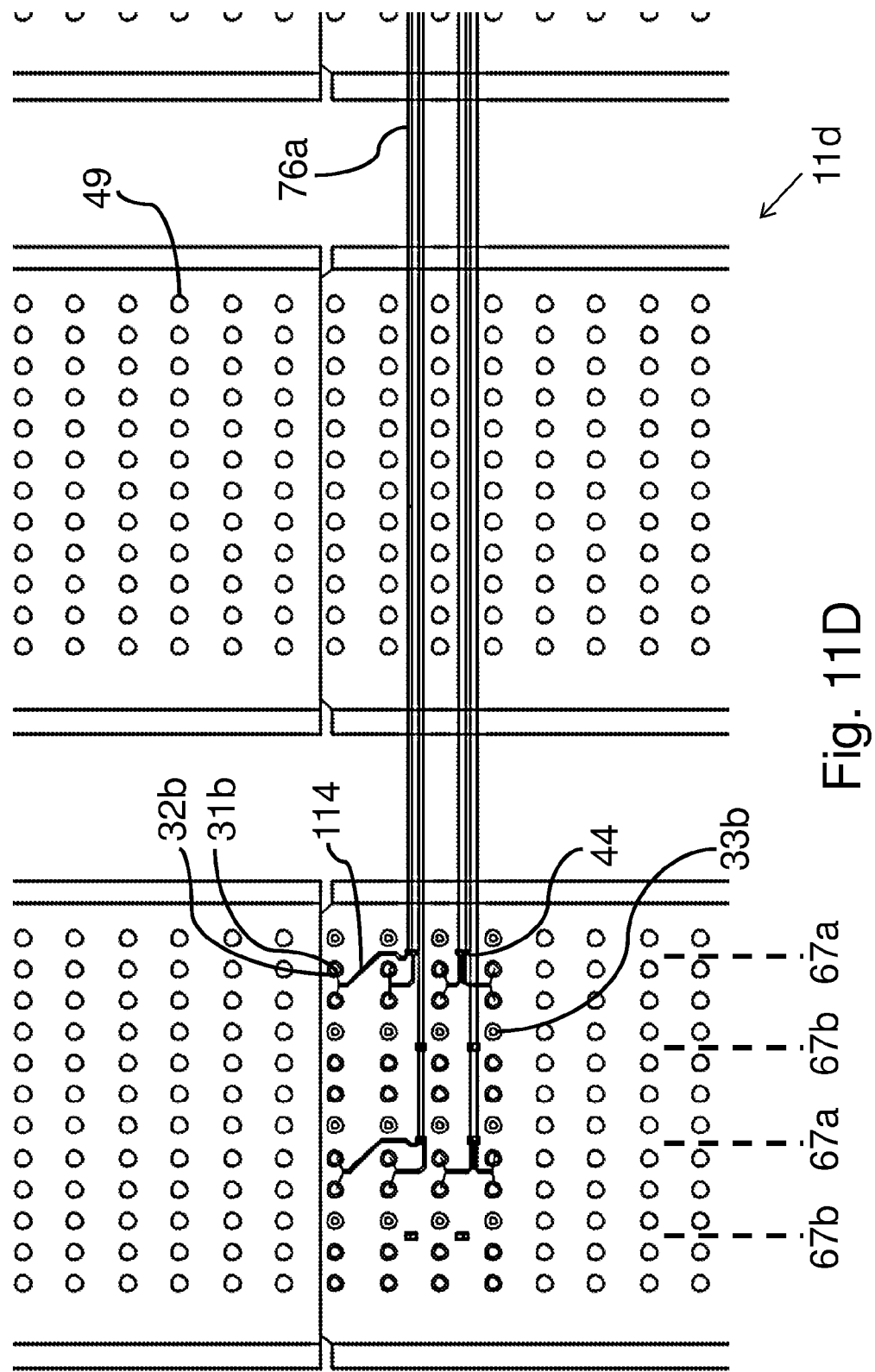
Fig. 11D

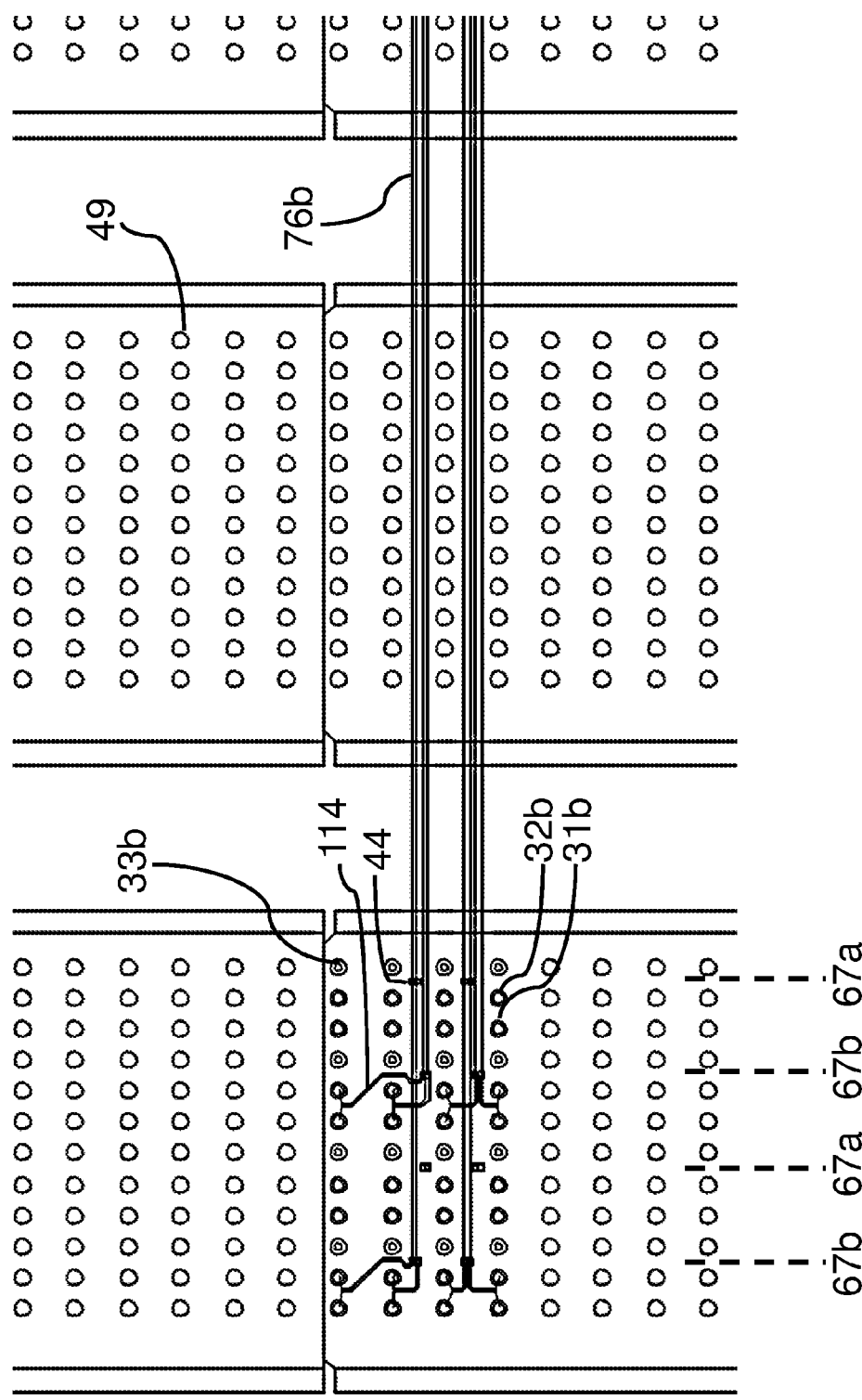
Fig. 11E

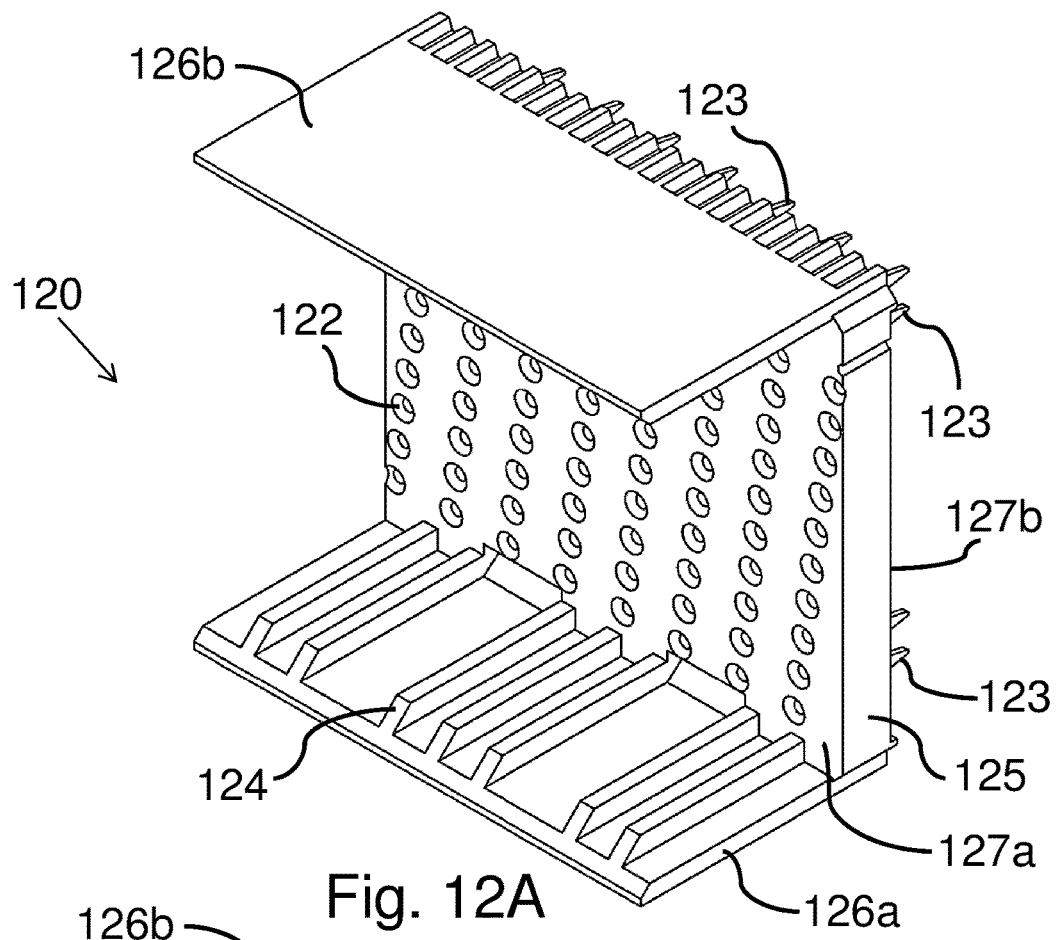
Fig. 12A
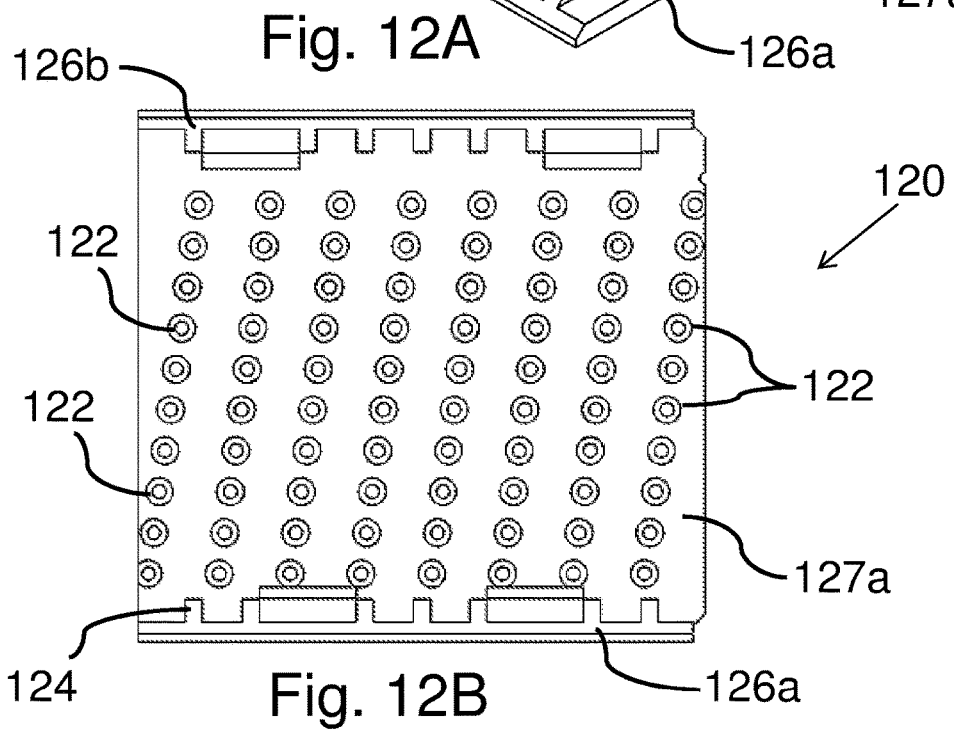
Fig. 12B

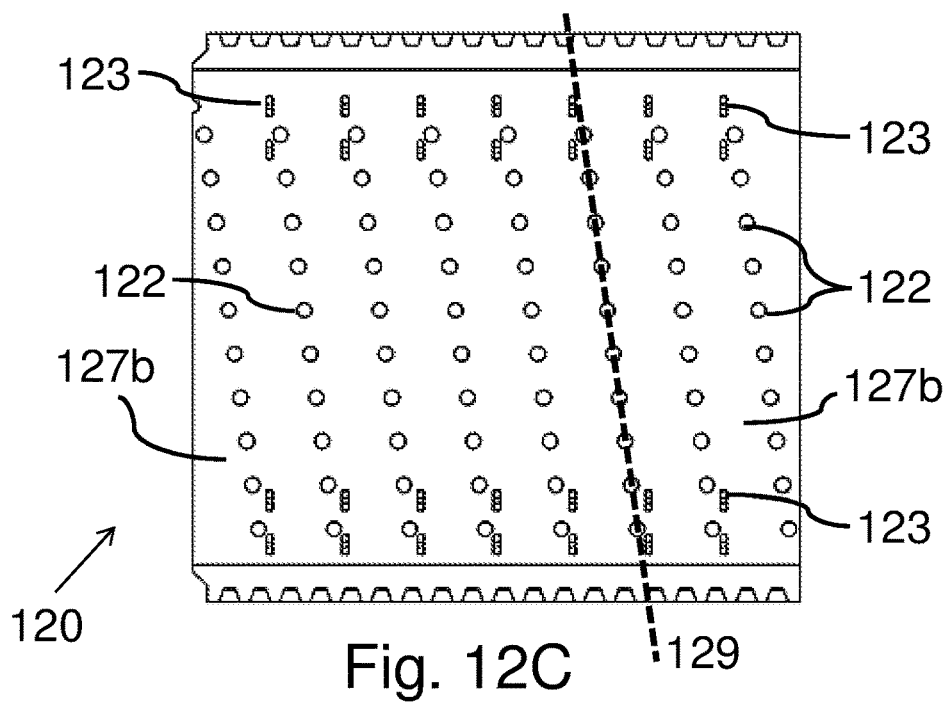
Fig. 12C
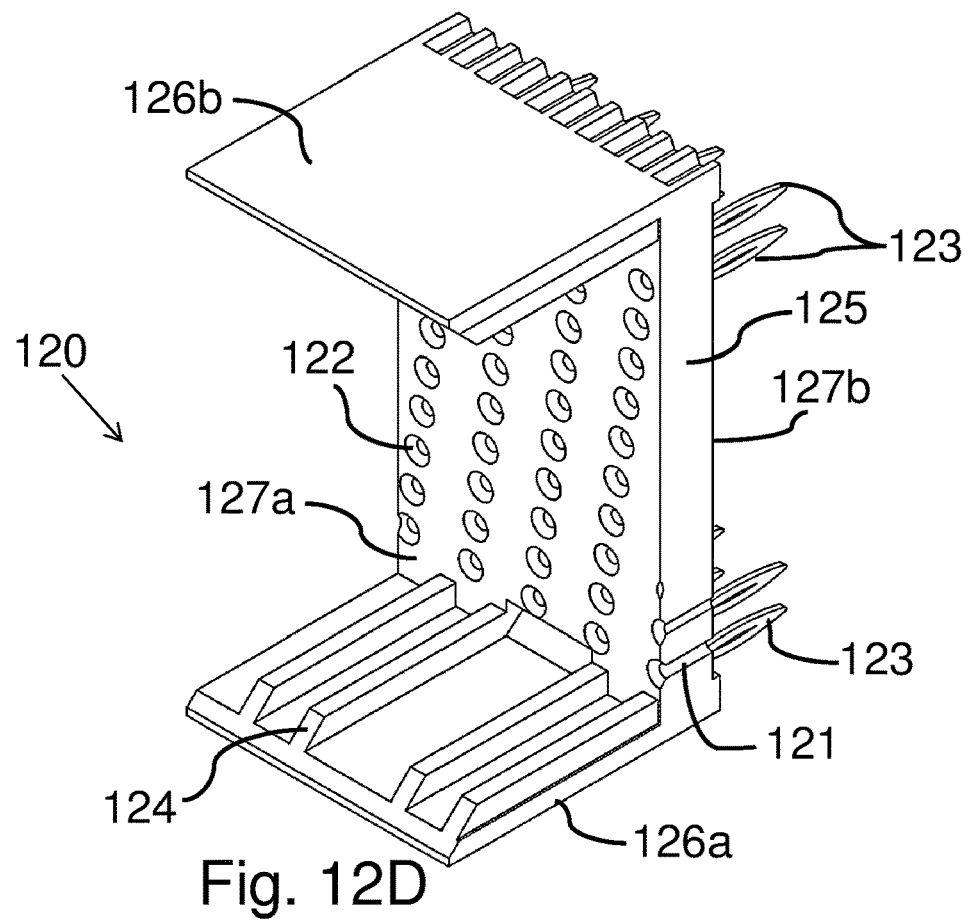
Fig. 12D

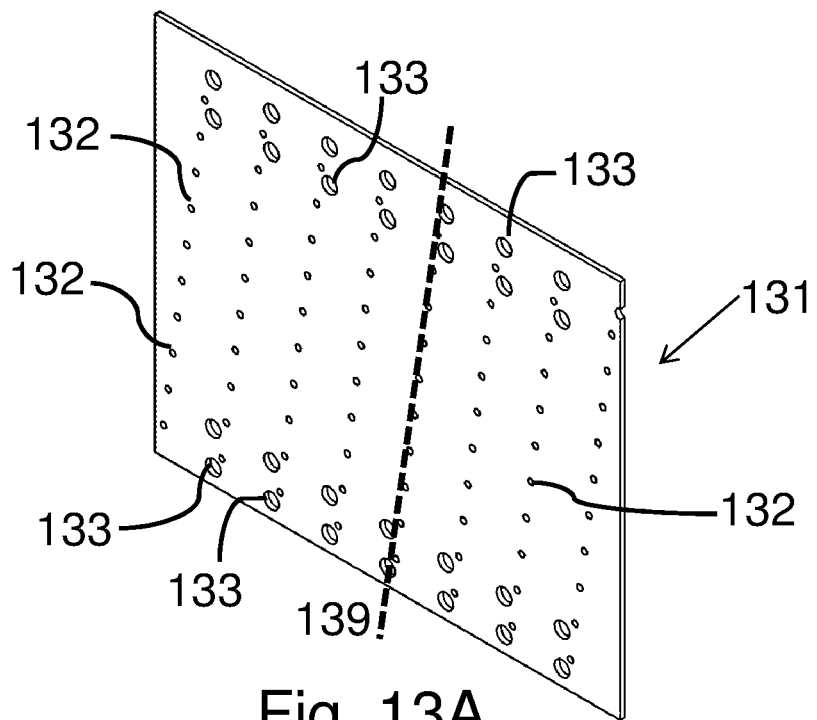
Fig. 13A
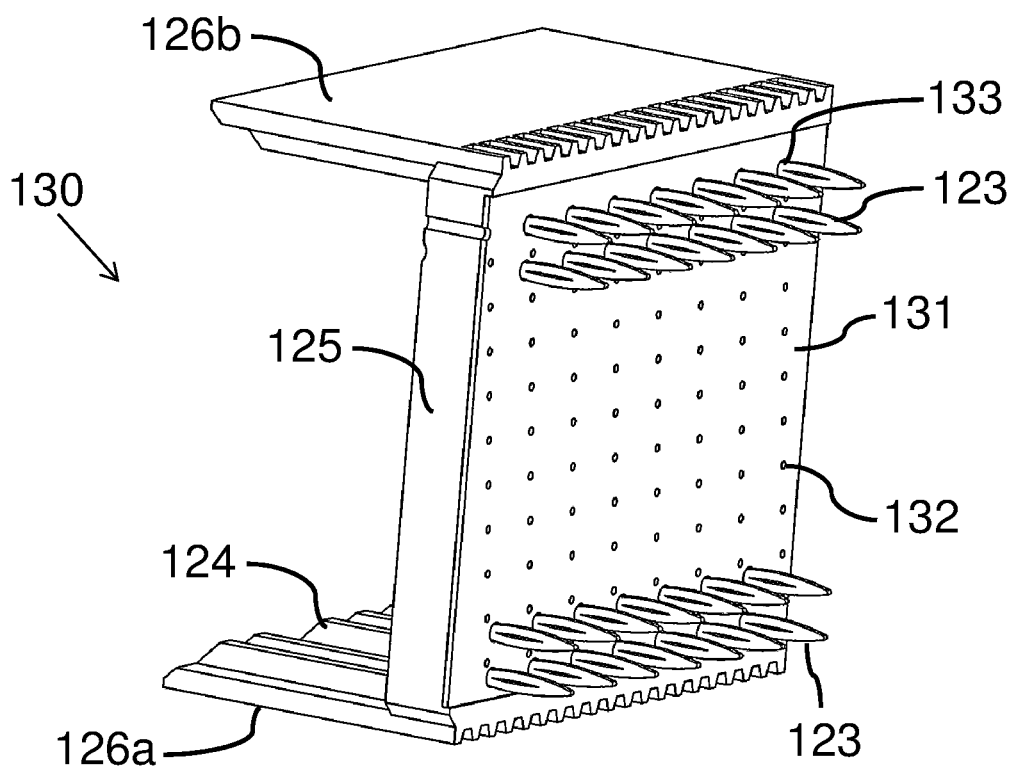
Fig. 13B

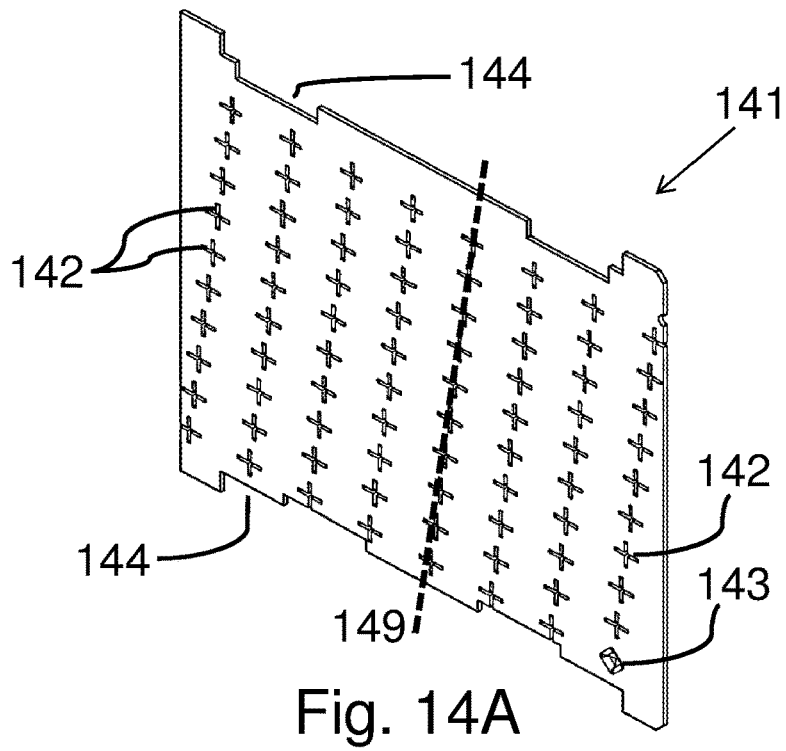
Fig. 14A
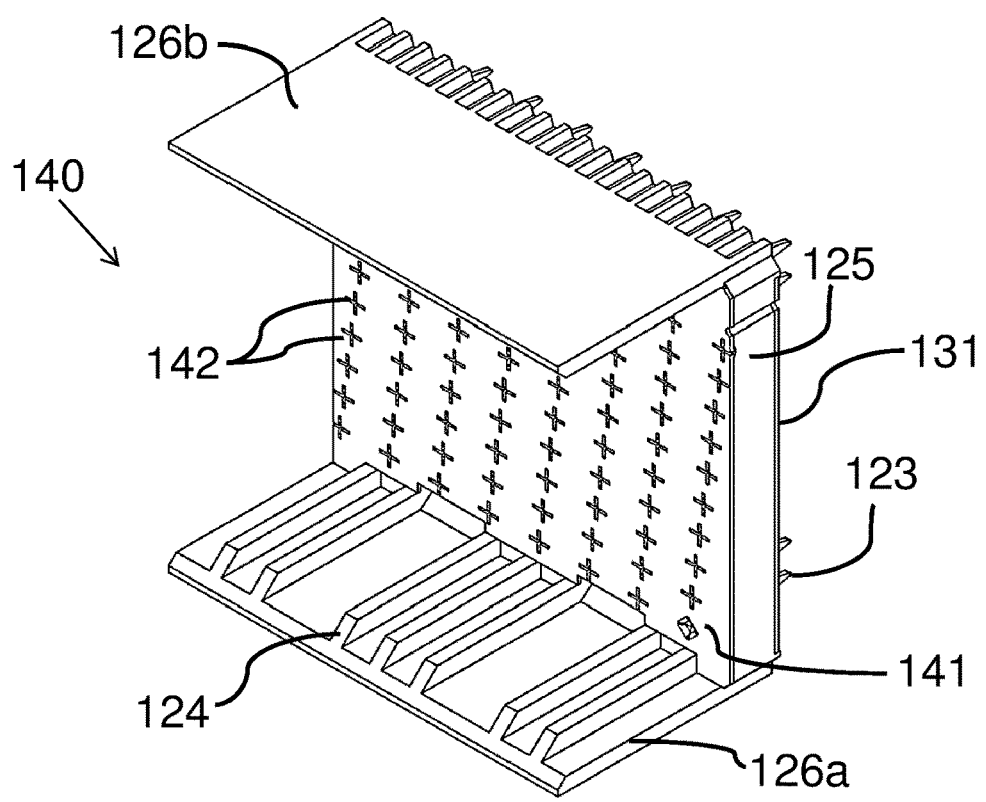
Fig. 14B

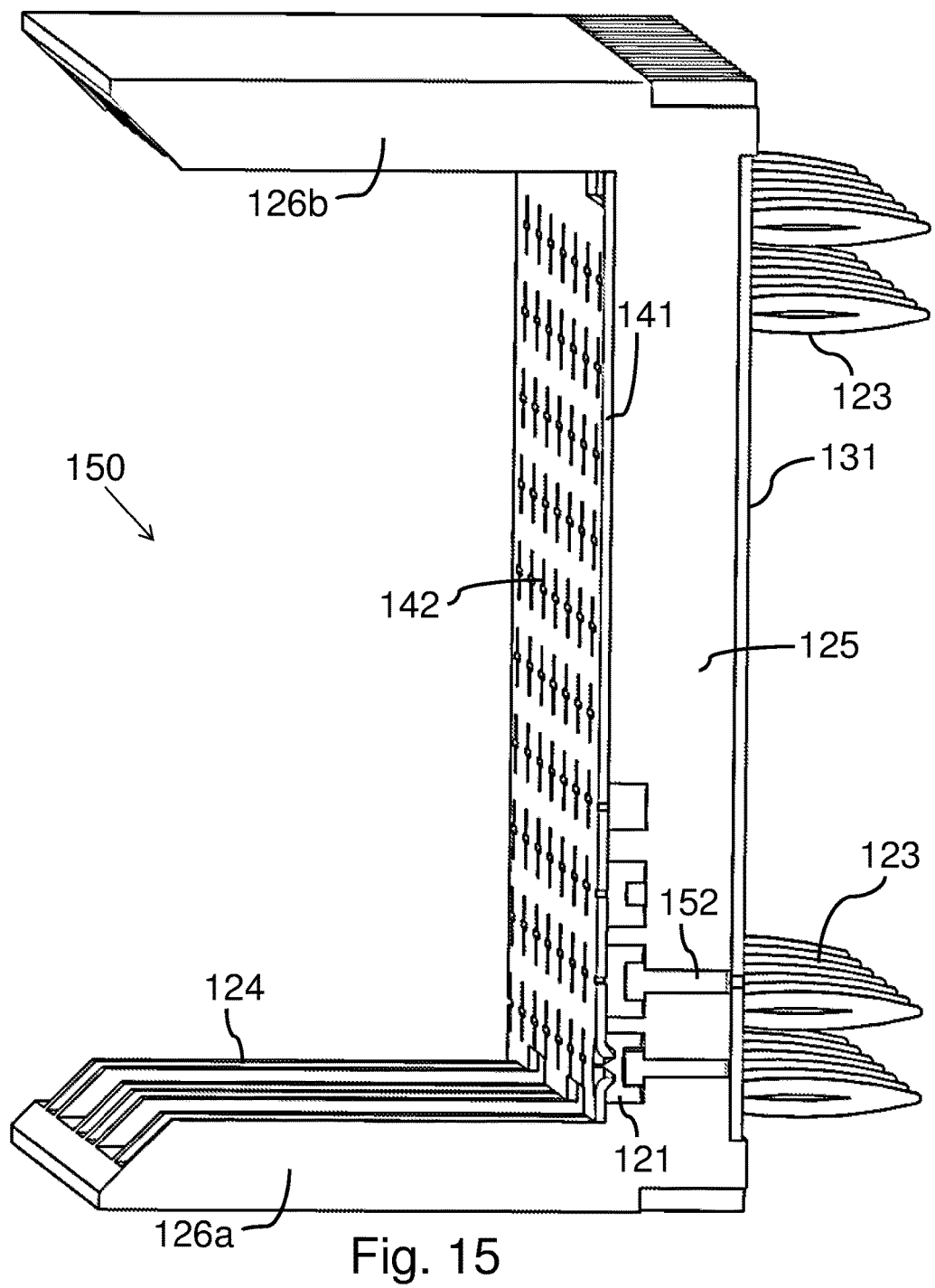
Fig. 15

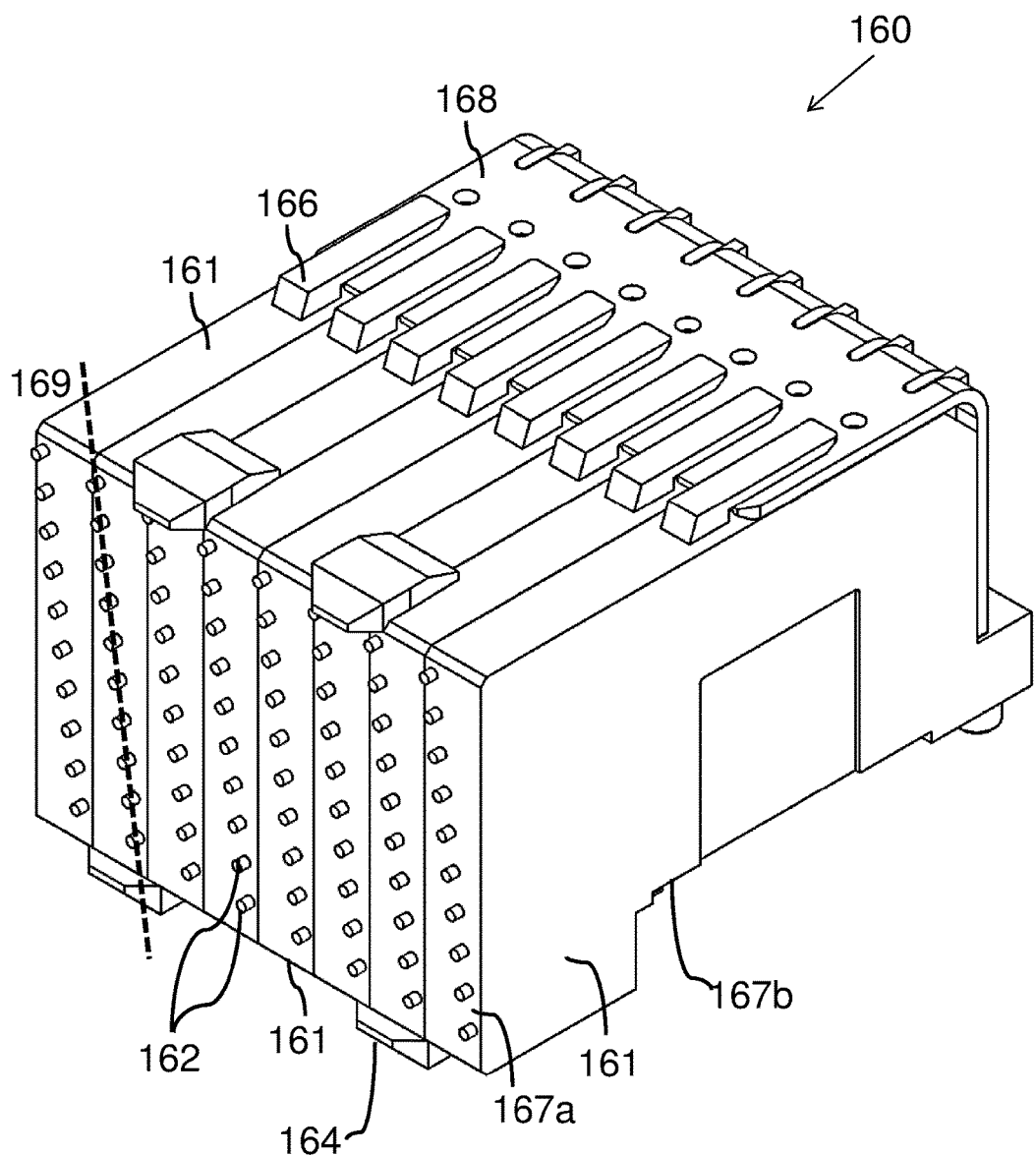
Fig. 16A

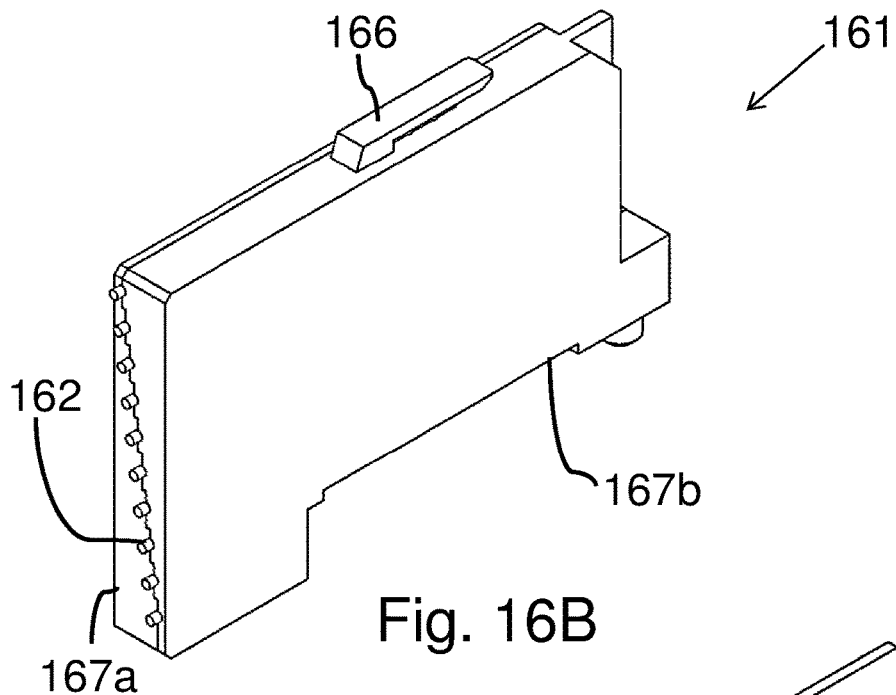
Fig. 16B
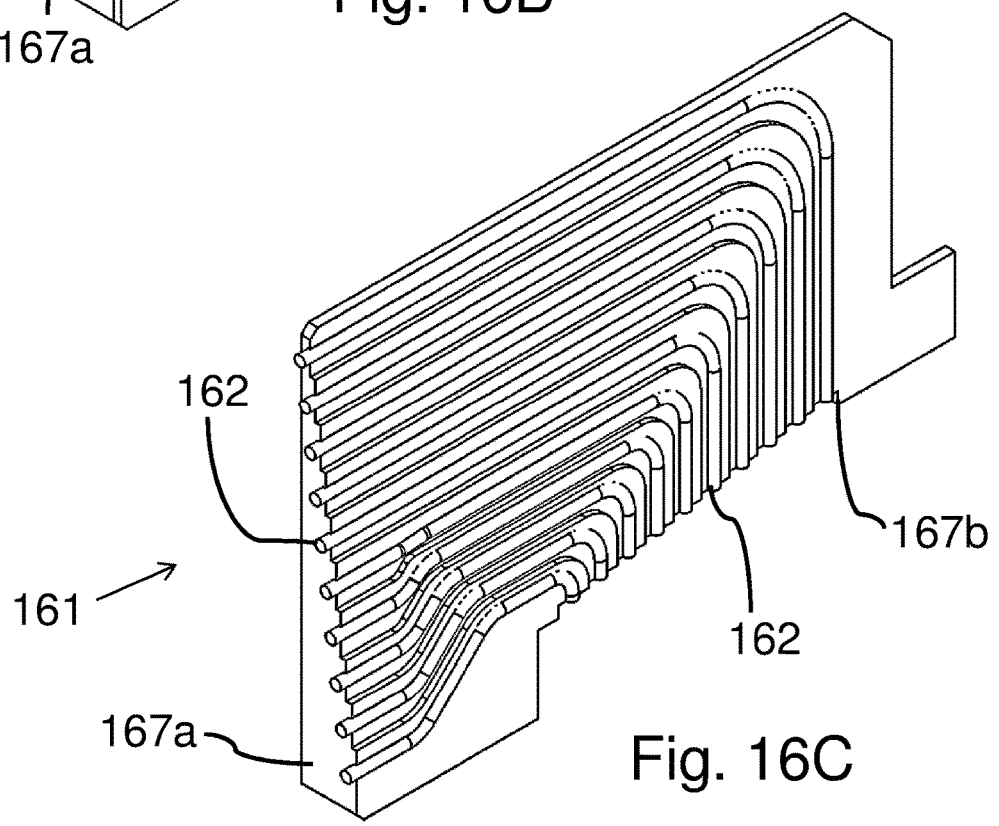
Fig. 16C

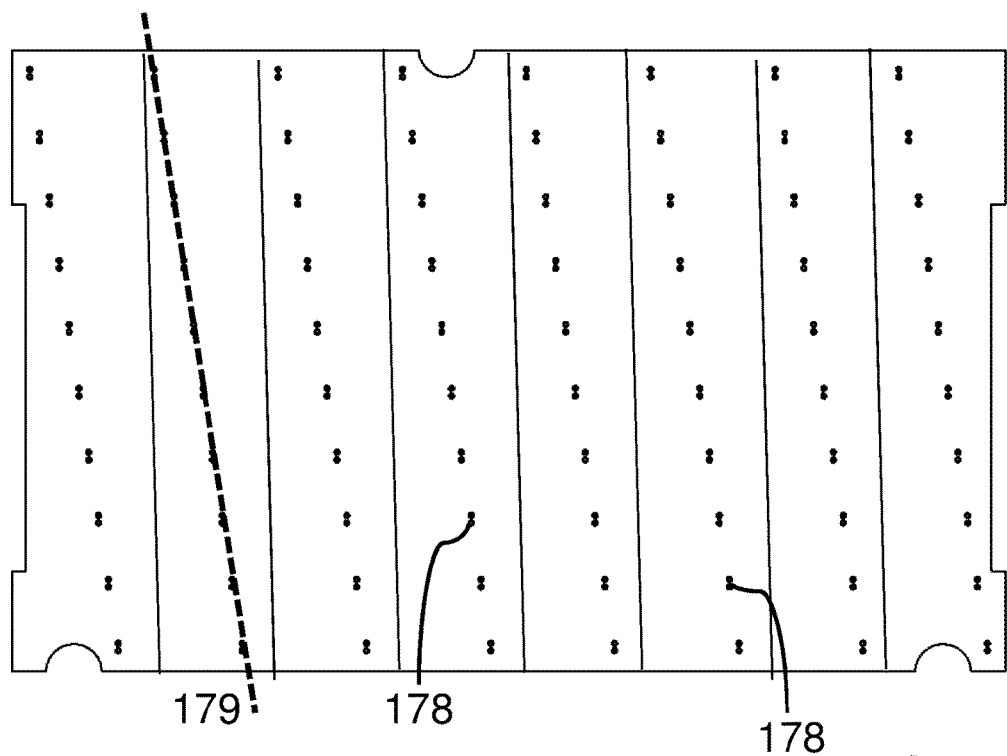
Fig. 17A
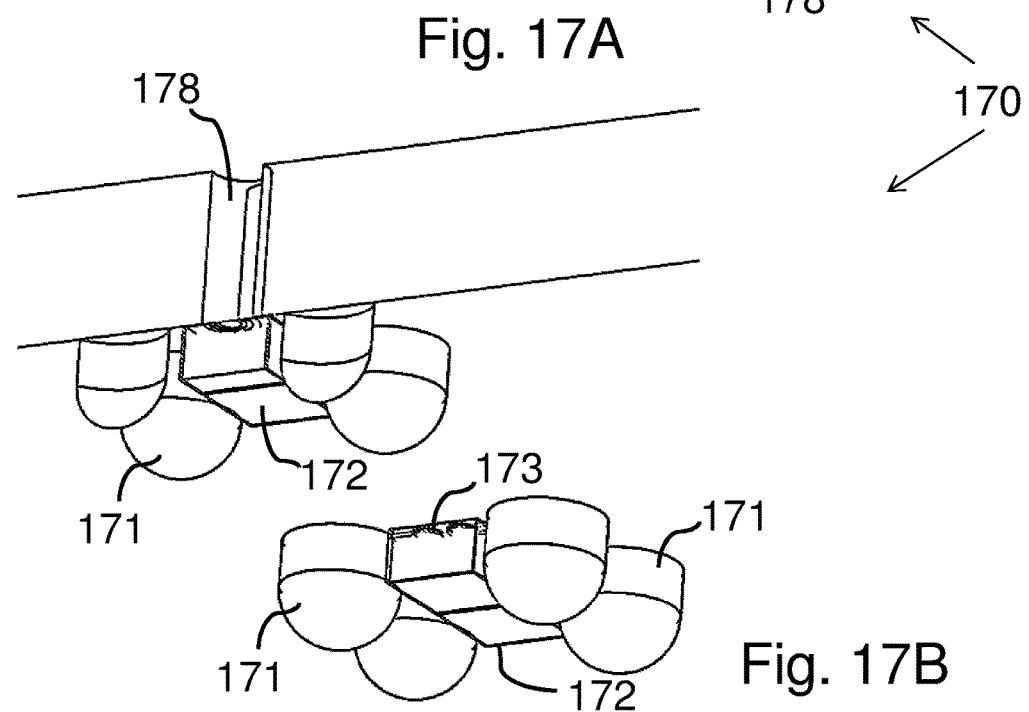
Fig. 17B

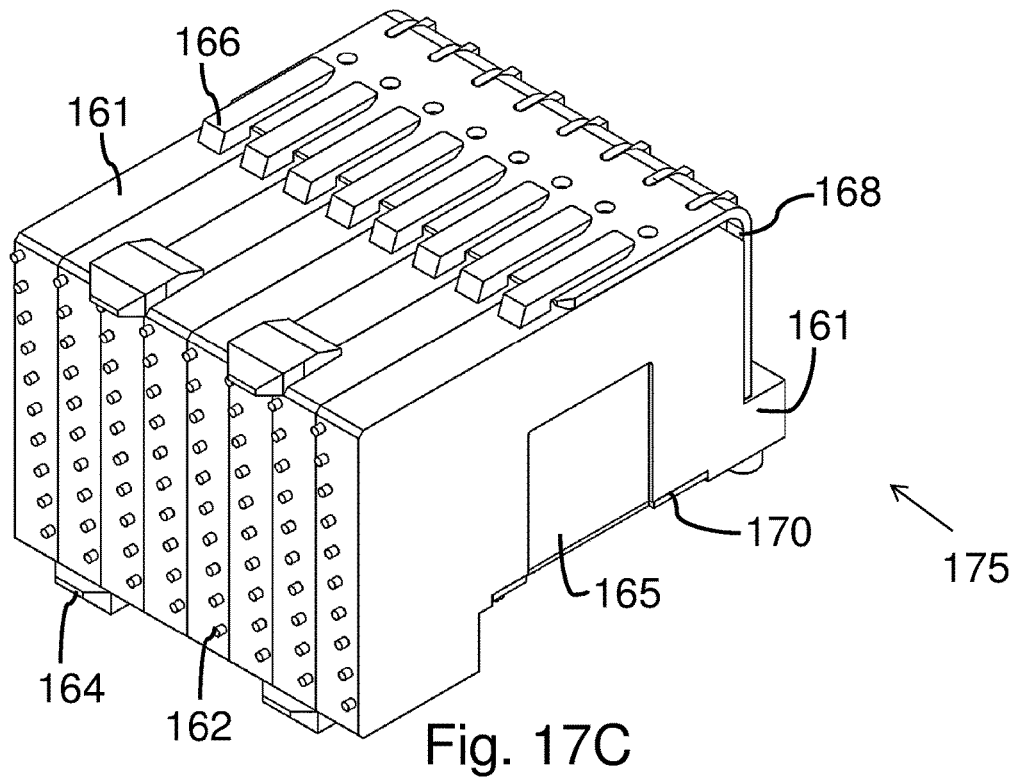
Fig. 17C
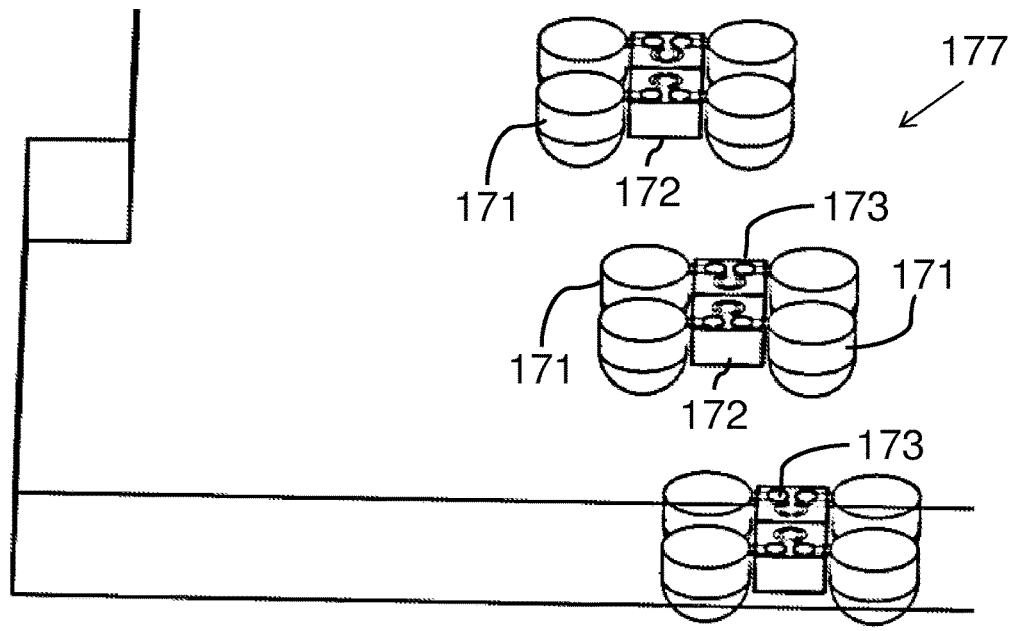
Fig. 17D

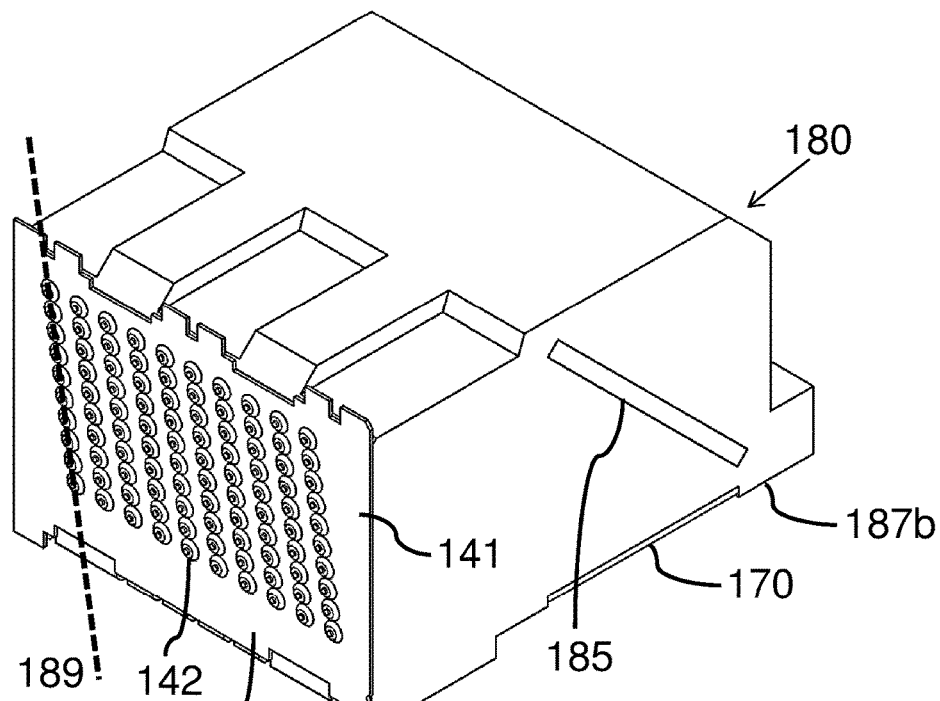
Fig. 18A
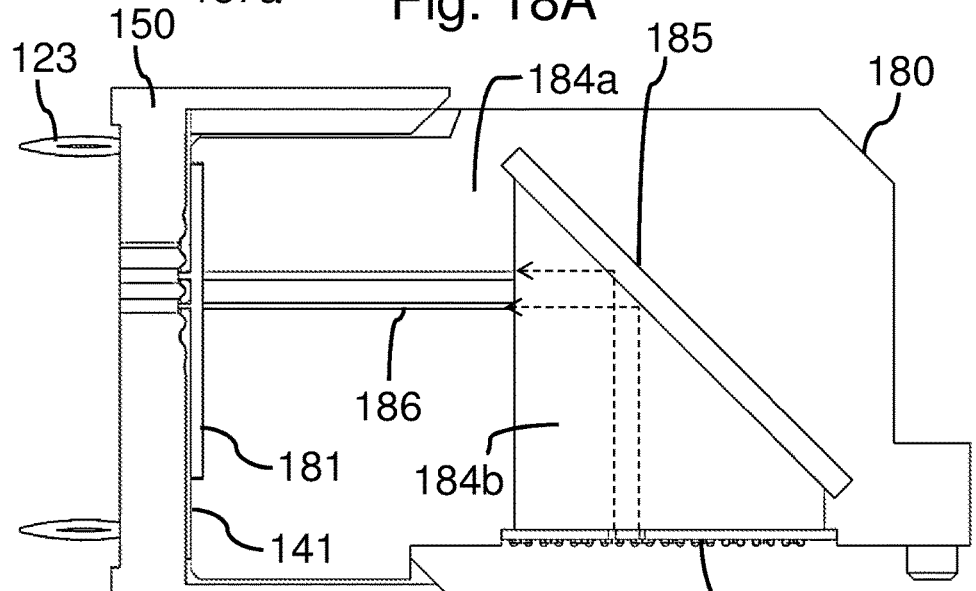
Fig. 18B

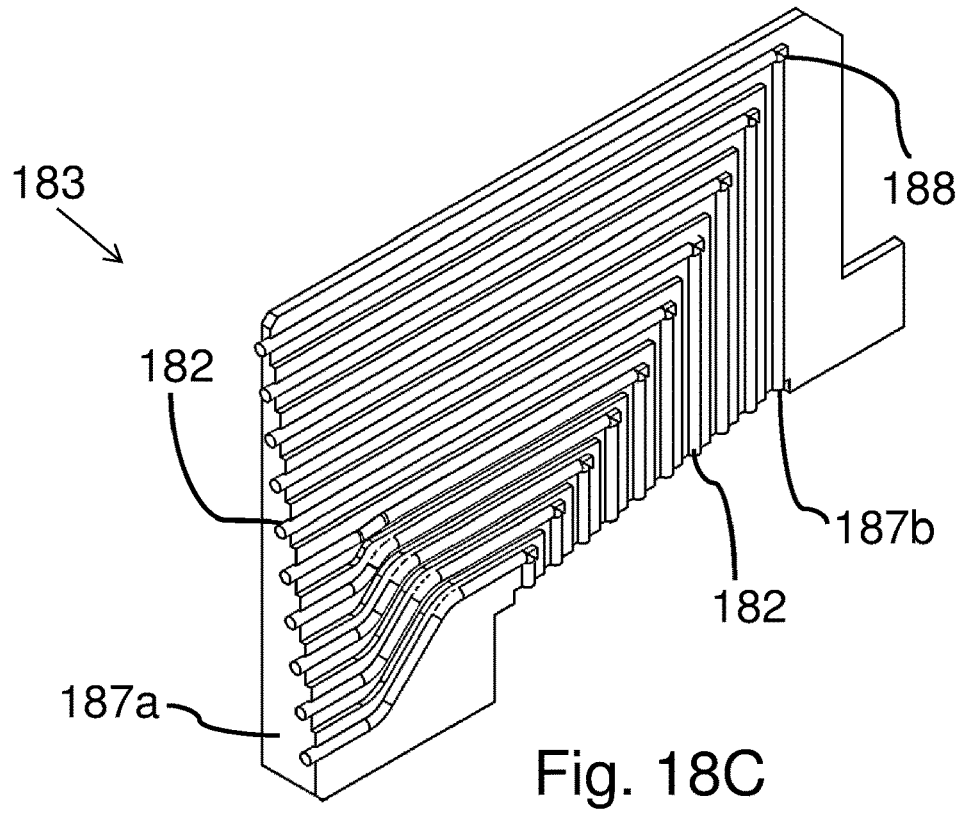
Fig. 18C
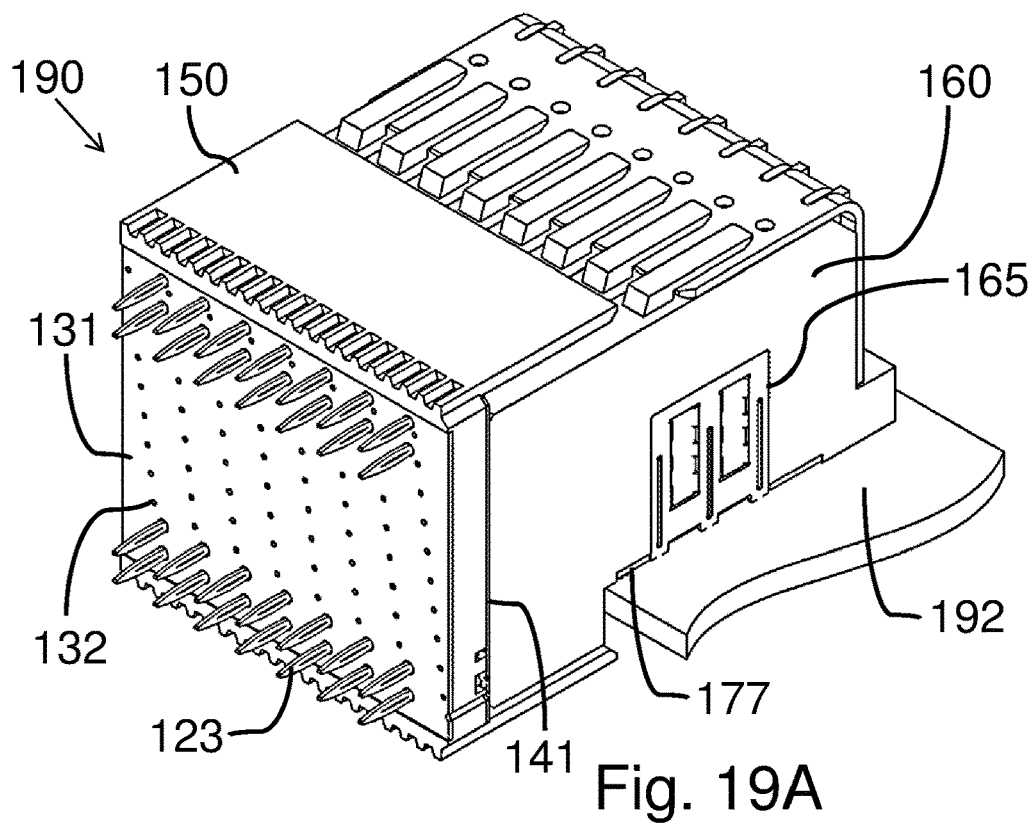
Fig. 19A

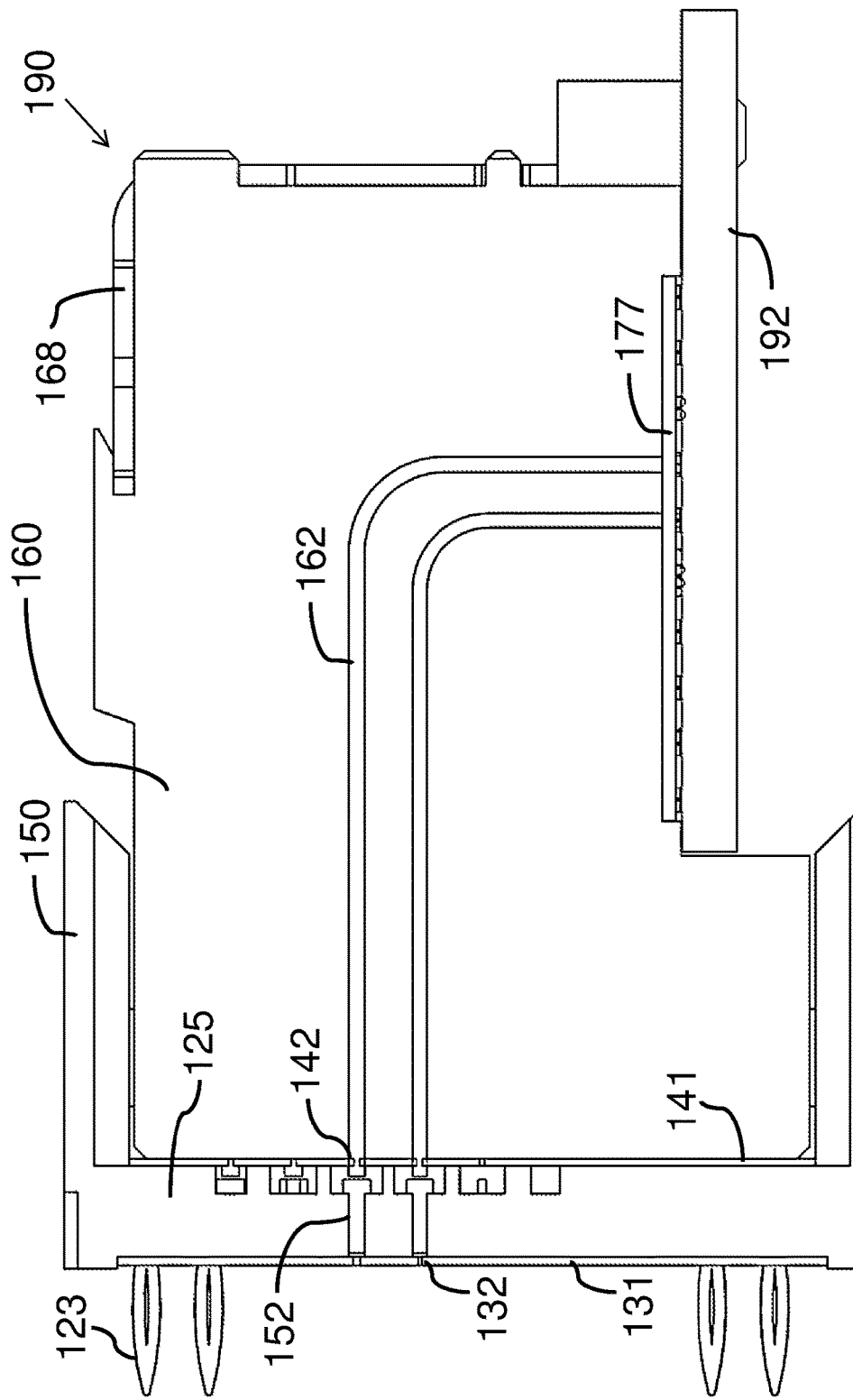
Fig. 19B

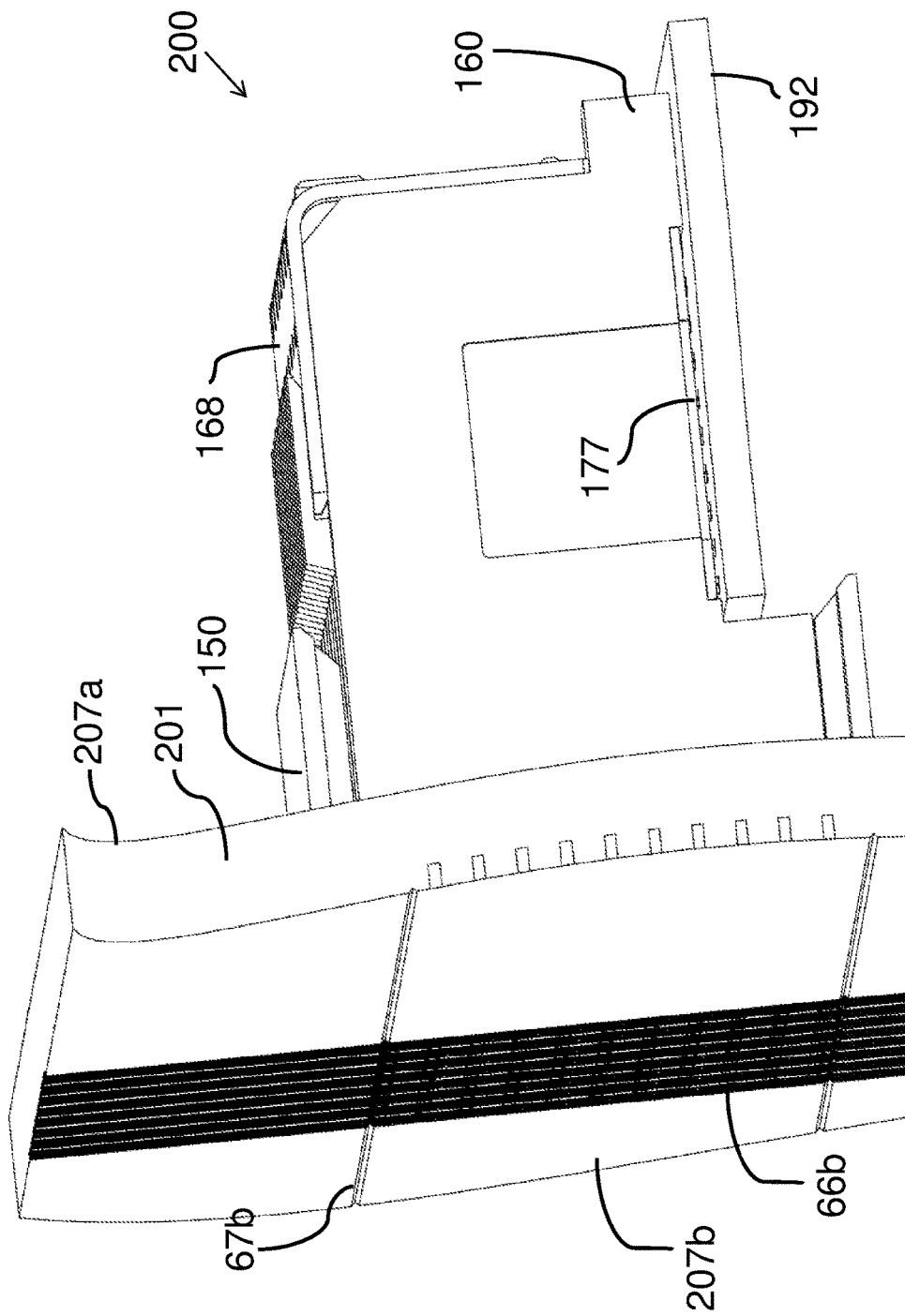
Fig. 20A

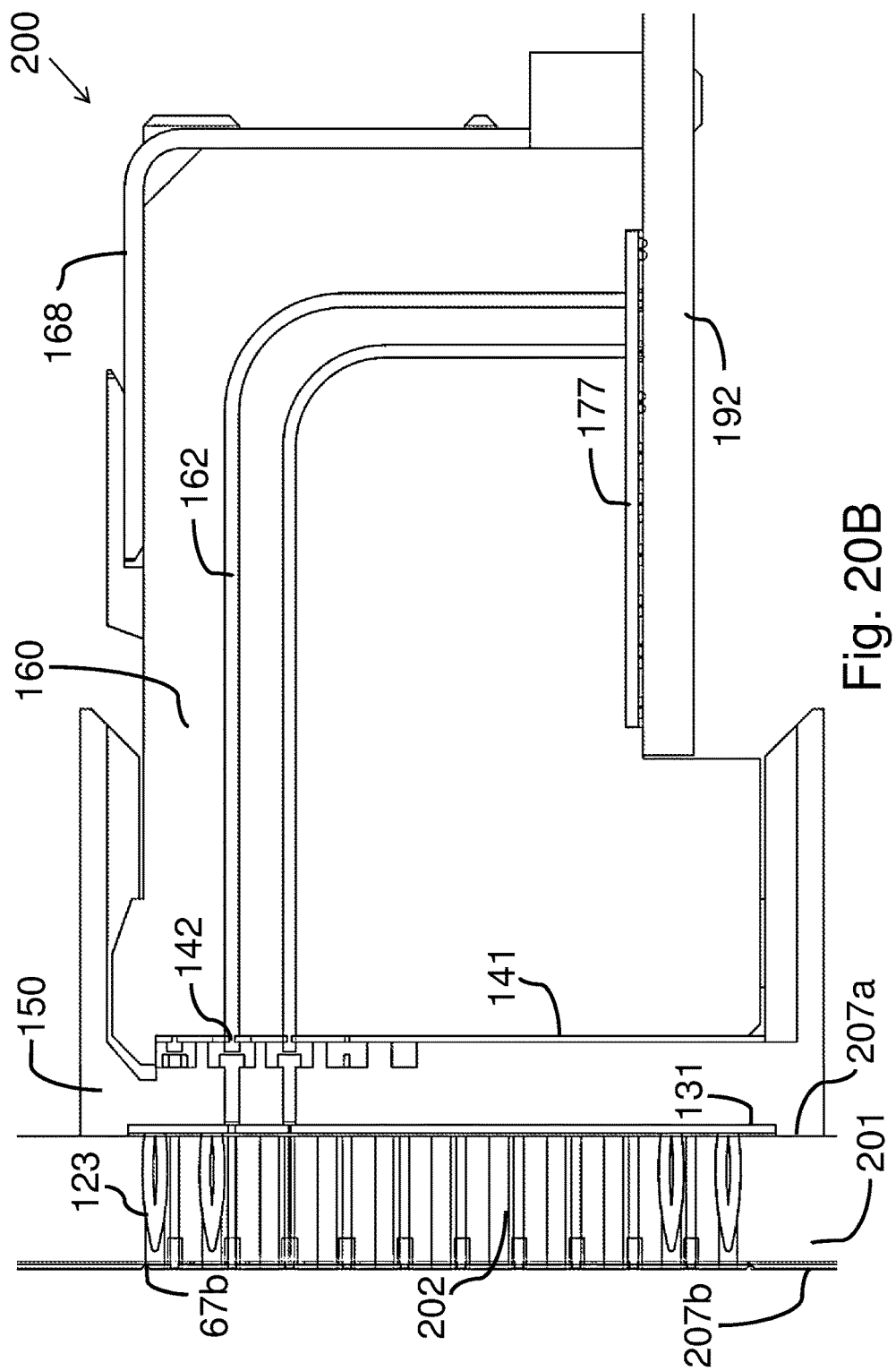
Fig. 20B

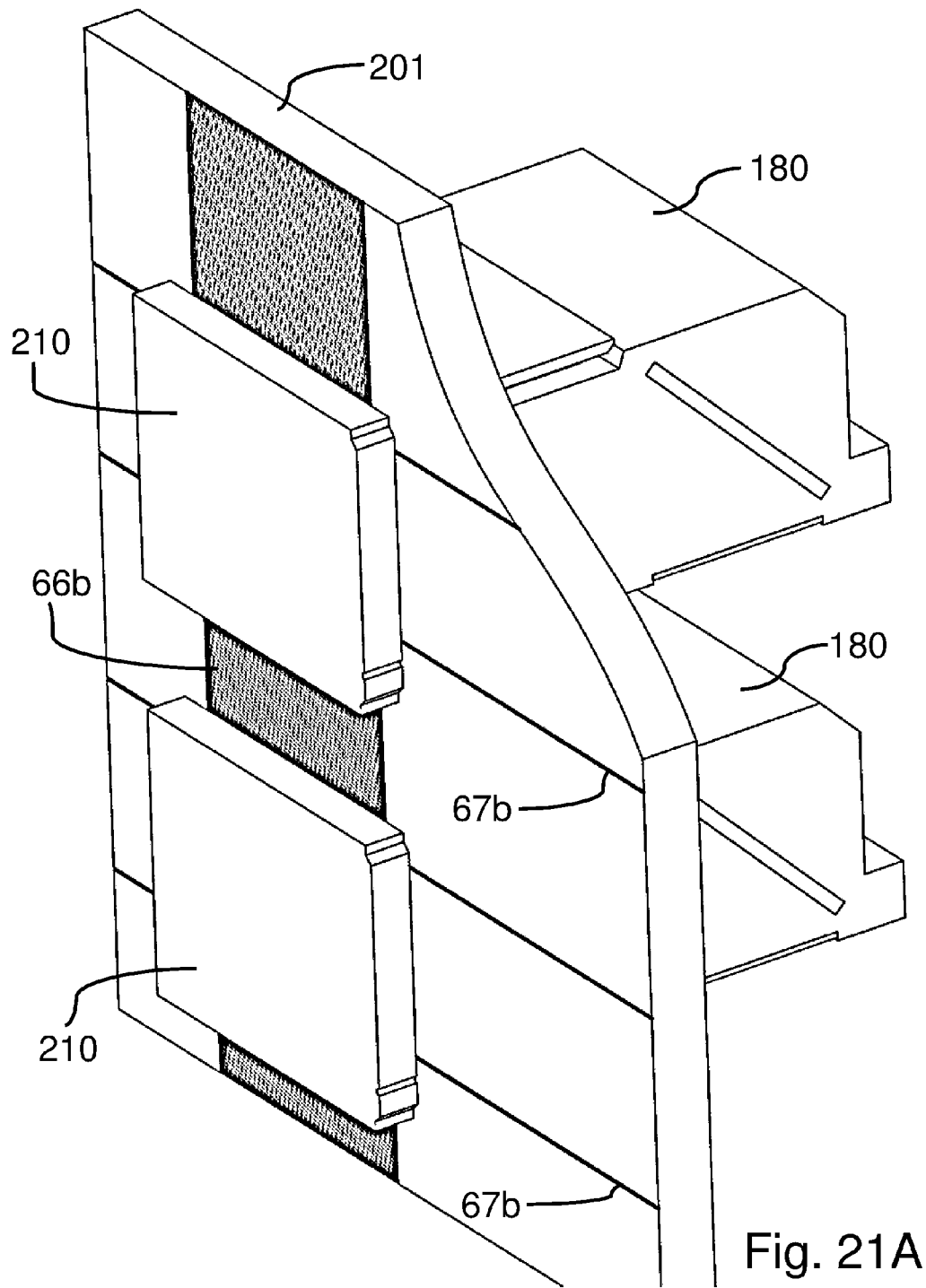
Fig. 21A

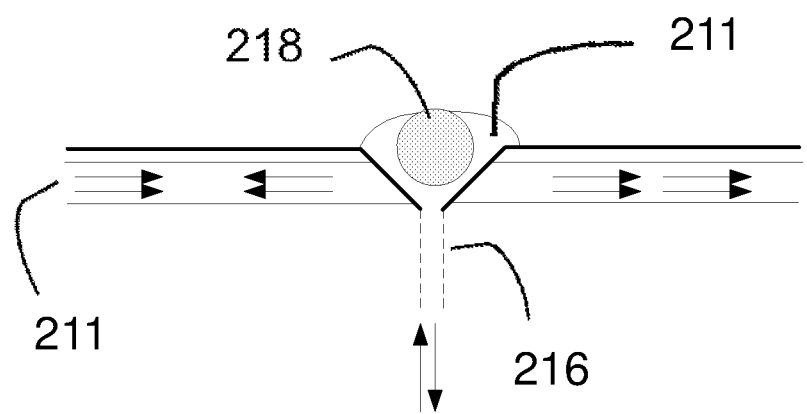
Fig. 21B
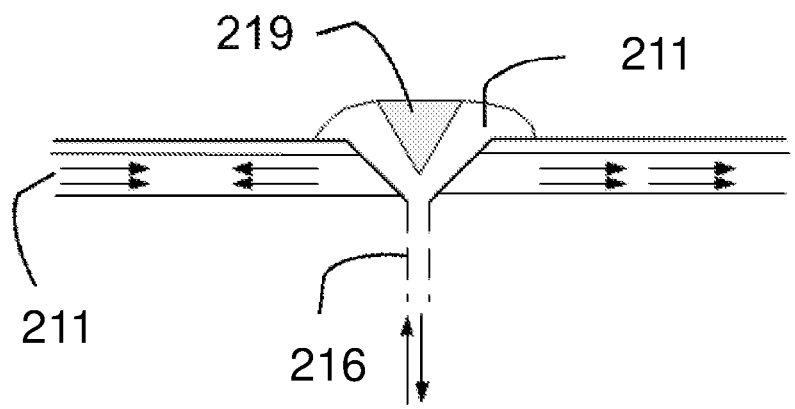
Fig. 21C

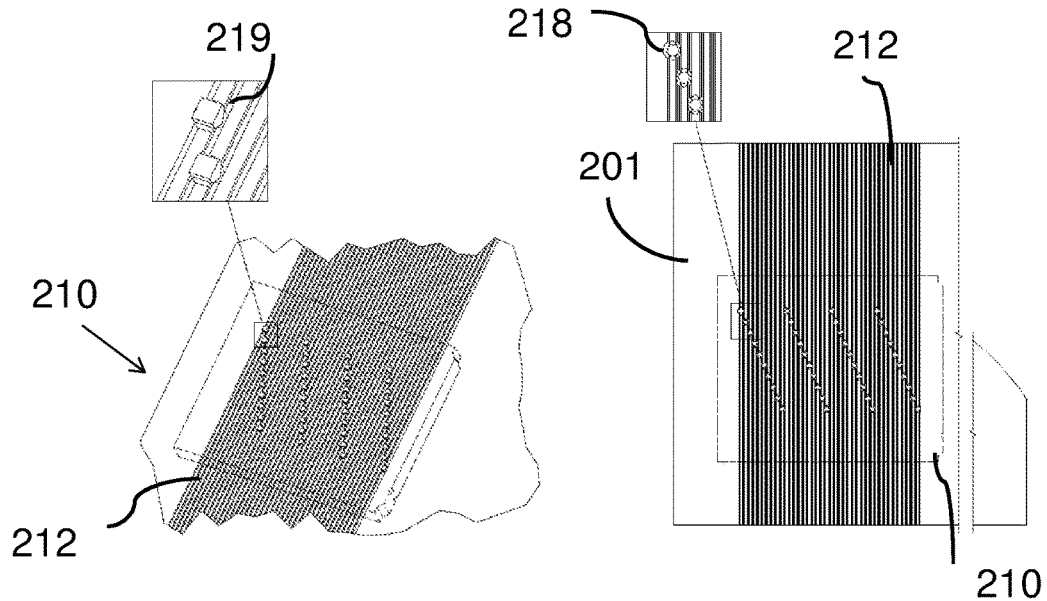
Fig. 21D  Fig. 21E
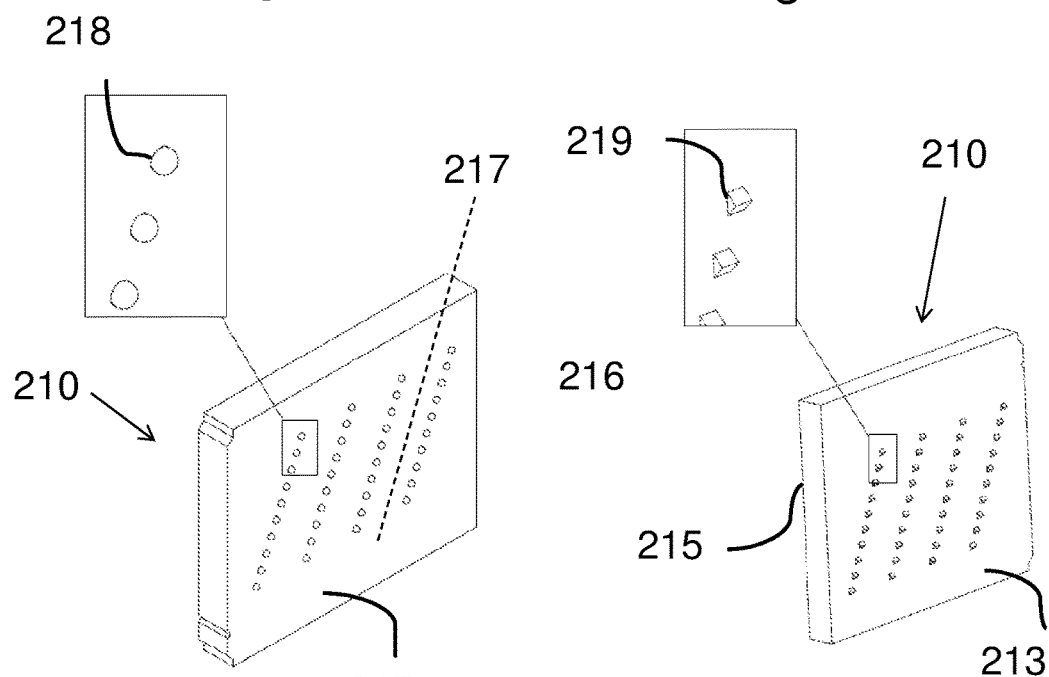
Fig. 21F  Fig. 21G

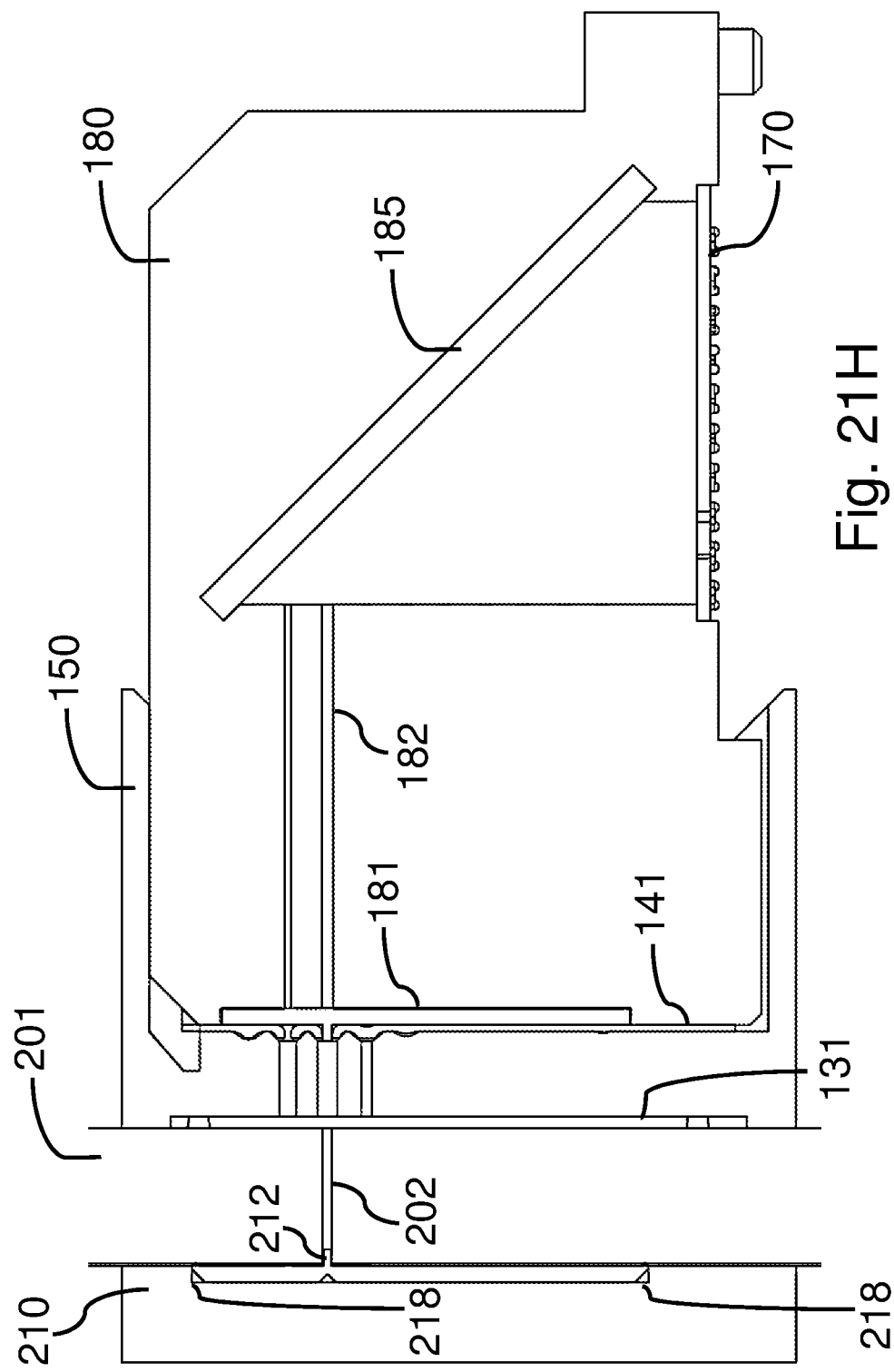

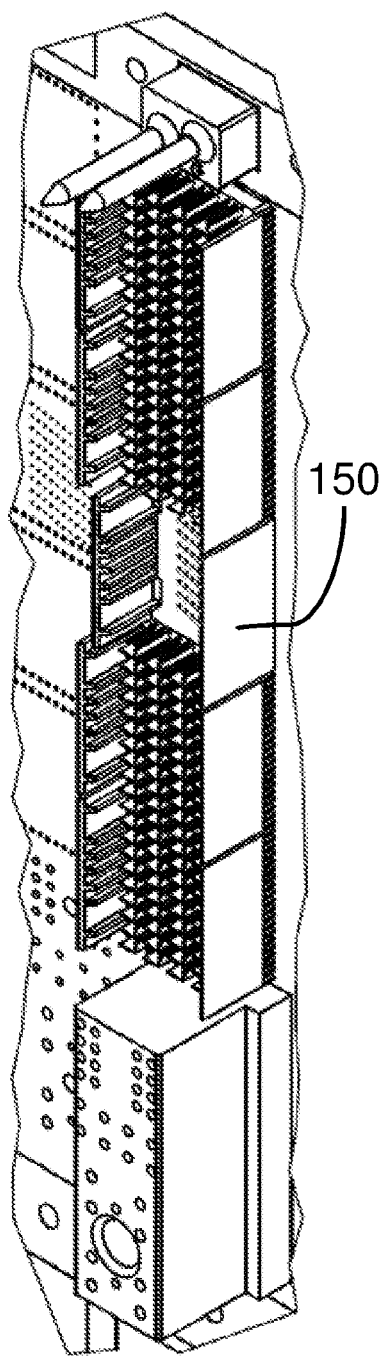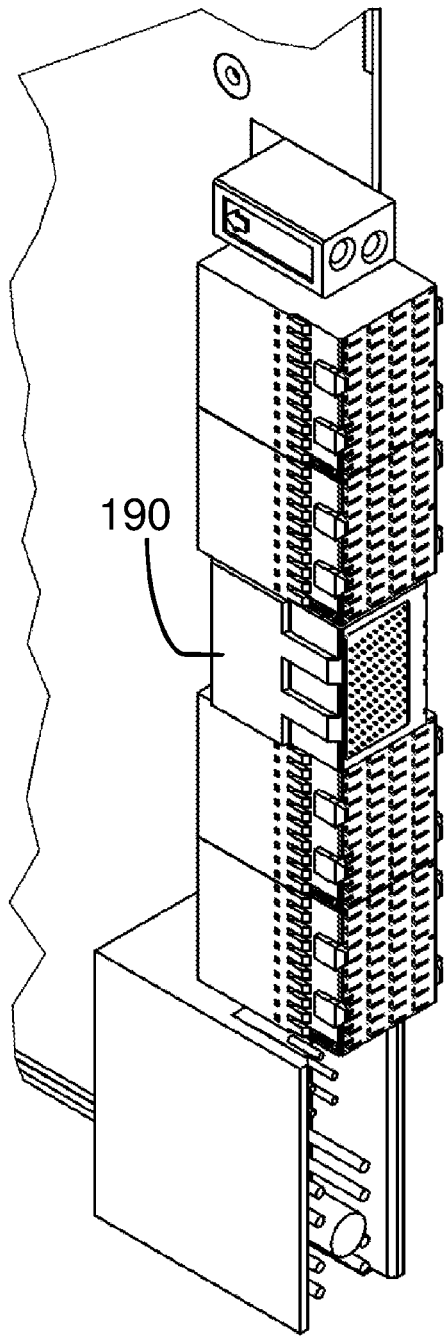
Fig. 22A　　　　　Fig. 22B

ELECTRO-OPTICALLY BASED NETWORK INFRASTRUCTURES FOR TELECOMMUNICATION SYSTEMS

FIELD OF THE INVENTION

The present invention relates to telecommunication systems. More particularly, the present invention relates to electro-optically based network infrastructures for telecommunication systems.

BACKGROUND OF THE INVENTION

Telecommunication networks (for instance interurban networks) today are a collection of terminal nodes and links (or channels) that are connected with transmission links so as to enable telecommunication between the terminals. Each terminal in the network usually has a unique address so that signals can be routed to the correct recipients, using switching to pass a signal through the correct links and nodes in order to reach the correct destination.

In recent years, the network traffic volume between terminals (and also in the electronics inside a terminal) has been doubling in size about every two years. This rise is mainly driven by a constant demand for larger file size data transfer (e.g. for video files) due to the increase usage of devices having a network connection (such as smartphones). Following this demand, numerous attempts were made to improve the communication technology inside the terminal.

A commonly used architecture standard for telecommunication networks is the Advanced Telecommunications Computing Architecture (ATCA) standard. This standard enables different operators and consumers to have a uniform open structure (similarly to "open source" software that is modified by the consumers). An ATCA terminal has a communication rack (or chassis) that is fitted with modular processing boards and also with a uniform architecture for the backplane of the rack, such that the structure can be easily modified.

The ATCA provides a complete architecture for communication equipment (i.e. rack to rack, and board to board), allowing easy and efficient interface with computerized modules for fast communication services. The ATCA backplane is the main component in the communication rack, wherein the backplane (providing point-to-point connections) supports controlled data transfer of the processing board/blade with controlled power distribution. It is therefore possible to modify the backplane of the backplane to allow faster transmission while working with the same modular processing blade.

A typical ATCA channel interface is a set of eight differential pairs (wires) that each interconnect two slots of the backplane (between which the signal is passed). Which slots are interconnected depends on the particular backplane design, so that each board is designed in advance for the specific required channel.

Such backplanes are typically manufactured with advanced printed circuit board (PCB) technology, while still restricted by the physical properties limiting the data transfer rate between the processing boards. This limitation is due to the electrical nature of the signals traversing the architecture. Electrical signals, interacting with different elements of the system (for instance the transmission line), might undergo interference by other signals traversing the system.

Additional signal transfer limitations of this architecture are:

Material constraint—fluctuations in the signal should be reduced by maintaining constant impedance across the transmission line, which requires using appropriate materials with specific properties.

Power constraint—power capacity of electrical transceiver elements affects the transmission rate.

Signal constraint—preventing a propagation delay requires proper synchronization of multiplexed signals.

Cross talk—interference between signals from parallel channels.

It may therefore be advantageous to modify the presently available architecture so that a non-electric signal is utilized such that at least some of the interference effects are overcome, and thus provide increased data transfer rate in the entire architecture.

SUMMARY OF THE INVENTION

According to a first aspect of the present invention, a telecommunication system capable of being electrically coupled to front board connectors is provided, the system comprising:
  a modified backplane comprising:
    a front side;
    a plurality of first optical elements, capable of changing direction of at least a portion of a light beam passing therethrough, at the front side;
    a plurality of first optical fibers laid across the front side, each optically coupled to at least two of the first optical elements;
  a modified connector electrically coupled to the front side of the modified backplane, wherein the modified connector is capable of electrically receiving at least one electrical signal from the front board connector; and
  an intermediate printed circuit board (PCB) comprising:
    a plurality of first signal converters configured to allow conversion of electrical signals to optical signals and a plurality of second signal converters configured to allow conversion of optical signals to electrical signals;
  wherein each first signal converter and each second signal converter are electrically coupled to the modified connector, and a first portion of the first signal converters and the second signal converters are each optically coupled to at least one of the first optical elements;
wherein the system allows:
  an electrical signal from the modified connector to be converted by at least one of the first signal converters to at least one first optical signal;
  the first optical signals from the first signal converters belonging to the first portion to be transmitted through at least one of the first optical elements;
  the transmitted first optical signal to be directed along at least one first optical fiber;
  the directed first optical signal to be redirected through at least one of the first optical elements;
  the redirected first optical signal to be converted by at least one second signal converter belonging to the first portion to at least one electrical signal transmitted to the modified connector, and
  the converted signal to be electrically transmitted to the front board connector.
In some embodiments, the system allows:
  at least one optical signal from the first signal converters belonging to the first portion to be transmitted through one of the first optical elements, and the at least one directed optical signal to be redirected through another of the first optical elements.

In some embodiments, the backplane further comprises:
a back side;
a plurality of vias, each defining an optical passage from the front side to the back side;
a plurality of second optical elements, capable of changing direction of at least a portion of a light beam passing therethrough, at the back side; and
a plurality of second optical fibers laid across the back side, each optically coupled to at least two of the second optical elements;
the intermediate printed circuit board (PCB) further comprising:
a second portion of the first signal converters and the second signal converters, each optically coupled to at least one of the vias;
wherein the system further allows:
second optical signals from the first signal converters belonging to the second portion to be conducted through at least one of the vias;
the conducted second optical signal to be transmitted through at least one of the second optical elements;
the transmitted second optical signal to be directed along at least one of the second optical fibers;
the directed second optical signal to be redirected through at least one of the second optical elements, and
the redirected second optical signal to be converted by at least one second signal converter belonging to the second portion to at least one electrical signal transmitted to the modified connector.

In some embodiments, the system allows:
at least one optical signal from the second signal converters belonging to the second portion to be transmitted through one of the second optical elements,
and the at least one directed optical signal to be redirected through another of the second optical elements.

In some embodiments, the modified connector is electrically coupled to the front side of the modified backplane with a plurality of backplane pins capable of electrically transmitting an electrical signal.

In some embodiments, the intermediate PCB further comprises a plurality of plated through holes corresponding to the backplane pins, and wherein an electrical signal from the backplane pins is transmittable to the plating.

In some embodiments, each signal converter is electrically connected to an adjacent pair of plated through holes, and wherein the electrical signal passes through this electrical connection.

In some embodiments, the front side further comprises at least one first groove, and wherein each first optical fiber is accommodated inside at least one of the first grooves.

In some embodiments, the back side further comprises a plurality of first grooves, and wherein each second optical fiber is accommodated inside a first groove.

In some embodiments, the front side further comprises a plurality of second grooves, and wherein each first optical element is accommodated inside a second groove.

In some embodiments, the back side further comprises a plurality of second grooves, and wherein each second optical element is accommodated inside a second groove.

In some embodiments, the plurality of first and second signal converters are each configured to allow both conversion of electrical signals to optical signals and conversion of optical signals to electrical signals.

In some embodiments, the backplane pins are elongated sufficiently to engage a front board connector.

In some embodiments, the modified connector further comprises a plurality of grounded pins configured to allow attachment of the modified connector to the backplane.

In some embodiments, the first grooves on the front side are parallel to the first grooves on the back side.

In some embodiments, the second grooves on the front side are parallel to the second grooves on the back side.

In some embodiments, the system further comprises lenses coupled to the first and second signal converters, and wherein each lens coupled to one of the signal converters is capable of focusing light into an optical element coupled to the one signal converter.

In some embodiments, a communication channel is formed by at least one of the first optical fibers, and wherein a signal passes through the at least one first optical fiber.

In some embodiments, a communication channel is formed by at least one first optical fiber and at least one second optical fiber, and wherein a signal passes through the at least one first optical fiber and at least one second optical fiber.

In some embodiments, the communication channel comprises one of the first signal converters and multiple second signal converters.

In some embodiments, the communication channel comprises one of the second signal converters and multiple first signal converters.

According to a second aspect of the present invention, a method for telecommunication with front board connectors is provided, the method comprising:
providing a modified backplane having a front side and a back side, and comprising:
 a plurality of first optical elements, capable of changing direction of at least a portion of a light beam passing therethrough, at the front side;
 a plurality of first optical fibers laid across the front side, each optically coupled to at least two of the first optical elements;
 a plurality of second optical elements, capable of changing direction of at least a portion of a light beam passing therethrough, at the back side;
 a plurality of second optical fibers laid across the back side, each optically coupled to at least two of the second optical elements;
 a plurality of vias, each defining an optical passage from the front side to the back side;
providing an intermediate PCB comprising:
 a plurality of first signal converters configured to allow conversion of electrical signals to optical signals and a plurality of second signal converters configured to allow conversion of optical signals to electrical signals;
wherein each first signal converter and each second signal converter are electrically coupled to the modified connector, and a first portion of the first signal converters and the second signal converters are each optically coupled to at least one of the first optical elements;
 a second portion of the first signal converters and the second signal converters, each optically coupled to at least one of the vias;
providing a modified connector electrically coupled to the front side of the modified backplane, wherein the modified connector is capable of electrically receiving at least one electrical signal from a front board connector;
coupling the modified connector to the intermediate PCB;
coupling the intermediate PCB to the front side of the modified backplane;
receiving at least one electrical signal from a front board connector;
converting the at least one electrical signal to at least one optical signal by at least one of the first signal converters;
transmitting the at least one optical signal of the first portion through at least one of the first optical elements;
directing the at least one optical signal along at least one first optical fiber;
redirecting the at least one optical signal through at least one of the first optical elements;
transmitting the at least one optical signal of the second portion through at least one of the vias;
transmitting the at least one optical signal through at least one of the second optical elements;
directing the at least one optical signal along at least one second optical fiber;
redirecting the at least one optical signal through at least one of the second optical elements;
transmitting the redirected at least one optical signal through at least one of the vias;
converting the optical signals by the by the second signal converter to at least one electrical signal;
transmitted the at least one electrical signal to the modified connector; and
transmitting the at least one electrical signal to the front board connector.

According to a third aspect of the present invention, a telecommunication system is provided, comprising:
a modified backplane comprising:
  a front side;
  a plurality of first optical elements, capable of changing direction of at least a portion of a light beam passing therethrough, at the front side;
  a plurality of first optical fibers laid across the front side, each optically coupled to at least two of the first optical elements;
an optical connector, comprising:
  a passive connector having a plurality of tunnels configured to allow passage of an optical signal, and coupled to the front side of the modified backplane;
  a front connector configured to allow passage of an optical signal, and coupled to the passive connector; and
an electro-optical substrate capable of electrically receiving at least one electrical signal, comprising:
  a plurality of first signal converters configured to allow conversion of electrical signals to optical signals;
  a plurality of second signal converters configured to allow conversion of optical signals to electrical signals;
wherein the system allows:
  an electrical signal to be converted by at least one of the first signal converters to at least one first optical signal;
  the first optical signal to pass through the optical connector;
  the first optical signals from the optical connector to be transmitted through at least one of the first optical elements;
  the transmitted first optical signal to be directed along at least one first optical fiber;
  the directed first optical signal to be redirected through at least one of the first optical elements, and
  the redirected first optical signal to be pass through the optical connector and converted by at least one second signal converter to at least one electrical signal.

In some embodiments, the system further comprises a passive intermediate printed circuit board (PCB) having a plurality of apertures corresponding in position to the tunnels of the passive connector, wherein the passive intermediate PCB is positioned between the passive connector and the modified backplane.

In some embodiments, the system further comprises a protection plate having a plurality of openings corresponding in position to the tunnels of the passive connector, wherein the protection plate is positioned between the passive connector and the front connector.

In some embodiments, the front connector further comprises a plurality of connector optical fibers coupled to the electro-optical substrate signal converters, and also coupled to the passive connector.

In some embodiments, the front connector further comprises a single reflective element capable of reflecting light between the electro-optical substrate and the passive connector.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the specification, including definitions, will control. In addition, the materials, methods, and examples are illustrative only and not intended to be limiting.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding of the invention, the description taken with the drawings making apparent to those skilled in the art how the several forms of the invention may be embodied in practice. In the drawings:

FIG. 1A illustrates a perspective view of a commercially available ATCA rack.

FIG. 1B illustrates a frontal view of a commercially available backplane.

FIG. 1C illustrates a frontal view of a first slot.

FIG. 1D illustrates a frontal view of an enlarged segment of the first slot.

FIG. 2A illustrates a perspective view of a commercially available backplane connector.

FIG. 2B illustrates a frontal view of the backplane connector.

FIG. 2C illustrates a top view of the backplane connector.

FIG. 3A illustrates a perspective view of a modified backplane connector, according to an exemplary embodiment.

FIG. 3B illustrates a frontal view of the modified backplane connector, according to an exemplary embodiment.

FIG. 3C illustrates a top view of the modified backplane connector, according to an exemplary embodiment.

FIG. 4A illustrates a back view of an intermediate PCB, according to an exemplary embodiment.

FIG. 4B illustrates an enlarged segment of the intermediate PCB, according to an exemplary embodiment.

FIG. 4C schematically illustrates an electro-optic signal converter, according to an exemplary embodiment.

FIG. 5A illustrates a perspective view of an electro-optical connector, according to an exemplary embodiment.

FIG. 5B illustrates a top view of the electro-optical connector, according to an exemplary embodiment.

FIG. 5C illustrates a back view of the electro-optical connector, according to an exemplary embodiment.

FIG. 5D illustrates an enlarged segment of the electro-optical connector, according to an exemplary embodiment.

FIG. 6A illustrates a perspective partial cross-sectional view of a PCB backplane perforated with a plurality of vias, according to an exemplary embodiment.

FIG. 6B illustrates a perspective partial cross-sectional view of a PCB backplane further perforated with a plurality of backplane through holes, according to an exemplary embodiment.

FIG. 6C illustrates a perspective partial cross-sectional view of a PCB backplane further corrugated with multiple first grooves, according to an exemplary embodiment.

FIG. 6D illustrates a perspective partial cross-sectional view of a PCB backplane further corrugated with multiple second grooves, according to an exemplary embodiment.

FIG. 7A illustrates an enlarged segment of the PCB backplane, according to an exemplary embodiment.

FIG. 7B illustrates a cross-sectional view of an enlarged segment of the PCB backplane, according to an exemplary embodiment.

FIG. 7C illustrates a perspective view of an enlarged segment of the PCB backplane, according to an exemplary embodiment.

FIG. 7D illustrates a frontal view of the PCB backplane, according to an exemplary embodiment.

FIG. 7E illustrates a back view of the PCB backplane, according to an exemplary embodiment.

FIG. 8A schematically illustrates a cross-sectional partial view of the first grooves with optical elements coupled to the second grooves, according to an exemplary embodiment.

FIG. 8B schematically illustrates a cross-sectional partial view of a first groove with additional optical elements coupled to the second grooves and passing a signal from a single transmitter, according to an exemplary embodiment.

FIG. 8C schematically illustrates a cross-sectional partial view of a first groove with additional optical elements coupled to the second grooves and passing a signal from multiple transmitters, according to an exemplary embodiment.

FIG. 9A illustrates a cross-sectional view of a first groove on the back side with additional optical elements coupled to the second grooves and passing a signal from three transmitters, according to an exemplary embodiment.

FIG. 9B schematically illustrates a cross-sectional view of a simulation of a signal emitted from a third transmitter, according to an exemplary embodiment.

FIG. 9C schematically illustrates a cross-sectional view of a simulation of a signal emitted from a second transmitter, according to an exemplary embodiment.

FIG. 9D schematically illustrates a cross-sectional view of a simulation of a signal emitted from a first transmitter, according to an exemplary embodiment.

FIG. 10A illustrates a perspective view of an electro-optical telecommunication system, according to an exemplary embodiment.

FIG. 10B illustrates a partial side view of an enlarged segment of the electro-optical telecommunication system, according to an exemplary embodiment.

FIG. 10C illustrates a partial perspective back view of an enlarged segment of the electro-optical telecommunication system, according to an exemplary embodiment.

FIG. 11A illustrates a frontal view of an optical fiber on a modified backplane, according to an exemplary embodiment.

FIG. 11B illustrates a frontal view of an enlarged segment of the modified backplane, according to an exemplary embodiment.

FIG. 11C illustrates a frontal view of an enlarged segment of the modified backplane, according to an exemplary embodiment.

FIG. 11D illustrates a frontal view of an enlarged segment of the modified backplane, according to an exemplary embodiment.

FIG. 11E illustrates a back view of an enlarged segment of the modified backplane, according to an exemplary embodiment.

FIG. 12A illustrates a perspective view of a passive connector, according to an exemplary embodiment.

FIG. 12B illustrates a frontal view of the passive connector, according to an exemplary embodiment.

FIG. 12C illustrates a back view of the passive connector, according to an exemplary embodiment.

FIG. 12D illustrates a cross-sectional perspective view of the passive connector, according to an exemplary embodiment.

FIG. 13A illustrates a perspective view of the passive intermediate optical layer, according to an exemplary embodiment.

FIG. 13B illustrates a perspective back view of the passive intermediate optical layer coupled to the back side of the passive connector, according to an exemplary embodiment.

FIG. 14A illustrates a perspective view of the protection plate, according to an exemplary embodiment.

FIG. 14B illustrates a perspective back view of the protection plate coupled to the front side of the passive connector, according to an exemplary embodiment.

FIG. 15 illustrates a partially cross-sectional view of the protection plate coupled to the front side of the passive connector that is coupled to the passive intermediate optical layer, and further comprises a waveguide in each tunnel, according to an exemplary embodiment.

FIG. 16A illustrates a perspective view of a sliced electro optical daughter board connector, according to an exemplary embodiment.

FIG. 16B illustrates a perspective view of the sliced electro optical connector unit, according to an exemplary embodiment.

FIG. 16C illustrates a partially cross-sectional view of the sliced electro optical connector unit, according to an exemplary embodiment.

FIG. 17A illustrates a top view of a PCB electro-optical substrate, according to an exemplary embodiment.

FIG. 17B illustrates a partially cross-sectional bottom view of the PCB electro-optical substrate, according to an exemplary embodiment.

FIG. 17C illustrates a perspective view of electro-optical daughter board connector coupled to the PCB electro-optical substrate, according to an exemplary embodiment.

FIG. 17D illustrates a glass electro-optical substrate, according to an exemplary embodiment.

FIG. 18A illustrates a perspective view of a mirror based unified electro optical daughter board connector coupled to the protection plate, according to an exemplary embodiment.

FIG. 18B illustrates a cross-sectional side view of the mirror based unified electro optical daughter board connector coupled to the protection plate and also to the backplane passive connector, according to an exemplary embodiment.

FIG. 18C a perspective view of a multiple mirror front connector, according to an exemplary embodiment.

FIG. 19A illustrates a perspective view of an assembled mirror based unified electro optical daughter board connector attached to the passive backplane connector, according to an exemplary embodiment.

FIG. 19B illustrates a cross-sectional view of the assembled electro optical daughter board connector attached to the passive backplane connector, according to an exemplary embodiment.

FIG. 20A illustrates a perspective back view of the assembled electro optical daughter board connector attached to the passive backplane connector coupled to the modified backplane, according to an exemplary embodiment.

FIG. 20B illustrates a cross-sectional view of the assembled electro optical daughter board connector attached to the passive backplane connector coupled to the modified backplane, according to an exemplary embodiment.

FIG. 21A illustrates a perspective partial back view of the assembled mirror based unified electro optical daughter board connector attached to the passive backplane connector coupled to the modified backplane, with corresponding light guides on the opposite side, according to an exemplary embodiment.

FIG. 21B illustrates optional method of transferring the optical signal though the modified backplane, according to an exemplary embodiment.

FIG. 21C illustrates additional method of transferring the optical signal though the modified backplane, according to an exemplary embodiment.

FIG. 21D illustrates additional method of transferring the optical signal though the modified backplane, according to an exemplary embodiment.

FIG. 21E illustrates additional method of transferring the optical signal though the modified backplane, according to an exemplary embodiment.

FIG. 21F illustrates additional method of transferring the optical signal though the modified backplane, according to an exemplary embodiment.

FIG. 21G illustrates additional method of transferring the optical signal though the modified backplane, according to an exemplary embodiment.

FIG. 22A illustrates the passive connector on the rack with some commercially available connectors.

FIG. 22B illustrates the assembled optical connector on the rack with some commercially available connectors.

DESCRIPTION OF THE PREFERRED EMBODIMENTS

Before explaining at least one embodiment in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For clarity, non-essential elements were omitted from some of the drawings.

Printed circuit boards (PCBs) are designed so that they consist of many smaller individual PCBs that will be used in the final product, called a panel or a multi-block. The large panel is broken up or depaneled (into smaller panels), typically using a V-cut depaneling method for creating "V" shaped breaking lines or grooves (for instance using a laser beam), with precision in the order of 50 microns. Wafer saws can also be used in order to create these breaking lines, with precision in the order of 10 microns and reaching a cutting depth of 10 microns. After depaneling of a board designated for the ATCA system, a single PCB can be used as the backplane of the architecture.

Referring now to FIGS. 1A-2C, these figures show a commercially available backplane PCB and connectors utilized for the ATCA. FIG. 1A illustrates a perspective view of a commercially available ATCA rack 2, wherein pluggable processing boards 4 are connected to a PCB backplane 10 (partially shown with a dashed line) at the back side of the ATCA rack 2.

FIG. 1B illustrates a frontal view of a commercially available backplane 10. The backplane 10 can be manufactured in various configurations corresponding to the requirements of the communication channels. Typically, a 16-slot configuration is employed with the option of having different types of mesh connections. The 16-slot configuration can be regarded as being divided into three sections:

A first section 13a, having first seven slots 12a.
A second section 13b, having second seven slots 12b.
A central section 13c between the first section 13a and second section 13b, having a first central slot 14a and a second central slot 14b.

The commercially available PCB backplane 10 is designed to allow electrical point-to-point routing between the first seven slots 12a and the second seven slots 12b to the first central slot 14a and second central slot 14b respectively, wherein each slot is also connected to a control element 15. Thus the required channels are constructed from the designed differential routings.

It should be noted that the back side of the commercially available backplane 10 is similar to the frontal side (shown in FIG. 1B), as both sides are utilized for the routings of the slots. It is therefore possible to couple commercially available backplane connectors (further described in FIGS. 2A-2C) to the frontal side of the backplane such that a connection is created from a slot at the frontal side to a slot at the back side. In this way, the same commercially available backplane 10 provides multiple differential routing options.

FIG. 1C illustrates a frontal view of a first slot 12a, and FIG. 1D illustrates a frontal view of an enlarged segment 16 of the first slot 12a. Each first slot 12a can be regarded as divided into five segments 16, wherein each segment 16 has ten rows 18 of plated through holes 19. Typically, each row 18 has twelve through holes 19 (e.g. cylindrical). The through holes 19 are arranged substantially parallel to one another so that each through hole 19 serves as a conduit between the frontal side and the back side of the backplane 10.

A backplane connector (further described in FIGS. 2A-2C) having metallic pins (corresponding to the through holes 19) can be coupled to the frontal side of the backplane 10. An electric signal from this connector can then be transmitted from the frontal side to the back side due to the metallic plating of the through holes 19. The through holes 19 of the commercially available backplane 10 are also electrically connected in series so that this electric signal is further transmitted from the through hole 19 through a channel to a designated slot. It should be noted that while the first slot 12a is illustrated, the other slots of the backplane 10 have corresponding features.

It is therefore advantageous to modify the frontal and back sides of the backplane so that a non-electric signal (preferably an optical signal) is transmitted along the backplane, and thus provide increased data transfer rate in the entire architecture. Using similar backplane architecture with through holes at predetermined positions at the backplane, it may be possible to receive an electric signal from the backplane connector (further described in FIGS. 2A-2C) and convert this signal to a non-electric signal that can be transmitted along the modified backplane.

FIG. 2A illustrates a perspective view of a commercially available backplane connector 20. FIG. 2B illustrates a frontal view of the backplane connector 20, and FIG. 2C illustrates a top view of the backplane connector 20. The commercially available backplane connector 20 together with a front-board connector (not shown) establish a modular connector system, wherein the backplane connector 20 comprises backplane pins 21b, 22b, 23b at a back side 27b, capable of coupling the commercially available backplane connector 20 to a segment 16 of the backplane 10 (shown in FIGS. 1B-1D). The front-board connector comprises receptacles (not shown) corresponding to pin headers 21a, 22a, 23a at a front side 27a of the backplane connector 20. With this modular connector system, it is possible to couple the back side 27b of the backplane connector 20 to the through holes of the backplane 10, and also couple the front side 27a of the backplane connector 20 to the receptacles of the front-board connector (not shown).

Optionally, each slot of the backplane 10 (shown in FIGS. 1B-1D) has several backplane connectors 20 coupled to several segments 16 according to the required channel routings. Typically, the first and second sections 13a, 13b of the backplane 10 have a single backplane connector 20 coupled to each slot, and the central slots 14a, 14b (shown in FIG. 1B) have a backplane connector 20 connected to each of the segments in these slots.

The commercially available backplane connector 20 has a "U" shape with the pin headers 21a, 22a, 23a projecting from a base 25 and physically confined between a first wall 26a and a second wall 26b, wherein each wall has a plurality of supporting pillars 24. The first and second pin headers 21a, 22a are metallic and capable of conducting an electrical signal, while the third pin header 23a is connected to GND (i.e. grounded). The purpose of the third pin header 23a is to isolate (or electrically shield) an adjacent pair of first and second pin headers 21a, 22a from interfering cross-talk signals (for instance the third pin header 23a has an "L" shape). The pin headers 21a, 22a, 23a therefore create multiple triplets over the frontal side of the backplane connector 20, wherein the third pin headers 23a isolate adjacent pairs of first and second pin headers 21a, 22a. Similarly to the structure of a segment 16 of the backplane 10 (shown in FIGS. 1B-1D), the frontal side of the backplane connector 20 has ten rows with twelve pin headers in each row.

If the backplane connector 20 is coupled with the front-board connector (not shown), the first and second pin headers 21a, 22a engage corresponding receptacles through which the signal is transmitted, while the third pin header 23a engages a corresponding isolating receptacle.

At the back side 27b of the backplane connector 20, the first and second pin headers 21a, 22a are sufficiently elongated to pass through the base 25 and project as first and second backplane pins 21b, 22b respectively. In this way a signal from the front-board connector (not shown) passes from the first and second pin headers 21a, 22a and through the first and second backplane pins 21b, 22b. The third pin header 21a is sufficiently elongated to pass through the base 25 and project as the third backplane pin 23b, wherein the third backplane pin 23b has a shape similar to the first and second backplane pins 21b, 22b in order to engage the backplane pins with the through holes 19 (for instance as shown in FIG. 1D). It should be noted that the third backplane pins 23b provide additional mechanical support to the structure, with engagement of the through holes 19. Optionally, the third backplane pins 23b protrude from the base 25 without a physical connection to the third pin headers 21a.

In this way, the back side 27b of the backplane connector 20 has ten rows with twelve backplane pins in each row corresponding to the structure of a segment 16 of the backplane 10 (shown in FIGS. 1B-1D). Optionally, the third backplane pins 23b have a shape different from the first and second backplane pins 21b, 22b, while the shape of the third backplane pins 23b is still corresponding to the shape of the through holes 19 (shown in FIG. 1D). For convenience, the front side 27a of the backplane connector 20 has printed numeral indications on the row number so that the first row is indicated 29a with the numeral "1" and the tenth row is indicated 29b with the numeral "10".

It is therefore advantageous to modify the back side of the commercially available backplane connector to allow transition of a non-electric signal, while the frontal side is unchanged and capable of coupling with the front-board connector (not shown).

Referring now to FIGS. 3A-3C, these figures illustrate a modified backplane connector having a design modified from the commercially available backplane connector 20 (shown in FIGS. 2A-2C). FIG. 3A illustrates a perspective view of a modified backplane connector 30. FIG. 3B illustrates a frontal view of the modified backplane connector 30, and FIG. 3C illustrates a top view of the modified connector 30.

Similarly to the commercially available backplane connector 20 (shown in FIGS. 2A-2C), the modified backplane connector 30 has a "U" shape with pin headers 31a, 32a, 33a projecting from a front side 37a of a base 35 and physically confined between a first wall 36a and a second wall 36b, wherein each wall has a plurality of supporting pillars 34.

The first and second pin headers 31a, 32a are metallic and capable of conducting an electrical signal, while the third pin header 33a is grounded. The purpose of the third pin header 33a is to isolate (or electrically shield) an adjacent pair of first and second pin headers 31a, 32a from interfering cross-talk signals (for instance the third pin header 33a has an "L" shape). The pin headers 31a, 32a, 33a therefore create multiple triplets over the frontal side of the modified backplane connector 30, wherein the third pin headers 33a isolate adjacent pairs of first and second pin headers 31a, 32a. In accordance with the structure of a slot of the commercially available backplane 10 (shown in FIGS.

1B-1D), the frontal side of the modified backplane connector 30 has multiple rows with twelve pin headers in each row.

In some embodiments (for example as illustrated in FIGS. 3A-3C), the modified backplane connector 30 has forty rows, corresponding to couple to four segments 16 of the commercially available backplane 10 (as shown in FIGS. 1B-1D).

It should be noted that the frontal side of the modified backplane connector 30 may be regarded as identical to the frontal side of the commercially available backplane connector 20 (shown in FIGS. 2A-2C), where only the number of rows may differ. This identical structure is required in order to allow coupling the modified backplane connector 30 with the front-board connector (not shown). Namely, if compared to the commercially available backplane connector 20 (shown in FIGS. 2A-2C), only the back side of the modified backplane connector 30 is modified while the frontal side is unchanged.

At the back side 37b, the third pin headers 33a are sufficiently elongated to pass through the base 35 and project as the third backplane pins 33b similarly to the commercially available backplane connector 20 (shown in FIGS. 2A-2C). Optionally, the third backplane pins 33b protrude from the base 35 without a direct physical connection to the third pin headers 33a. It should be noted that the third backplane pins 33b may be identical to the backplane pins 23b of the commercially available backplane connector 20 (shown in FIGS. 2A-2C) since they are grounded and therefore do not require modification.

There is a significant difference in the structure of the modified backplane connector 30 at the back side 37b, wherein the first and second pin headers 31a, 32a pass through the base 35 and project as modified first and second backplane pins 31b, 32b respectively. Compared to the commercially available backplane connector 20 (shown in FIGS. 2A-2C), the modified first and second backplane pins 31b, 32b are modified with a predetermined reduction in length. For example, a manufacturer may modify a commercially available backplane connector by simply cutting the first and second backplane pins to a predetermined length. It should be noted that the third backplane pins 33b are unchanged as they provide additional mechanical support to the structure, with engagement of the through holes in the backplane, such that there is no need to modify them in order to use non-electric signals.

Additionally, the first and second walls 36a, 36b are extended at the back side 37b of the base 35 as first and second projections 38a, 38b respectively, wherein the first and second projections 38a, 38b extend to a predetermined length corresponding to the modified length of the first and second modified backplane pins 31b, 32b. The purpose of the shorter first and second backplane pins 31b, 32b, as well as the first and second projections 38a, 38b, will be further described hereinafter. In a further embodiment, instead of having the first and second projections 38a, 38b, the back side 37b of the base 35 is modified to a predetermined length.

Similar to the commercially available backplane connector 20 (shown in FIGS. 2A-2C), the back side 37b of the modified backplane connector 30 has multiple rows (typically forty rows) with twelve backplane pins in each row corresponding to the structure of the slots of the backplane 10 (shown in FIGS. 1B-1D). A modified backplane providing communication with a non-electric signal (further described in FIGS. 6A-7E) should therefore comprise a corresponding structure having through holes such that the modified backplane may engage the modified backplane connector 30.

Referring now to FIGS. 4A-5D, these figures illustrate an intermediate PCB that may be coupled with the modified backplane connector and also with a modified backplane, in order to produce an optical signal from the electrical signal arriving from the modified backplane connector. FIG. 4A illustrates a back view of an intermediate PCB 40, and FIG. 4B illustrates an enlarged segment of the intermediate PCB 40 shown in FIG. 4A.

The intermediate PCB 40 may be any typical PCB (e.g. a ceramic substrate) provided in a size and shape corresponding to the back side 37b of the modified backplane connector 30 (shown in FIGS. 3A-3C), such that the intermediate PCB 40 engages the modified backplane connector 30 between the first and second projections 38a, 38b (further described in FIGS. 5A-5D).

The intermediate PCB 40 may be provided with a plurality of intermediate plated through holes 49 at predetermined positions corresponding to through holes of the backplane. The thickness of the intermediate PCB 40 preferably substantially corresponds to the predetermined length of the first and second backplane pins 31b, 32b (for instance as shown in FIG. 3C), such that the intermediate through holes 49 are configured to allow accommodation of the first and second backplane pins 31b, 32b. Thus an electrical signal from the first and second backplane pins 31b, 32b passes to the plating of their corresponding through holes 49 and then passes to corresponding wiring for further processing. It should be noted that due to the length of the third backplane pins 33b, only the first and second backplane pins 31b, 32b are accommodated in the intermediate through holes 49 while the third backplane pins 33b may pass through the intermediate through holes 49 (further described in FIGS. 5A-5D) and engage the backplane.

In addition to the intermediate through holes 49, the intermediate PCB 40 further has a plurality of electro-optic signal converters 44. These signal converters 44 may be positioned in predetermined locations at the intermediate PCB 40 using known "wafer level optics" methods, such that each signal converter 44 is adjacent to a pair of first and second backplane pins 31b, 32b. It is therefore required that each signal converter 44 be electrically connected to the adjacent intermediate through holes 49 in order to allow conversion of optical signals to or from the electrical signal transmitted through the first and second backplane pins 31b, 32b that are accommodated in these intermediate through holes 49. Optionally, the signal converters 44 are positioned on the back side of the intermediate PCB 40 since they are required to couple the signal converters 44 with the modified backplane, and do not engage the front side with the backplane connector 30 (for instance as shown in FIG. 3C).

In this way an electrical signal from the front-board connector (not shown) passes from the first and second pin headers 31a, 32a and through the modified first and second backplane pins 31b, 32b (for instance as shown in FIG. 3C). This signal may then be converted with the signal converter 44 into an optical signal and further transmitted to the coupled modified backplane. For the opposite direction, an optical signal arriving from the modified backplane is converted into an electrical signal and passes through the modified first and second backplane pins 31b, 32b to the first and second pin headers 31a, 32a, and finally to the front-board connector (not shown).

FIG. 4C schematically illustrates the electro-optic signal converter 44. Each signal converter 44 comprises an optical element 42 and an electrical element 43 with two electrical connection pads (not shown) corresponding to the adjacent first and second backplane pins 31b, 32b. The optical element 42 is preferably a vertical-cavity surface-emitting laser (VCSEL) and converts an electric signal into an optical signal, while the electrical element 43 is preferably a photodiode and converts an optical signal into an electric signal. These components have known respondent ratios of electrons versus photons so that a predictable signal conversion takes place. In some embodiments, any other electro-optical conversion components (or their combination) may be used.

Optionally, a signal converter is either a transmitter (that converts the electrical signal into an optical signal) or a receiver (that converts the optical signal into an electrical signal) wherein their position is chosen according to the required backplane architecture. For example, half of the signal converters are transmitters and half are receivers in a predetermined order such that a signal is emitted from a transmitter and then received by a corresponding receiver.

FIG. 5A illustrates a perspective view of the modified backplane connector 30 coupled to the intermediate PCB 40, and FIG. 5B illustrates a top view of the same. The intermediate PCB 40 is coupled to the modified backplane connector 30, such that the intermediate PCB 40 is adjacent to the back side of the modified backplane connector 30 and positioned between the first and second projections 38a, 38b. The backplane pins of the modified backplane connector 30 are inserted into the through holes 49 of the intermediate PCB 40 (further described in FIGS. 5C-5D) such that only the third backplane pins 33b project from the intermediate PCB 40 and provide mechanical support for engaging the modified backplane connector 30 with a PCB.

The modified backplane connector 30 coupled to the intermediate PCB 40 forms an electro-optical connector 50, wherein the electric signal from the first and second backplane pins 31b, 32b (accommodated inside the intermediate PCB 40) is converted into an optical signal with the signal converters 44. Thus the electro-optical connector 50 may be coupled to a modified backplane (further described hereinafter) such that the modified backplane receives and/or transmits an optical signal from the electro-optical connector 50.

FIG. 5C illustrates a back view of the electro-optical connector 50, and FIG. 5D illustrates an enlarged segment of the electro-optical connector 50 shown in FIG. 5C. With all backplane pins accommodated in the plated through holes 49 of the intermediate PCB 40, the electrical signals (from the backplane pins) are converted into optical signals with the signal converters 44 due to corresponding electrical wiring (not shown) between the plating of the through holes 49 and the signal converters 44. It should be noted that the grounded third backplane pins 53 project from its through hole 49, and are configured to allow further coupling of the electro-optical connector 50 with a modified backplane. For example, a signal converter indicated as 54 may convert electrical signals from adjacent first and second backplane pins 51, 52 accommodated in the through holes 49, wherein the signal converter 54 has corresponding electrical wiring (not shown) to the adjacent pair of metallic backplane pins 51, 52. For example, the optical element 42 of the signal converter 54 (shown in FIG. 4C) is connected to the first and second backplane pins 51, 52, and similarly the electrical element 43 (shown in FIG. 4C) is connected to the first and second backplane pins 51, 52.

With this structure, if the electro-optical connector 50 is further coupled to a modified backplane, the signal converters 44 may transmit optical signals to the modified backplane, or alternatively convert an optical signal from the modified backplane to an electrical signal transmitted back to the electro-optical connector 50 through the first and second backplane pins 51, 52.

Referring now to FIGS. 6A-6D, these figures show the required steps of modifying a PCB backplane for an exemplary case where the PCB is only modified for a single slot. It should be noted that applying similar steps to the remaining PCB, the entire backplane may be modified so that all slots of the backplane are capable of transmitting an optical signal.

FIG. 6A illustrates a perspective partial cross-sectional view of a PCB backplane 61 perforated with a plurality of vias 68. In PCB design, a via 68 is a conduit passing through the board from a PCB front side 60a to a PCB back side 60b, usually used for transmission of an electrical signal to different layers in a PCB. Perforation of vias 68 in a PCB is a known process so that the PCB backplane 61 may be provided with the vias 68 in required locations. The desired position of the vias 68 may be chosen in accordance with the position of the signal converters 44 (as shown in FIG. 4A), wherein the vias 68 are positioned in pairs with each pair corresponding to a single signal converter 44. Therefore, a pair of vias 68 may have a first via 68 coupled to the optical element 42, and a second via 68 coupled to the electrical element 43 (as shown in FIG. 4C). Preferably, the vias 68 are positioned along two columns for each slot. In other embodiments, other arrangements for the vias 68 are possible.

In a further embodiment, the vias 68 may be filled with a substance capable of allowing uncontaminated optical communication (e.g. UV adhesives), in order to prevent dirt from disturbing the optical signal in the vias 68. In a further embodiment, the inner layers of the vias 68 are coated with a reflecting material (such as copper, gold etc.).

FIG. 6B illustrates a perspective partial cross-sectional view of a PCB backplane 62 further perforated with a plurality of backplane through holes 69. The through holes 69 correspond in position to the intermediate through holes 49 accommodating only the third backplane pins 33b (for instance as shown in FIG. 4A), since the first and second backplane pins 31b, 32b do not project from the intermediate through holes 49. It should be noted that since the purpose of the vias 68 is to pass an optical signal to an opposite side of the PCB backplane 62, the vias 68 may have a smaller diameter than the through holes 69 as no physical element is introduced into the vias 68. Therefore, the diameter of the vias 68 is defined only by the required optical characteristics (for instance based on existing via technology used in PCB design).

It is therefore possible to couple the electro-optical connector 50 (shown in FIGS. 5A-5D) to the PCB backplane 62 such that the third backplane pins 33b are accommodated in the backplane through holes 69, thereby enhancing mechanical support of the coupling with the third backplane pins 33b. Furthermore, the third backplane pins 33b may provide enhanced precision in positioning of the signal converters 44 in respect to corresponding optical elements at the backplane so that optimal stability may be achieved.

FIG. 6C illustrates a perspective partial cross-sectional view of a PCB backplane 63 further corrugated with transversal V-cut first grooves 66a on the front side 60a, and additional first grooves 66b on the back side 60b corrugated in parallel to the first grooves 66a on the front side 60a. The predetermined positioning of the first grooves 66b on the back side 60b relative to the first grooves 66a on the front side 60a is chosen for optimal signal transmission through an optical fiber (further described hereinafter), such that the first grooves 66b on the back side 60b are not aligned with the first grooves 66a on the front side 60a. In a preferred embodiment, these transversal V-cut first grooves are positioned in sets of four grooves, with ten of such sets positioned for the entire PCB (thus having forty grooves on each side).

This corrugation may be firstly made with a typical wafer saw, cutting to a depth of about 100 microns (whereby the typical depth of a PCB is in the order of 1000-2500 microns) and only in the surface layers of the PCB, so that the intermediate layer (possibly having built-in circuitry) is unchanged. It is therefore possible to create the first grooves 66a on the front side 60a, and additional first grooves 66b on the back side 60b using known methods.

Each transversal V-cut first groove 66a, 66b has a depth configured to allow accommodation of an optical fiber. By positioning an optical fiber (for example an OM4 multimode fiber) in each first groove 66a on the front side 60a, and also in each of the first grooves 66b on the back side 60b (further described in FIGS. 7A-7B), the PCB backplane 63 gains a new medium through which an optical signal may be transmitted. The coupling of the backplane PCB 63 to the optical fiber may be robotically or manually executed, as the optical fibers usually have a diameter in the order of 100 microns and therefore may be simply dropped by hand into the V-cut first grooves. In some embodiments, single mode fibers can also be used. By coupling the optical fibers to the V-cut first grooves 66a, 66b along the lines 66c (indicated with a dashed line in FIG. 6A) created by the vias 68 using known processes, a greater precision may be achieved in the positioning of the optical fibers.

Optionally, commercially available optical fibers may be stripped from their protective cover so that only the core remains (typically with a diameter of 10 microns). Such modified optical fibers may be coupled to the backplane due to the V-cut shape of the first grooves as even smaller diameters may be accommodated.

In some embodiments, this procedure may not be applied to the back side 60b of the backplane PCB 63 (i.e. without corrugation for first grooves 66b) in cases where the architecture of the telecommunication system requires fewer channels.

The following step to be performed is to fill the first grooves 66a on the front side 60a, and also the first grooves 66b on the back side 60b with a light sensitive curing adhesive (e.g. UV adhesive) and radiate the entire area containing multiple optical fibers, in order to harden the light sensitive curing adhesive so that the optical fibers attach to the backplane PCB 63 and provide cladding with known optical properties.

FIG. 6D illustrates a perspective partial cross-sectional view of a PCB backplane 64 which is further corrugated with longitudinal V-cut second grooves 67a on the front side 60a, and additional second grooves 67b corrugated on the back side 60b. The corrugation of the second grooves is carried out in the same method as the corrugation of the first grooves, however the second grooves are perpendicularly positioned relative to the first grooves. Similar to the first grooves, the predetermined positioning of the second grooves 67b on the back side 60b relative to the second grooves 67a on the front side 60a is chosen for optimal signal transmission through the optical fibers, such that the second grooves 67b on the back side 60b are parallel but not aligned with the second grooves 67a on the front side 60a in order to avoid a situation where a via 68 connects a second groove 67a on the front side 60a to a second groove 67b on the back side 60b and the signal passes incorrectly (further explained hereinafter). In a preferred embodiment, there are two longitudinal V-cut second grooves on each side of the modified PCB backplane 64 (corresponding to one slot).

It should be noted that the first grooves 66a on the front side 60a, and also the first grooves 66b on the back side 60b are all coupled to an optical fiber at this stage, so that the second corrugation (perpendicular to the first corrugation) occurring after the optical fibers are coupled to the first grooves may further create V-cuts through the optical fibers. The second corrugation is carried out along longitudinal lines 67c (indicated with a dashed line in FIG. 6A) of the existing vias 68, and thus produces a "V" shaped gap above each via 68 (further described hereinafter).

In a preferred embodiment, the second corrugation creates deeper second grooves 67a, 67b compared to the first grooves since the size of the second grooves 67a, 67b is not confined by the size of optical fibers. Such deeper second grooves 67a, 67b may therefore be utilized for directing the optical signal with additional electro-optical elements coupled to the second grooves 67a, 67b (further explained hereinafter). Thus, same cutting methods may be used in order to cut the optical fibers, thereby providing a significant advantage in accurate positioning of the optical fibers and their corresponding elements.

In a further embodiment, only one side of the PCB backplane is utilized so that there is no need for vias or corrugations on the back side. Accordingly, fewer signal converters are required on the intermediate PCB.

Referring now to FIGS. 7A-7C, these figures illustrate several enlarged segments of the PCB backplane. Each first groove 66a on the front side 60a houses an optical fiber 76a, and similarly each first groove 66b on the back side 60b accommodates an optical fiber 76b. On the front side 60a, the edges 68' of the vias 68 are shown in the predetermined positions across the modified backplane 64. These edges 68' are configured to allow coupling the vias 68 to the signal converters 44 of the electro-optical connector 50 (for instance as shown in FIG. 4A) by positioning the signal converters 44 directly over the edges 68' such that a signal is transferred from the signal converters 44 through the vias 68 to the back side 60b.

It should be noted that the signal converters 44 are positioned along four columns in the intermediate PCB 40 (shown in FIG. 4A), thereby corresponding to the second grooves 67a, 67b in the modified PCB backplane 64. Namely, two columns of the signal converters 44 correspond to the second grooves 67a on the front side 60a, and two columns of the signal converters 44 correspond to the second grooves 67b on the back side 60b. Furthermore, if the first grooves 66a, 66b are provided in sets of four (as mentioned above) then in each set: two first grooves correspond to a second groove 67a on the front side 60a, and two first grooves correspond to a second groove 67b on the back side 60b, wherein a signals may be transmitted to an opposite side of the modified backplane through the vias 68.

FIG. 7B illustrates a cross-sectional view of an enlarged segment of the PCB backplane. The first grooves 66a on the front side 60a are corrugated such that the first grooves 66a do not engage the edges 68' of the vias 68 (as shown in FIG. 7A). However, the vias 68 engage the "V" shaped second grooves 67b on the back side 60b, such that a signal may pass from the second grooves 67b on the back side 60b through the vias 68 to the front side 60a (or vice versa) without engaging the optical fibers in the first grooves 66a, 66b.

It should be noted that the vias 68 do not extend to the full thickness of the modified backplane 64, as there are no via edges 68' on the back side 60b. The vias 68 are positioned on the intersection of the first and second grooves on the back side 60*b* such that a path is created from the front side 60*a*. Therefore, the signal may only pass through the vias 68 from the edges 68' of the vias 68 (shown in FIG. 7A) on the front side 60*a* to the second grooves 67*b* on the back side 60*b*. Alternatively, the signal may pass through the vias 68 from the second grooves 67*b* on the back side 60*b* using additional electro-optical elements (further described hereinafter) engaged with the edges 68' of the vias 68 on the front side 60*a*.

In some embodiments, a prism (or any other similar optical element) having a coating with known optical properties (e.g. known refractive index) may be placed in these "V" shaped gaps, where the optical fibers 76*a*, 76*b* are cut by the second corrugation. In this way, information may be transferred through the optical fibers 76*a*, 76*b* and/or through the vias 68. The transferred intensity may be controlled using a prism with a different preselected coating having different properties. In a further embodiment, this prism may be elongated so that a single prism may fit into multiple "V" shaped gaps, such that the same elongated prism couples to multiple optical fibers 76*a*, 76*b*.

FIG. 7C illustrates a perspective view of an enlarged segment of the modified PCB backplane 64. FIG. 7D illustrates a frontal view of the modified PCB backplane 64, and FIG. 7E illustrates a back view of the modified backplane 64. The structure of the backplane 64 has corresponding features on the front side 60*a* and on the back side 60*b*, wherein the first groove 66*a* and second groove 67*a* on the front side 60*a* are parallel but not aligned to corresponding first groove 66*b* and second groove 67*b* on the back side 60*b*, respectively. It should be noted that the through holes 69 provide only a means for physically coupling the modified backplane to the electro-optical connector and thus do not have any electro-optical features, whereas the other elements of the modified backplane 64 (i.e. the grooves, vias and optical fibers) are configured to allow an electro-optical medium for signal transmission.

Referring now to FIGS. 8A-8C, these figures show the modified PCB backplane coupled to additional optical elements. FIG. 8A schematically illustrates a cross-sectional partial view of the first grooves 66*a*, 66*b* with optical elements 87*a*, 87*b* coupled to the second grooves 67*a*, 67*b*, respectively. It should be noted that while the purpose of the vias 68 is to pass signals from the signal converters 44 of the electro-optical connector (not shown) to the second grooves 67*b*, the vias 68 do not interrupt the signal passing through the optical fiber 76*a* in the first groove 66*a* on the front side 60*a* since the first grooves 66*a* do not engage the vias 68 (as explained above).

At every location where the second corrugation creates a "V" shaped gap with cutting surfaces 81*a*, 81*b* for the optical fiber, an element (for instance a prism) with known optical properties may be placed in order to direct the optical signal in a desired path. Thus, frontal optical elements 87*a* may be placed in the second grooves 67*a* of the front side 60*a*, and similarly back optical elements 87*b* may be placed in the second grooves 67*b* of the back side 60*b*. These elements may all be of the same type, or alternatively each "V" shaped gap may be coupled with an element of a different type according to the requirements of the system. For example on the back side 60*b*, an optical signal emitted from a signal converter 44 passes through the via 68 to interact with the back optical element 87*b*, and is then directed into the optical fiber 76*b* in the first groove 66*b* through the cutting surface 81*b*.

For example on the front side 60*a*, an optical signal emitted from a signal converter 44 interacts with a front optical element 87*a* and is directed into the optical fiber 76*a* in the first groove 66*a* through the cutting surface 81*a*. This signal may continue to pass until engaging another cutting surface 81*a* so that an additional front optical element 87*a* may direct the signal forward in the optical fiber 76*a*, or alternatively towards an adjacent signal converter 44 to be converted into an electrical signal. The direction of the optical signal is controlled by the type of the front optical element 87*a*, whereby a specific type may be employed for specific requirements of the system.

Optionally, a single elongated element (for instance an elongated prism) is placed along the second grooves so that there is no need to place an individual element at each "V" shaped gap in the optical fiber.

FIG. 8B schematically illustrates a cross-sectional partial view of a first groove 66*b* on the back side 60*b* with additional optical elements 88*a*, 88*b*, 88*c* coupled to the second grooves 67*b* and passing a signal from a single transmitter (with direction of dashed arrows indicating the direction of the signal). This embodiment 80 illustrates a signal emitted from a single transmitter 83*a*, with n additional receivers 85*a*-85*n* that receive the signal from the single transmitter 83*a*, wherein the modified backplane is further corrugated in a similar way to have multiple second grooves corresponding to multiple slots. It should be noted that all transmitters and receivers are actually the signal converters 44 (for instance shown in FIG. 8A), that have been pre-selected to perform a specific operation. Therefore a signal converter 44 designated to be a transmitter 83*a* operates an optical element 42, whereas signal converters 44 designated to be receivers 85*a*-85*n* operate an electrical element 43 so that the received optical signal is converted into an electrical signal.

The additional optical elements 88*a*, 88*b*, 88*c* coupled to the second grooves 67*b* are typically prisms with cladding of known optical properties. In order to pass a high quality signal to various receivers, it is required to use different types of claddings. A first prism 88*a* receives the signal from the transmitter 83*a* through the via 68. Thus the first prism 88*a* has cladding with properties of ~100% transmission and ~0% reflection as the entire signal should pass from the first prism 88*a*.

The signal then passes to a second prism 88*b* having cladding with properties of ~90% transmission and ~10% reflection so that about 10% of the signal is reflected through the adjacent via 68 and towards a first receiver 85*a*, while the rest of the signal passes on the fiber. The signal passes in a similar way through n prisms with corresponding cladding properties, until the signal engages a final prism 88*c* having cladding with properties of ~0% transmission and ~100% reflection so that the entire signal from the final prism 88*c* passes through the adjacent via 68 towards the final receiver 85*n*. In this way, the signal is received in multiple end points while a similar procedure is impossible with electrical signals due to significant reductions in the quality of the electrical signal.

Optionally, an optical adhesive substrate with known optical properties is added to the second grooves 67*b* such that the signal passes in the groove without interferences with air gaps. Additionally, back scatter from the cutting surface 81*a* may be prevented due to the presence of such a substrate.

FIG. 8C schematically illustrates a cross-sectional partial view of a first groove 66*b* on the back side 60*b* with additional optical elements coupled to the second grooves 67b and passing a signal from multiple transmitters (with direction of dashed arrows indicating the direction of the signal). Similar to the embodiment 80 illustrated in FIG. 8B, the same prisms 88a-88c having various cladding properties may be utilized in order to achieve different operations with the signal, whereby only the operation of the signal converters is modified. This embodiment 82 illustrates a signal emitted from n transmitters 83a-83n, with a single receiver 85a. The first transmitter 83a emits a signal to the final prism 88c, having cladding with properties of ~0% transmission and ~100% reflection so that the entire signal from the final prism 88c passes towards the first prism 88a, wherein each transmitter emits a signal that is reflected from an adjacent prism and transmitted through the remaining prisms until the signal arrives at the single receiver 85a.

It is appreciated that these configurations may be accomplished due to the nature of the optical fiber 76b that allows transmitting multiple signals at the same time, contradictory to commercially available electrical circuitry where only a single transmitter and single receiver are present. Therefore, with the modified backplane architecture it is possible to employ elements consuming lower power than electrical elements (in commercially available solutions) that send signals into transmission lines. Furthermore, due to the multimode feature of the optical fiber, providing simultaneous bidirectional signal transmission, a single optical channel available with the modified backplane configuration may replace two channels of commercially available electrical transmission lines. With such reduction in space on the backplane, where commercially available electrical channels require intervals between the transmission lines (to prevent cross-talk), it is possible to have a full transmission line as a bidirectional channel with simultaneous transmitting and receiving through every pair of backplane pins.

It should be noted that by initially coupling the modified backplane with such prisms, the required architecture of the system may be achieved by selecting a desired operation of the signal converters, i.e. selecting a signal converter to operate as a transmitter or a receiver. Furthermore, multidirectional coupling to such optical elements provides several transmission configurations. For example:

"Point-to-point", where the optical signal is transmitted from the optical fiber to the modified electro-optical connector, or alternatively in the opposite direction from the electro-optical connector to the optical fiber.

"Half-Mesh" (point to multi-point), where a portion of the optical signal is transmitted to the modified electro-optical connector and the remaining signal is further transmitted to the optical fiber, such that multiple processing cards (modularly coupled to the electro-optical connector) may receive the transmitted signal.

"Full-Mesh" (multi-point to multi-point), where all processing cards may simultaneously receive and transmit information through these optical fibers.

In some embodiments the optical fibers allow multimode signal transmission, thus multiplexing the transmission of the processing cards may be accomplished through time multiplexing (with synchronized transmission), or through frequency multiplexing such that every processing card transmits in a different frequency (having a different wavelength or "color") allowable in the multimode optical fibers. Such multiplexing may require coupling a multi-transmitter to the central processing cards (corresponding to the central slots).

Referring now to FIGS. 9A-9D, these figures illustrate a simulation of optical signal transmission in an embodiment 90 with spherical lenses coupled to the modified backplane (with direction of dashed arrows indicating the direction of the optical signal). Spherical lenses 96 (typically with diameter of ~0.2-1 mm) are known optical elements that provide optimal beam concentration. The spherical lenses 96 may be coupled to the signal converters 44 (shown in FIG. 4A), or alternatively coupled to the via edges 68' (shown in FIG. 7A). The elements of the signal converters 44 (typically with diameter of ~60 microns) coupled to the spherical lenses 96 may then have improved performance due to the beam concentration. Optionally, the spherical lenses 96 may be dropped into predetermined locations on the modified backplane, similarly to dropping optical fibers after the first corrugation.

FIG. 9A illustrates a partial view of a first groove 66b on the back side 60b with additional optical elements coupled to the second grooves 67b and capable of passing a signal from three transmitters 93a-93c to a receiver 95. The second grooves 67b are coupled with prism like elements having a structure configured to allow optimal transmission of the signal. The via edges 68' are coupled to the spherical lenses 96, wherein the signal passes through theses spherical lenses 96. Optionally, the prismatic elements 98a-98d have cladding in order to keep the signal in the optic fiber 76b.

It should be noted that similarly to the embodiment illustrated in FIGS. 8B-8C, the three transmitters 93a-93c and the receiver 95 are actually elements of the signal converters 44 (for instance shown in FIG. 8A), that have been pre-selected to perform a specific operation. For example, a signal converter 44 designated to be a transmitter 93a operates the optical element 42.

FIG. 9B schematically illustrates a cross-sectional view of a simulation of a signal emitted from the third transmitter 93c, FIG. 9C schematically illustrates a cross-sectional view of a simulation of a signal emitted from the second transmitter 93b, and FIG. 9D schematically illustrates a cross-sectional view of a simulation of a signal emitted from the first transmitter 93a. It should be noted that a signal emitted from a transmitter 93a-93c passes through the vias 68 and engages a corresponding prismatic element 98a-98c such that the signal passes the fourth prismatic element 98d and arrives at the receiver 95 with minimal back scatter. This is achieved due to the properties of the prismatic elements 98a-98d, and also due to the spherical lens 96 concentrating the beam back to the receiver 95.

Referring now to FIGS. 10A-10C, these figures show the electro-optical connector 50 coupled to the modified PCB backplane 64 as a complete electro-optical telecommunication system 100. The modifications to the connector and to the backplane allow assembling the electro-optical telecommunication system 100 such that it may further engage the front board connector of the processing cards (not shown). It should be noted that while the system illustrated in FIGS. 10A-10B shows second grooves 67a, 67b for a single slot, preferably similar corrugations along the backplane may be carried out in a similar way in order to provide a full system with multiple electro-optical connectors, wherein each connector corresponds to one slot.

FIG. 10A illustrates a perspective view of the electro-optical telecommunication system 100, and FIG. 10B illustrates a partial side view of an enlarged segment of the electro-optical telecommunication system 100. FIG. 10C illustrates a partial perspective back view of an enlarged segment of the electro-optical telecommunication system 100. In contrast to commercially available systems, the electro-optical telecommunication system 100 has V-cut grooves 67a, 67b along the backplane 64 with only the third backplane pins 33b projecting through the back side 60b of the backplane 64. Thus, by modifying the connector and the backplane a significant improvement of the system may be achieved.

Referring now to FIGS. 11A-11E, these figures show a communication channel of a backplane modified for all slots as described above. FIG. 11A illustrates a frontal view of the optical fiber 76a on a modified backplane 110. It should be noted that while the modified backplane 110 is corrugated with first and second grooves, they are not visible in these figures. However, the optical fiber 76a is placed along a first groove, and the direction of the second grooves 67a, 67b is indicated with dashed lines in FIGS. 11B-11E. Comparing the modified backplane 110 with the commercially available PCB backplane 10 (shown in FIG. 1B), it becomes clear how the architecture of the ATCA may be maintained with the modified backplane 110 while providing significant improvements in the telecommunication system. While only two channels are shown (one channel passing through four optical fibers), a corresponding wiring throughout the modified backplane may provide improved information transfer to the central slots 11C, so that the required architecture of the board may be realized.

FIGS. 11B-11D illustrate a frontal view of enlarged segments 11b-11d respectively of the modified backplane 110 (shown in FIG. 11A). It should be noted that the backplane illustrated in these figures also shows elements of the intermediate PCB 40 (shown in FIG. 4A), while the body of the intermediate PCB 40 is not shown. Namely the signal converters 44, and the backplane pins 31b, 32b, 33b inside the through holes 49 of the intermediate PCB. Furthermore, the internal electrical wiring 114 of the intermediate PCB connects the first and second backplane pins 31b, 32b to an adjacent signal converter 44.

FIG. 11E illustrates the back view of an enlarged segment of the modified backplane, corresponding to the enlarged segment shown in FIG. 11D. It should be noted that the signal converters 44, and the backplane pins 31b, 32b, 33b inside the through holes 49 of the intermediate PCB are shown on the back side for clarity while actually positioned on the frontal side. A signal from the backplane pins 31b, 32b is converted by the signal converter 44 and may pass to the back side through a via (not shown). This signal may then progress in the optical fiber 76b according to the chosen architecture until it is transferred back through the vias and to the backplane pins 31b, 32b.

It is possible to select the signal converters 44 along the path of the optical fiber 76b to be transmitters or receivers (as described above) so that a single channel may have multiple transmitters or receivers. For example, a signal initiated in the beginning of the optical fiber 76b has multiple receivers intercepting the signal until it arrives at the central slots. This feature cannot be achieved with commercially available architecture.

The proposed architecture (with one transmitter and multiple receivers) may allow to broadcast information using a single channel such that additional channels (e.g. up to six) are freed for additional transmitting, wherein the commercially available architectures dedicate an entire slot for a communication channel (as only a single receiver is allowed). Thus, the backplane transmission capacity may be increased by a factor of six.

In the case that multiple transmitters are used with a single receiver on each channel, time multiplexing may be used for optimizing the efficiency of each channel. The backplane boards may then communicate and get access to the shared communication channel by predefined priority (e.g. "round robin" or any other pattern).

It is appreciated that the abovementioned embodiments describe an electro-optical solution wherein the conversion from an electrical signal to an optical signal (or vice versa) is carried out at the signal converters that are embedded into the backplane connector. With this solution, the electrical signal passes from the processing cards to the front-board connector and then to the backplane connector, until the electrical signal is converted into an optical signal. While this is a complete solution that allows improved operation compared to commercially available solutions, it is also advantageous to increase the number of communication channels with another type of connector.

Referring now to FIGS. 12A-12D, these figures show a passive motherboard connector 120 with an alternative method of coupling, and delivering optical signals, to the backplane. It should be noted that using this method for coupling to the backplane, the conversion from an electrical signal to an optical signal (or vice versa) is carried out at a modified (front) electro-optical daughter board connector, further described hereinafter, such that the passive connector only delivers an optical signal and therefore does not degrade the reliability of the passive backplane and allows a higher number of channels to be transferred.

FIG. 12A illustrates a perspective view of a passive motherboard connector 120. FIG. 12B illustrates a frontal view of the passive motherboard connector 120, and FIG. 12C illustrates a back view of the same showing its external side 127b. The motherboard passive connector 120 has a "U" shape (similarly to the modified connector 30, for instance as shown in FIG. 3A. The passive motherboard connector 120 comprises a plurality of tunnels 122 (preferably cylindrical) passing from a front side 127a to a back side 127b of a base 125, Additionally, the passive motherboard connector 120 further comprises a plurality of coupling pins 123 that provide mechanical support when the passive motherboard connector 120 is engaged with the modified backplane, such that these coupling pins 123 may couple the passive motherboard connector 120 to the modified backplane. In some embodiments, at least some of the coupling pins 123 comprise an elastic material and have an elliptic shape in order to allow optimal coupling to a corresponding aperture (further described hereinafter).

It is appreciated that in contrast to the previously mentioned embodiments, the passive motherboard connector 120 has an oblique spread of the tunnels 122, for instance as noted with a dashed line 129 in FIG. 12C. With such a spread, it may be possible to provide a greater number of channels with the passive motherboard connector 120, since the oblique spread takes a smaller space than the standard spread. In addition, the GND pins associated with each pair of the abovementioned electrical motherboard connectors can be eliminated. Specifically, it may be possible to provide hundred channels (10 rows, 19 channels per row) with the passive motherboard connector 120, in contrast to the forty channels (10 rows, 4 channels per row) available with the modified connector (as mentioned above).

FIG. 12D illustrates a cross-sectional perspective view of the passive motherboard connector 120. It should be noted that the inner space 121 of each tunnel 122 is configured to allow passage of an optical signal and/or of an optical fiber (further described hereinafter).

Referring now to FIGS. 13A-13B, these figures show a passive intermediate optical layer 131 (similar to the intermediate PCB 40, for instance as shown in FIG. 4A) that is configured to couple with the back side 127b of the passive connector 120, and additionally couple with the modified backplane. FIG. 13A illustrates a perspective view of the passive intermediate optical layer 131, and FIG. 13B illustrates a perspective back view of the passive intermediate optical layer 131 coupled to the back side of the passive connector 130.

The passive intermediate optical layer 131 may be required in order to adjust the light beam so as to fit the diameter of the passages in the modified backplane. Namely, the diameters of the passages in the modified backplane are smaller than the typical diameter of an optical fiber (or holes). Thus, the passive intermediate optical layer 131 may be positioned between the fibers (or holes) and the backplane so as to focus the beam (having a compatible diameter) to pass towards the modified backplane. In this way, the passive connector may be manufactured with perforations in diameters that are bigger than the diameter in the modified backplane, and therefore the perforations in the passive connector may be easier to create.

It should be noted that in contrast to the intermediate PCB 40 (for instance as shown in FIG. 4A), the passive intermediate optical layer 131 has no electrical components and is merely a passive plate that is intended to align the optical signal passing from the passive motherboard connector 120 towards the modified backplane (further described hereinafter). The passive intermediate optical layer 131 has a plurality of apertures 132 (which could be printed lenses or other optical means) corresponding in position to the tunnels 122 of the passive motherboard connector 120. Therefore, by coupling the passive intermediate optical layer 131 to the back side 127b of the passive connector 130, each optical tunnel (air or waveguide) 122 passes through the corresponding optical layer "lens" 132. Furthermore, the passive intermediate optical layer 131 has a plurality of pin holes 133 corresponding in position to the mounting pins 123. Optionally, the mounting pins 123 do not interfere with the rows of tunnels 122 and are for example provided in a single row at the top and a single row at the bottom.

It is appreciated that similarly to the tunnels 122 of the passive connector 120, the apertures 132 also have an oblique spread, indicated with a dashed line 139.

Referring now to FIGS. 14A-14B, these figures show a protection plate 141 that is configured to couple with the front side 127a of the passive motherboard connector 120, and additionally couple with a modified electro optical daughter board connector (further described hereinafter). FIG. 14A illustrates a perspective view of the protection plate 141, and FIG. 14B illustrates a perspective back view of the protection plate 141 coupled to the front side of the backplane passive connector 140 that is further coupled to the passive intermediate optical layer 131.

The protection plate 141 (e.g. made of Silicon) has no electrical components and is merely a passive plate that is intended to protect the passive motherboard connector 120 from damages, and especially protect from dust collection. It should be noted that since not all slots are constantly coupled to a processing board at the terminal, some connectors might be left inoperative for some period of time and therefore collect dust (at the free space) that decreases the quality of signal transmission.

The protection plate 141 has a plurality of openings 142 corresponding in position to the tunnels 122 of the passive motherboard connector 120. Furthermore, the protection plate 141 may have at least one interstice 144 corresponding in position to the pillars 124. Therefore, by coupling the protection plate 141 to the front side 127a of the backplane passive connector 140, each tunnel 122 is aligned with a corresponding opening 142.

It is appreciated that similarly to the tunnels 122 of the passive connector 120, the openings 142 also have an oblique spread, indicated with a dashed line 149.

In some embodiments, the openings 142 may be elastic passages (e.g. with an "X" shape) that in a closed state don't allow any material to pass. Once physically engaged, for instance with an optical fiber, the openings 142 sufficiently deform to allow the entrance of a desired material having the predetermined shape. An opening in an open state is illustrated and indicated as open state opening 143.

Referring now to FIG. 15, this figure illustrates a partially cross-sectional view of the protection plate 141 coupled to the front side of the motherboard passive connector 150 that is coupled to the passive intermediate optical layer 131, and further comprises a waveguide 152 in each tunnel 122. In this embodiment, the inner space 121 of each tunnel 122 is fitted with a waveguide 152. These waveguides 152 may allow improved aligning of the optical signal and/or prevent backscatter of the optical signal into the surroundings.

Referring now to FIG. 16A-16C, these figures show an electro-optical daughter board connector 160 that is configured to couple with the motherboard passive connector. FIG. 16A illustrates a perspective view of the electro-optical daughter board connector 160. The electro-optical daughter board connector 160 comprises a plurality of connector optical modules 162 that extend from a frontal side 167a to a bottom side 167b (further described hereinafter). The connector optical modules 162 preferably protrude from the frontal side 167a of the electro-optical daughter board connector 160, so as to correspond with the openings 142 of the motherboard passive connector (for instance as shown in FIG. 15). Therefore, the connector optical modules 162 also have an oblique spread, indicated with a dashed line 169.

The electro-optical daughter board connector 160 may further comprise at least one leg 164 having a shape corresponding to the interstices 144 (for instance as shown in FIG. 14A) of the passive connector, such that by coupling the electro-optical daughter board connector 160 with the passive connector, the frontal side 167a of the electro-optical daughter board connector 160 may be flush with the frontal side of the protection plate 141 attached to the front side of the motherboard passive connector, whereby the at least one leg 164 is accommodated at the interstices 144. It should be noted that the graded fiber structure may be required in order to prevent "over-molding" of the fibers during manufacture and allow the optical fibers to remain apart from each other.

In some embodiments, the electro-optical daughter board connector 160 is combined of several connector units 161, as a single module. FIG. 16B illustrates a perspective view of a connector unit 161, and FIG. 16C illustrates a partially cross-sectional view of the same. It is appreciated that with a modular structure for the electro-optical daughter board connector 160, having several connector units 161, the operating communication channels may be determined with insertion of a desired connector unit 161 into the electro-optical daughter board connector 160.

Each connector unit 161 comprises a plurality of the connector optical fibers 162 that are spatially distributed such that a misaligned oblique spread is created, corresponding to the oblique spread of the openings 142 (for instance as shown in FIG. 15). It is appreciated that these connector optical fibers 162 have optimal distribution in the limited space of the connector unit 161, whereby a maximal number of fibers is utilized. Preferably, each connector unit 161 has ten such connector optical fibers 162 extending from the frontal side 167a to the bottom side 167b, such that the combined electro-optical daughter board connector 160 may has hundred channels in total (with ten connector units 161).

Furthermore, each connector unit 161 may have a hook 166 that is configured to allow locking the connector units 161 assembled as the electro-optical daughter board connector 160 using a locking element 168 (for instance as shown in FIG. 16A).

Referring now to FIG. 17A-17D, these figures show an electro-optical substrate that is coupleable with the bottom side 167*b* of the electro-optical daughter board connector 160. FIG. 17A illustrates a top view of an electro-optical sliced substrate 170, and FIG. 17B illustrates a partially cross-sectional bottom view of the same. The electro-optical sliced substrate 170 is perforated with vias 178 (similar to the vias 68, for instance as shown in FIG. 6A). The positioning of these vias 178 corresponds to the positioning of the connector optical fibers 162 at the bottom side 167*b* of the electro-optical daughter board connector 160 (for instance as shown in FIG. 16C), such that via 178 corresponds to a single connector optical fiber 162. Thus, the vias 178 also have an oblique spread, indicated with a dashed line 179. Preferably, in the suggested structure the electro-optical substrate 170 may have 10 vias 178 per slice. In some embodiments, the electro-optical substrate 170 may be structured as one unit.

The bottom side of the electro-optical substrate 170 has a plurality of electro-optical signal converters (similarly to the signal converters mentioned above for the intermediate PCB), as may be appreciated form FIG. 17B. Each of these electro-optical signal converters comprises an transmitter optical element 172 and an adjacent receiver electrical element 173, wherein each via of vias 178 is coupled both to the transmitter optical element 172 and/or the receiver electrical element 173. Optionally, the electro-optical signal converters (receiver and transmitter) are connected through traces on the electro-optical substrate 170 to soldering balls 171.

FIG. 17C illustrates a perspective view of an electro-optical daughter board connector 175 coupled to the electro-optical substrate 170. It is appreciated that the electro-optical signal converters serve as a transmitter or/and receiver of the optical signal that passes through the vias 178 to the connector optical fibers 162 (or vice versa), wherein each pair (i.e. receiver and transmitter) is coupled to a single connector optical fiber 162.

Referring now to FIG. 17D, this figure illustrates an alternative embodiment to the electro-optical substrate, with a glass electro-optical substrate 177. It should be noted that this substrate may be also any material similar to glass, having transparent features.

Referring now to FIG. 17D, this figure illustrates an alternative embodiment to the electro-optical substrate, with a transparent electro-optical substrate 177. It should be noted that this substrate may be also any material similar to glass, having heat conducting features.

The glass electro-optical substrate 177 comprises on the bottom side a plurality of electro-optical signal converters (similarly to the signal converters for the non-transparent electro-optical substrate, as shown in FIGS. 17A-17B), that are positioned obliquely corresponding to the position of the connector optical fibers 162 on the bottom side 167*b* of the electro-optical daughter board connector 160. Each of these electro-optical signal converters comprises a optical element 172 and an adjacent electrical element 173. Optionally, the electro-optical signal converters (i.e. receiver and transmitter) may be coupled to the glass electro-optical substrate 177 through traces with soldering balls 171.

It is appreciated that in contrast to the non-transparent electro-optical substrate 170 (as shown in FIGS. 17A-17B), the glass electro-optical substrate 177 has no vias, thereby having a simpler structure as no perforations are required. Due to the transparent feature of the glass electro-optical substrate 177, optical signals may pass through the glass electro-optical substrate 177 without the need for a passage such that of the vias.

It is appreciated that in contrast to the non-transparent electro-optical substrate 170 (as shown in FIGS. 17A-17B), the glass electro-optical substrate 177 may include optical elements (like printed lenses) that can optimize the optical coupling between the transparent electro-optical substrate and the electro-optical daughter board connector 160.

Referring now to FIGS. 18A-18B, these figures show a single mirror based unified electro optical daughter board connector 180 that is configured to couple with the motherboard passive connector, as an alternative embodiment to the electro-optical daughter board connector 160 (for instance as shown in FIG. 16A). FIG. 18A illustrates a perspective view of the mirror based unified electro-optical daughter board connector 180 coupled to the protection plate 141, and FIG. 18B illustrates a cross-sectional side view of the mirror based unified electro-optical daughter board connector 180 coupled to the protection plate 141 and also to the passive connector 150. Some optical paths are indicated with dashed arrows.

The single mirror based unified electro optical daughter board connector 180 comprises a reflective optical element, preferably a mirror 185, which is configured to reflect the optical signal passing from modified backplane into the passive connector 150, or alternatively from the electro-optical substrate 170. Similarly to the electro-optical daughter board connector, the single mirror based unified electro optical daughter board connector 180 may be a single unit or alternatively be a modular module with several connector units, wherein a single reflective optical element 185 (preferably a mirror) reflects the optical signal from the frontal side 187*a* through the optical focusing layer 181 to the bottom side 187*b* (or vice versa).

It is appreciated that the structure of the mirror based unified electro optical daughter board connector 180 may be a single solid unit that may be manufactured as a whole, without the need for optical fibers, whereby the reflective optical element 185 (preferably a mirror) may be embedded therewithin. The mirror based unified electro optical daughter board connector 180 may have a first solid (or empty) compartment 184*a*, and a second solid (or empty) compartment 184*b*, such that the entire mirror based unified electro optical daughter board connector 180 may be manufactured in a single molding or extruding procedure.

The first solid (or empty) compartment 184*a* is positioned between the frontal side 187*a* and the second empty compartment 184*b*, and the second empty compartment 184*b* is between the reflective optical element 185 (preferably a mirror) and the back side 187*b*, wherein the single reflective optical element 185 reflects the optical signal between the back side 187*b* and the frontal side 187*a*.

In case of a solid compartment, a plurality of connector tunnels 186 (for instance perforated into the material of the first solid compartment 184*a*) allows the optical signal (reflected form the reflective optical element 185) to pass towards the frontal side 187*a*. Thus, the first solid compartment 184*a* may be provided with a single perforated unit with dedicated tunnels to pass the optical signal such that there is no longer a need for coupling with the optical fibers. Specifically, an optical signal emitted from a particular element in the electro-optical substrate 170 into the second empty compartment 184b is then reflected (from the reflective optical element 185) to a corresponding connector tunnel 186 at the first solid compartment 184a such that the signal finally arrives to the passive connector 150. Alternatively, the signal may pass in the opposite direction in a similar way. In some embodiments, the mirror based unified electro optical daughter board connector 180 may further comprise an at least partially transparent optical focusing layer 181 having multiple optical elements configured to focus the light beam for each optical signal (similarly to a lens) and pass a focused beam towards the protecting plate 141. Additionally, the optical focusing layer 181 has protruding edges that push the openings of the plate 141 so as to engage the passive connector 150, whereby this is similar to the previous embodiments with the optical fibers engaging the openings 142 of the plate 141. While this structure differs from the continuous structure of the fibers of the electro-optical daughter board connector 160 (for instance as shown in FIG. 16C), protruding edges of the optical focusing layer 181 (protruding from the frontal side 187a) also have a oblique spread, indicated with a dashed line 189, that corresponds to the openings of the passive connector, such that the same operation is maintained in passing the optical signal. It is appreciated that while the no-fiber structure was described only for this mirror based unified electro optical daughter board connector 180, the same structure may also apply for other embodiments.

In some embodiments, the optical characteristics of the optical focusing layer 181 may be changed in order to achieve a different behavior of the system. For example, it may be possible to change the focusing strength so as to allow multiple beams to pass simultaneously.

In some embodiments, the connector tunnels are replaced with wave guides.

It should be noted that similarly to the abovementioned electro-optical daughter board connector, the single mirror based unified electro optical daughter board connector 180 may be coupled to the electro-optical substrate 170, or alternatively coupled to the glass electro-optical substrate 177 (as shown in FIGS. 17A-17D).

Referring now to FIG. 18C, this figure illustrates a perspective view of a multiple mirror based unified electro optical daughter board connector 183, with multiple reflective elements 188 (e.g. mirror or prism) for each optical fiber 182. In this embodiment, the optical fibers 182 are again split into two section (similarly to the single mirror connector, for instance as shown in FIG. 18B) but instead of a single reflective element, each optical fiber 182 is coupled to a different reflective element 188 such that the optical signal may pass from the frontal side 187a towards the bottom side 187b (or vice versa). Optionally, each of the multiple reflective elements 188 may be controlled separately so as to allow different configurations for the communication channels.

In some embodiments, the reflective elements may be replaced with Micro Electro-Mechanical Systems (MEMS) that change the orientation of the reflective surface when an external voltage is applied. Thus, further control of the optical signal may be achieved.

Referring now to FIGS. 19A-19B, this figures show an assembled optical connector. FIG. 19A illustrates a perspective view of the assembled optical connector 190, and FIG. 19B illustrates a cross-sectional view of the same. The assembled optical connector 190 comprises the electro-optical daughter board connector 160 coupled to the mother board passive connector 150, with the passive intermediate optical layer 131 and the protection plate 141. The protection plate 141 is positioned between the electro-optical daughter board connector 160 and the motherboard passive connector 150, such that the edges of the connector optical fibers 162 engage the openings 142 and allow an optical signal to pass through the base 125 of the passive connector 150, e.g. via waveguides 152. The optical signal may then pass through the aperture 132 of the passive intermediate optical layer 131 so as to pass to the modified backplane whereby the coupling pins 123 provide the mechanical attachment to the modified backplane, further described hereinafter.

The bottom side of the electro-optical daughter board connector 160 is coupled to a daughter board 192, through the electro-optical substrate 177 therebetween. The assembly between the electro-optical substrate 177 and the daughter board 192 is carried out with the soldering balls at the bottom side of the substrate. Preferably, the electro-optical daughter board connector 160 is mechanically coupled and fixed to the daughter board 192 based on the alignment during the soldering process.

Optical signals from the connector optical fibers 162 go through the glass substrate and are converted to electrical signals (or vice versa) with the signal converters that are positioned correspondingly to the connector optical fibers 162. The electrical signals then pass throughout the daughter board 192 according to the desired architecture, similarly to electrical signals that pass through the processing boards of the commercially available solutions. It is appreciated that the assembled optical connector 190 may replace the commercially available front-board connectors, wherein the conversion to optical/electrical signals is carried out at the glass electro-optical substrate 177 such that the remaining path of the signal in the connectors is for an optical signal thereby allowing architecture with an increased number of communication channels.

Referring now to FIGS. 20A-20B, these figures show the assembled optical connector further coupled to the modified backplane 201, such that the full communication path 200 is achieved from the daughter board 192 and to the modified backplane 201. FIG. 20A illustrates a perspective back view of the assembled optical connector coupled to the modified backplane 201, and FIG. 20B illustrates a cross-sectional view of the same.

In addition to the corrugations with the first and second grooves 66b, 67b, the modified backplane 201 may be further perforated with tube shaped passages 202 (from the first side 207a to the second side 207b) that correspond in position to the apertures 132 at the passive intermediate optical layer 131. Thus, the optical signal may pass from the connector optical fiber 162 through the passive intermediate optical layer 131 and wither to the first side 207a, or alternatively to the second side 207b via a tube shaped passage 202. Furthermore, the modified backplane 202 may be also perforated with pinholes corresponding to the pins 123.

It is appreciated that the assembled optical connector may be coupled to the modified backplane 201 so as to allow an increased number of communication channels using the same architecture, wherein the conversion of the signal is carried out at the daughter board substrate and the remaining path is only the optical signal passing through the connectors and the modified backplane.

It should be noted that while a specific combination was described for the assembled optical connector, different combinations may also be used such that the passage of the optical signal though the connector is unchanged. For instance, using a non-transparent electro-optical substrate instead of the glass electro-optical substrate and/or using the mirror based unified electro optical daughter board connector (or the multiple mirror front connectors) instead of the electro-optical daughter board connector.

Referring now to FIGS. 21A-21G, these figures show an additional method of transferring the optical signal though the modified backplane using an optical element array. FIG. 21A illustrates a perspective partial back view of the assembled mirror based unified electro optical daughter board connector 180 coupled to the modified backplane 201 on a front side of the backplane 201. A corresponding optical element array 210 is coupled to the backplane 201 on a back, opposite side of the backplane 201. FIG. 21B and FIG. 21C illustrate the light path from and to the backplane (not shown). It should be noted that the coupling to the modified backplane 201 is similar to the above mentioned coupling of the optical connector to the backplane (as shown in FIGS. 20A-20B).

In order to allow a complete communication path ("full-mesh"), an optical element array 210 may be coupled on the back side of the modified backplane 201 for each of the mirror based unified electro optical daughter board connectors 180, such that the optical signal from each mirror based unified electro optical daughter board connector 180 may pass to the back side of the modified backplane 201 (for instance through vias 216) and subsequently from the backplane 201 into the corresponding optical element array 210, as further described hereinafter.

It should be noted that the frontal side 213 of the optical element array 210, that is coupleable with the modified backplane 201, comprises a plurality of protrusions 218 (shown in FIG. 21B) corresponding in position to the tube shaped passages (shown in FIG. 20b) of the modified backplane 201. Accordingly, the protrusions 218 also have an oblique spread, indicated with a dashed line 217, which corresponds to the passages of the modified backplane. Preferably, the optical element array 210 (including the spherical protrusions 218) is provided as a single unit that is configured to allow passage of an optical signal. Referring to FIG. 21c, it should be noted that the position of the prisms (219) with respect to the via (216) is controllable.

Turning back to FIG. 21B, a partial cross-sectional view of light coupling using spheres 218 of the optical element array 210 attached to the backplane using optical glue (211) is illustrated. FIG. 21C illustrates a partial cross-sectional side view of light coupling using prisms 219 of the optical element array 210. It should be noted that the position of the prisms (219) with respect to the via (216) is controllable FIG. 21D illustrates a bottom view of the optical element array 210 in which prisms 219 are located in an oblique position coupling the light pathing through the vias (216) to and from the backplane 201.

FIG. 21E illustrates a top view of the optical element array 210 attached to the backplane 201 in which spheres 218 are located in an oblique position coupling the light path to and from the vias (216) inside the backplane into the optical fibers (212).

FIG. 21H illustrates a cross sectional view of an assembled unified electro optical daughter board connector (180) attached to the backplane passive connector (150) and the modified backplane (210)

Referring now to FIGS. 22A-22B, these figures show the assembled optical connector in the same rack with some commercially available connectors. It should be noted that while the assembled optical connector have a structure compatible with existing communication infrastructure, the unique design of this electro-optical system may provide significant advantages over the commercially available solutions.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A system comprising:
a backplane connector having a plurality of signal converters and a plurality of connection pins; and
a printed circuit board (PCB) backplane, comprising:
a first side and a second side;
a plurality of through holes configured to accommodate with the pins of the backplane connector;
a plurality of vias configured to transmit optical signals through the backplane
from the first side to the second side and vice versa;
a plurality of intersecting longitudinal and transverse grooves on the first side of the backplane, the grooves intersect with at least some of the plurality of vias; and
a plurality of intersecting longitudinal and transverse grooves on the second side of the backplane, the grooves intersect with at least some of the plurality of vias, wherein the longitudinal grooves cut through optical fibers placed in the transverse grooves, and wherein the plurality of intersecting longitudinal and transverse grooves on the second side are not aligned with the plurality of intersecting longitudinal and transverse grooves on the first side.

2. The PCB backplane of claim 1, wherein the longitudinal grooves are v-shaped and create v-shaped gaps above a via at the intersection with the transverse groove.

3. The PCB backplane of claim 1, wherein the optical element includes optical adhesive.

4. The PCB backplane of claim 1, wherein the optical element includes a prism.

5. The PCB backplane of claim 1, comprising a plurality of through holes configured to accommodate with pins of a backplane connector, wherein at least some of the plurality of vias are place in correspondence to signal converters attached to the backplane connector.

6. The PCB backplane of claim 1, wherein at least some of the plurality of vias have edges at the first side not engaged with the transverse grooves, configured to couple the respective vias with signal converters, wherein the respective vias engage a longitudinal groove on the second side.

7. The PCB backplane of claim 1, wherein a series of optical elements are placed in a series of gaps, each of the optical elements is cladded in order to keep optical signal in a path.

8. The PCB backplane of claim 1, further comprising electrical traces.

9. The system of claim 1, wherein the longitudinal grooves cut through optical fibers placed in the transverse grooves, and wherein an optical element is placed in a gap above a via in at least one intersection of the longitudinal and transverse grooves, to direct an optical signal in a desired path.

10. The system of claim 1, wherein the signal converters are configured to receive optical signals through the PCB backplane and convert the received optical signals to electric signals, and are further configured to receive and convert electric signals to optical signals and to transmit the optical signals to the PCB backplane.

11. The system of claim 1, wherein the signal converters are positioned along a plurality of columns corresponding to the longitudinal grooves, wherein some columns of converters correspond to longitudinal grooves on the first side, and some other columns of converters correspond to longitudinal grooves on the second side.

12. A system comprising:
a backplane connector having a plurality of connector optical vias and a plurality of connection pins at a first face;
a daughter board connector comprising:
a plurality of optical modules configured to transmit optical signal from a bottom side of the daughter board connector to a front side of the daughter board connector and vice versa, the front side is connectable to a second face of the backplane connector;
a plurality of electro-optical signal convertors at the bottom side configured to transmit or receive optical signals to or from the optical modules;
a printed circuit board (PCB) backplane comprising:
a first side and a second side;
a plurality of vias configured to transmit optical signals through the PCB backplane from the first side to the second side and vice versa;
a plurality of intersecting longitudinal and transverse grooves on the first side of the backplane, the grooves intersect with at least some of the plurality of vias; and
a plurality of intersecting longitudinal and transverse grooves on the second side of the PCB backplane, the grooves intersect with at least some of the plurality of vias, wherein the longitudinal grooves cut through optical fibers placed in the transverse grooves, and wherein the plurality of intersecting longitudinal and transverse grooves on the second side are not aligned with the plurality of intersecting longitudinal and transverse grooves on the first side, wherein the backplane connector is coupled to the PCB backplane.

13. The system of claim 12, wherein the longitudinal grooves cut through optical fibers placed in the transverse grooves, and wherein an optical element is placed in a gap above the PCB backplane via in at least one intersection of the longitudinal and transverse grooves, to direct an optical signal in a desired path.

14. The system of claim 12, wherein the optical modules are optical fibers extending from the frontal side to a bottom side of the daughter board connector.

15. The system of claim 12, wherein the optical modules protrude from the frontal side to connect to the second face of the backplane connector.

16. The system of claim 15, wherein the optical backplane connector is covered on its second face by a protection plate having a plurality of openings locating in positions corresponding to the protruding optical modules, the openings are closed until engaged with the protruding optical modules.

17. The PCB backplane of claim 13, wherein the longitudinal grooves are v-shaped and create v-shaped gaps above a via at the intersection with the transverse groove.

18. The PCB backplane of claim 13, wherein the optical element includes optical adhesive.

19. The PCB backplane of claim 12, wherein the optical element includes a prism.

20. The PCB backplane of claim 12, comprising a plurality of through holes configured to accommodate with pins of a backplane connector, wherein at least some of the plurality of vias are place in correspondence to signal converters attached to the backplane connector.

21. The PCB backplane of claim 12, wherein at least some of the plurality of vias have edges at the first side not engaged with the transverse grooves, configured to couple the respective vias with signal converters, wherein the respective vias engage a longitudinal groove on the second side.

22. The PCB backplane of claim 12, wherein a series of optical elements are placed in a series of gaps, each of the optical elements is cladded in order to keep optical signal in a path.

23. The PCB backplane of claim 12, further comprising electrical traces.

24. The system of claim 12, wherein the optical module is a 45 degrees mirror reflecting the light from the bottom face tom the front face and vice versa.

* * * * *